US012523786B2

(12) United States Patent
Seaver et al.

(10) Patent No.: US 12,523,786 B2
(45) Date of Patent: Jan. 13, 2026

(54) LATERAL CRYSTAL PHOTODIODE READOUTS AND SWITCHED DIODE NETWORKS FOR PROCESSING NUCLEAR EVENTS

(71) Applicant: Cintilight, LLC, Bellevue, WA (US)

(72) Inventors: Chad E. Seaver, Knoxville, TN (US); Philipp Braeuninger-Weimer, Seattle, WA (US); Ronald Grazioso, Knoxville, TN (US)

(73) Assignee: Cintilight, LLC, Bellevue, WA (US)

( * ) Notice: Subject to any disclaimer, the term of this patent is extended or adjusted under 35 U.S.C. 154(b) by 0 days.

(21) Appl. No.: 18/745,933

(22) Filed: Jun. 17, 2024

(65) Prior Publication Data

US 2024/0411035 A1    Dec. 12, 2024

Related U.S. Application Data

(63) Continuation of application No. 18/365,755, filed on Aug. 4, 2023, now Pat. No. 12,013,503.

(60) Provisional application No. 63/502,115, filed on May 14, 2023, provisional application No. 63/378,739, filed on Oct. 7, 2022.

(51) Int. Cl.
*G01T 1/202* (2006.01)
*G01T 1/29* (2006.01)

(52) U.S. Cl.
CPC ............ *G01T 1/202* (2013.01); *G01T 1/2985* (2013.01)

(58) Field of Classification Search
None
See application file for complete search history.

(56) References Cited

U.S. PATENT DOCUMENTS 4,743,764 A * 5/1988 Casey ................... G01T 1/202
                                                        250/363.04
4,749,863 A * 6/1988 Casey ................... G01T 1/202
                                                        250/363.04

(Continued)

FOREIGN PATENT DOCUMENTS

CN    110974267 A    4/2020
WO    2021146559 A1   7/2021

*Primary Examiner* — David J Makiya
*Assistant Examiner* — Djura Malevic
(74) *Attorney, Agent, or Firm* — PCFB, LLC; Justin K. Flanagan

(57) ABSTRACT

A positron emission tomography (PET) scanner may include a plurality of gamma radiation detector modules arranged to form a detector ring. Each detector module may include an array of elongated scintillation crystals. With respect to the detector ring, each elongated scintillation crystal includes a proximal end-face, two axially oriented lateral faces, two transaxially oriented lateral faces, and a distal end-face radially oriented into the detector ring to receive a gamma photon. An array of photosensors is positioned along a first of the axially oriented lateral faces of each elongated scintillation crystal to detect scintillation photons. A reflective material is positioned on the proximal end-face, the distal end-face, the transaxially oriented lateral faces, and a second of the axially oriented lateral faces of each elongated scintillation crystal to internally reflect scintillation photons. In various embodiments, a dual-channel processing circuit provides distinct timing and energy signals from the photosensors.

29 Claims, 27 Drawing Sheets

(56) References Cited

U.S. PATENT DOCUMENTS

| | | | | |
|---|---|---|---|---|
| 5,227,633 A * | 7/1993 | Ryuo | | G01T 1/2002 |
| | | | | 250/367 |
| 6,114,703 A | 9/2000 | Levin et al. | | |
| 6,180,946 B1 * | 1/2001 | Ebstein | | G01T 1/295 |
| | | | | 250/370.11 |
| 6,288,399 B1 * | 9/2001 | Andreaco | | G01T 1/2008 |
| | | | | 250/363.03 |
| 6,552,348 B2 * | 4/2003 | Cherry | | G01T 1/202 |
| | | | | 250/363.04 |
| 6,906,329 B2 * | 6/2005 | Bryman | | G01T 1/2935 |
| | | | | 250/389 |
| 7,019,297 B2 * | 3/2006 | Aykac | | G01T 1/202 |
| | | | | 250/367 |
| 7,019,298 B2 * | 3/2006 | Tonami | | G01T 1/20 |
| | | | | 250/368 |
| 7,193,208 B1 * | 3/2007 | Burr | | G01T 1/2985 |
| | | | | 250/362 |
| 7,238,946 B2 * | 7/2007 | Joung | | G01T 1/202 |
| | | | | 250/363.04 |
| 7,378,659 B2 * | 5/2008 | Burr | | G01T 1/1644 |
| | | | | 250/362 |
| 7,439,509 B1 * | 10/2008 | Grazioso | | G01T 1/208 |
| | | | | 250/338.4 |
| 7,671,339 B2 * | 3/2010 | Shibuya | | G01T 1/2985 |
| | | | | 250/363.04 |
| 7,750,311 B2 | 7/2010 | Daghighian | | |
| 7,795,590 B2 * | 9/2010 | Takahashi | | G01T 1/249 |
| | | | | 250/363.04 |
| 7,820,977 B2 * | 10/2010 | Beer | | G01T 1/167 |
| | | | | 250/390.07 |
| 8,431,904 B2 * | 4/2013 | Lewellen | | G01T 1/1647 |
| | | | | 250/363.04 |
| 8,476,599 B2 * | 7/2013 | Perna | | H10F 77/496 |
| | | | | 250/370.11 |
| 8,586,933 B2 * | 11/2013 | Levene | | G01T 1/1644 |
| | | | | 250/366 |
| 8,716,669 B2 * | 5/2014 | Miyaoka | | G01T 1/2985 |
| | | | | 250/363.01 |
| 8,809,794 B2 * | 8/2014 | Uchida | | G01T 1/2006 |
| | | | | 250/361 R |
| 8,884,239 B2 * | 11/2014 | Wieczorek | | G01T 1/1642 |
| | | | | 250/370.11 |
| 8,993,971 B2 * | 3/2015 | Taghibakhsh | | G01T 1/2985 |
| | | | | 250/362 |
| 9,000,382 B2 * | 4/2015 | Mattson | | G01T 1/161 |
| | | | | 250/363.01 |
| 9,075,151 B2 * | 7/2015 | Rose | | G01T 1/202 |
| 9,140,808 B2 * | 9/2015 | Ronda | | G01T 1/2019 |
| 9,435,898 B2 * | 9/2016 | Olcott | | G01T 1/202 |
| 9,668,714 B2 * | 6/2017 | Call | | A61B 8/5253 |
| 9,709,684 B2 * | 7/2017 | Kim | | B23K 26/352 |
| 9,796,922 B2 * | 10/2017 | Menge | | C09K 11/7772 |
| 9,835,737 B1 | 12/2017 | Czarnecki et al. | | |
| 9,841,510 B2 * | 12/2017 | Simon | | G01T 1/20181 |
| 10,048,392 B2 * | 8/2018 | Long | | G01T 1/2985 |
| 10,132,939 B2 * | 11/2018 | Adachi | | G01N 23/04 |
| 10,267,931 B1 * | 4/2019 | Breuer | | G01T 1/2985 |
| 10,274,610 B2 | 4/2019 | Nelson et al. | | |
| 10,497,741 B2 * | 12/2019 | Wong | | G01T 1/202 |
| 10,509,135 B2 | 12/2019 | Nelson et al. | | |
| 10,802,164 B2 * | 10/2020 | Roy | | G06N 3/045 |
| 10,877,169 B2 * | 12/2020 | An | | G01T 1/20185 |
| 11,073,625 B2 | 7/2021 | Nelson et al. | | |
| 11,099,283 B2 * | 8/2021 | Yamaji | | G01T 1/20 |
| 11,172,911 B2 * | 11/2021 | Call | | A61B 8/145 |
| 11,253,212 B2 * | 2/2022 | Jacob | | A61B 6/4283 |
| 11,378,702 B2 * | 7/2022 | An | | H10F 39/1898 |
| RE49,174 E * | 8/2022 | Yang | | G01T 1/20187 |
| 11,454,730 B2 * | 9/2022 | Goldan | | A61B 6/4266 |
| 11,598,889 B2 * | 3/2023 | Yamaji | | G01T 1/2018 |
| 11,662,487 B1 * | 5/2023 | Palm | | G01T 1/2914 |
| | | | | 250/252.1 |
| 11,719,835 B2 * | 8/2023 | Wu | | G01T 1/20186 |
| | | | | 250/370.11 |
| 11,774,605 B2 * | 10/2023 | Saito | | G01T 1/20183 |
| | | | | 250/370.11 |
| 2001/0040219 A1 * | 11/2001 | Cherry | | G01T 1/2985 |
| | | | | 250/363.03 |
| 2004/0140431 A1 * | 7/2004 | Schmand | | G01T 1/20182 |
| | | | | 250/367 |
| 2004/0178347 A1 * | 9/2004 | Murayama | | G01T 1/1644 |
| | | | | 250/367 |
| 2004/0232342 A1 * | 11/2004 | Aykac | | G01T 1/202 |
| | | | | 250/367 |
| 2004/0232343 A1 * | 11/2004 | Schmand | | G01T 1/2002 |
| | | | | 250/368 |
| 2004/0262526 A1 * | 12/2004 | Corbeil | | G01T 1/2002 |
| | | | | 250/487.1 |
| 2005/0072932 A1 * | 4/2005 | Bryman | | G01T 1/1603 |
| | | | | 250/370.11 |
| 2005/0253073 A1 * | 11/2005 | Joram | | G01T 1/2985 |
| | | | | 250/366 |
| 2006/0192128 A1 * | 8/2006 | Benlloch Bavciera | | |
| | | | | G01T 1/1642 |
| | | | | 250/369 |
| 2006/0293580 A1 * | 12/2006 | Ladebeck | | G01R 33/422 |
| | | | | 600/407 |
| 2007/0090298 A1 * | 4/2007 | Shao | | G01T 1/2985 |
| | | | | 250/366 |
| 2007/0102641 A1 * | 5/2007 | Schmand | | G01T 1/1603 |
| | | | | 250/363.04 |
| 2007/0262261 A1 * | 11/2007 | Liang | | G01T 1/1644 |
| | | | | 250/362 |
| 2008/0042070 A1 * | 2/2008 | Levin | | H04N 25/30 |
| | | | | 250/370.1 |
| 2008/0214927 A1 * | 9/2008 | Cherry | | G01R 33/481 |
| | | | | 600/411 |
| 2009/0008562 A1 * | 1/2009 | Grazioso | | G01T 1/1644 |
| | | | | 250/363.04 |
| 2009/0032717 A1 * | 2/2009 | Aykac | | G01T 1/202 |
| | | | | 250/366 |
| 2009/0134334 A1 * | 5/2009 | Nelson | | G01T 1/202 |
| | | | | 250/361 R |
| 2009/0224164 A1 * | 9/2009 | Lewellen | | G01T 1/1642 |
| | | | | 250/370.11 |
| 2009/0236534 A1 * | 9/2009 | Selfe | | H10F 77/496 |
| | | | | 250/361 R |
| 2009/0261262 A1 * | 10/2009 | Hunt | | G01T 1/2002 |
| | | | | 156/60 |
| 2010/0012846 A1 * | 1/2010 | Wang | | G01T 1/1642 |
| | | | | 250/363.04 |
| 2010/0067001 A1 * | 3/2010 | Corbeil | | G01T 1/00 |
| | | | | 156/60 |
| 2010/0127178 A1 * | 5/2010 | Laurence | | G01T 1/202 |
| | | | | 250/363.04 |
| 2010/0148074 A1 * | 6/2010 | Menge | | G01T 1/1644 |
| | | | | 250/362 |
| 2010/0155610 A1 * | 6/2010 | Menge | | G01T 1/2002 |
| | | | | 156/60 |
| 2010/0270462 A1 * | 10/2010 | Nelson | | G01T 1/20181 |
| | | | | 250/252.1 |
| 2011/0017916 A1 * | 1/2011 | Schulz | | G01T 1/2002 |
| | | | | 250/368 |
| 2011/0074426 A1 * | 3/2011 | Schmand | | G01T 1/1603 |
| | | | | 250/363.04 |
| 2011/0121184 A1 * | 5/2011 | Inadama | | G01T 1/1644 |
| | | | | 250/361 R |
| 2011/0192982 A1 * | 8/2011 | Henseler | | G01T 1/2985 |
| | | | | 250/362 |
| 2012/0085913 A1 | 4/2012 | Mccroskey et al. | | |
| 2012/0112083 A1 * | 5/2012 | Zhang | | G01T 1/1642 |
| | | | | 250/371 |
| 2012/0199748 A1 * | 8/2012 | Cooke | | G01T 1/2002 |
| | | | | 53/461 |
| 2012/0212355 A1 * | 8/2012 | Zhang | | G01T 1/20184 |
| | | | | 250/362 |
| 2013/0009047 A1 * | 1/2013 | Grazioso | | G01T 1/202 |
| | | | | 250/361 R |

(56) References Cited

U.S. PATENT DOCUMENTS

| | | | |
|---|---|---|---|
| 2013/0009066 A1* | 1/2013 | Grazioso | A61B 6/037 |
| | | | 250/363.04 |
| 2013/0009067 A1* | 1/2013 | Schmand | G01T 1/1642 |
| | | | 250/366 |
| 2013/0032722 A1* | 2/2013 | Szupryczynski | G01T 1/2978 |
| | | | 250/361 R |
| 2013/0153774 A1* | 6/2013 | Hughes | G01T 1/20182 |
| | | | 250/366 |
| 2013/0153776 A1* | 6/2013 | Wieczorek | G01T 1/20187 |
| | | | 250/366 |
| 2013/0206994 A1* | 8/2013 | Kaufmann | G01T 1/2006 |
| | | | 250/366 |
| 2014/0097346 A1* | 4/2014 | Cohen | G01T 1/20188 |
| | | | 250/363.01 |
| 2014/0306118 A1* | 10/2014 | Olcott | A61B 6/037 |
| | | | 250/366 |
| 2015/0028218 A1* | 1/2015 | Kataoka | G01T 1/2985 |
| | | | 250/367 |
| 2015/0069250 A1* | 3/2015 | Schmand | G01T 1/20184 |
| | | | 250/362 |
| 2015/0285922 A1* | 10/2015 | Mintzer | A61B 6/4258 |
| | | | 250/366 |
| 2016/0124094 A1* | 5/2016 | Melcher | G01T 1/2002 |
| | | | 250/363.01 |
| 2016/0170043 A1* | 6/2016 | Andreaco | G01T 1/2002 |
| | | | 250/368 |
| 2017/0123080 A1* | 5/2017 | Chai | G01T 1/2002 |
| 2017/0219719 A1* | 8/2017 | Melcher | G01T 1/2023 |
| 2022/0187479 A1* | 6/2022 | Terao | G01T 1/20183 |
| 2023/0061883 A1* | 3/2023 | Sakuragi | C09D 7/63 |
| 2023/0225679 A1* | 7/2023 | Corbeil | A61B 6/032 |
| | | | 324/309 |

* cited by examiner

LATERAL CRYSTAL PHOTODIODE READOUTS AND SWITCHED DIODE NETWORKS FOR PROCESSING NUCLEAR EVENTS If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application is a continuation application of U.S. patent application Ser. No. 18/365,755 filed on Aug. 4, 2023, titled "Lateral Crystal Photodiode Readouts and Switched Diode Networks for Processing Nuclear Events," which application claimed priority to and benefit under 35 U.S.C. § 119 to U.S. Provisional Patent Application No. 63/378,739, filed on Oct. 7, 2022, entitled "Lateral Crystal Photodiode Readout and Switched Diode Network for Processing Nuclear Events," and to U.S. Provisional Patent Application No. 63/502,115, filed on May 14, 2023, also entitled "Lateral Crystal Photodiode Readout and Switched Diode Network for Processing Nuclear Events," each of which is hereby incorporated by reference in its entirety.

RELATED APPLICATIONS AND PUBLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

BACKGROUND

This disclosure relates to gamma radiation measurements, circuits for scintillation detectors, and coincidence circuit arrangements. The system, methods, practical applications, and uses of the embodiments described in this disclosure can be understood in the context of the following publications, each of which is hereby incorporated by reference in its entirety: E. Berg and S. Cherry, "Innovations in instrumentation for positron emission tomography," Seminars in nuclear medicine, vol. 48, no. 4, pp. 311-331, 2018; S. R. Cherry and M. Dahlbom, PET: Physics, Instrumentation, and Scanners, 2006; J. S. Reddin, J. S. Scheuermann, D. Bharkhada, A. M. Smith, M. Casey, M. Conti and J. S. Karp, "Performance evaluation of the SiPM-based Siemens Biograph Vision PET/CT system," in IEEE Nuclear Science Symposium and Medical Imaging Conference Proceedings (NSS/MIC), Sydney, 2018; G. F. Knoll, Radiation Detection and Measurement, Hoboken: John Wiley & Sons, Inc., 2000; S. Gundacker, E. Auffray, N. D. Vara, B. Frisch, H. Hillemanns, P. Jarron, B. Lang, T. Meyer, S. Mosquera-Vazquez, E. Vauthey and P. Lecoq, "SiPM time resolution: From single photon to saturation," Nuclear Instruments and Methods in Physics Research Section A: Accelerators, Spectrometers, Detectors and Associated Equipment, vol. 718, pp. 569-572, 2013; M. Conti, "Focus on time-of-flight PET: the benefits of improved time," European Journal of Nuclear Medicine Molecular Imaging, vol. 38, p. 1147-1157, 2011; S. Strother, M. Casey and E. Hoffman, "Measuring PET scanner sensitivity: relating count rates to image signal-to-noise ratios using noise equivalent counts," IEEE Trans Nuclear Science, vol. 37, pp. 783-788, 1990; and Saint Gobain, "LYSO Scintillation Crystals," June 2018. [Online]. Available: https://www.crystals.saint-gobain.com/radiation-detection-scintillators/crystal-scintillators/lyso-scintillation-crystals.

DETAILED DESCRIPTION

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. Numerous specific details are set forth in the following description in conjunction with the figures to provide a thorough understanding of the possible variations of the systems and methods. However, the disclosed concepts, systems, methods, apparatuses, etc., may be practiced without some or all of the specific details. For clarity, technical material that is known in the technical fields related to this disclosure is not described in detail.

Positron emission tomography (PET) is a medical imaging scanning system incorporating a plurality of gamma radiation detector modules, which may be arranged in a multi-ring formation for the detection, and subsequent image reconstruction, of annihilating radiation-emitting material positioned within the scanner's field of view. Human medical imaging utilizing PET can be facilitated by intravenous injection of positron-based radiotracers with sufficient radioactive duration to enable PET scanning. Examples of such tracers include fluorine-18 labeled glucose compounds serving the purpose of identifying highly metabolic tumor activity. Upon a positron encountering an electron, an annihilation event occurs, emitting two opposing gamma photons approximately 180° apart, each possessing approximately 511 kilo-electron-volts (keV) of energy.

The extent of migration prior to a positron encountering a free electron is referred to as the positron range. Depending upon the positron's initial kinetic energy and the density of electrons within the medium, the in-vivo range is typically less than one millimeter for fluorine-18-based radiotracers. The kinetic energy of the positron also results in an undesirable non-collinearity effect whereby the annihilation's gamma photons traverse slightly more-or-less from 180°, resulting in an imaging error of approximately 1.8 millimeters for common scanner bore sizes. The positron range and errors resulting from non-collinearity limit some PET imaging resolutions to approximately 2 mm for whole-body human imaging.

Figure 1A:
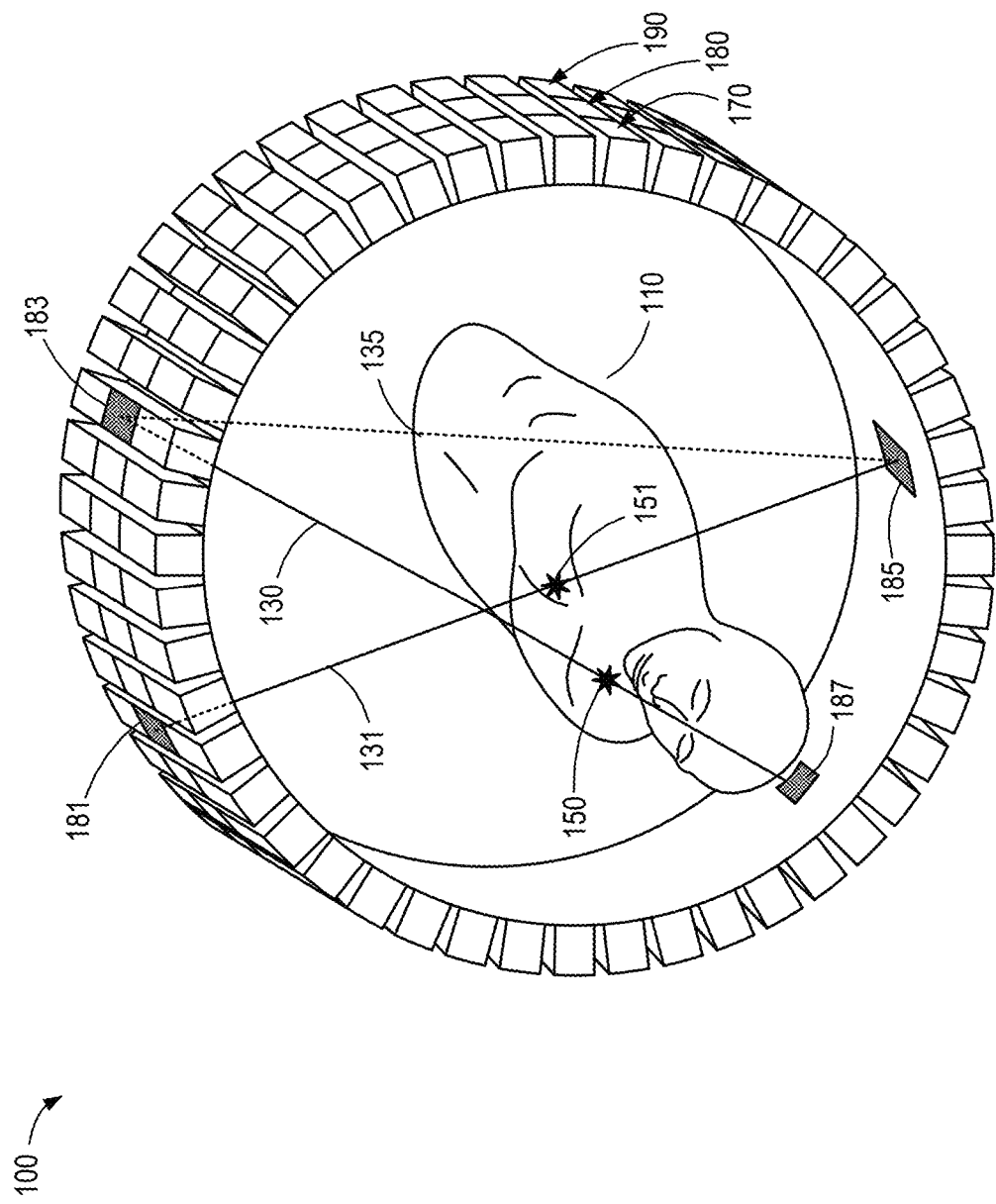
FIG. 1A illustrates a perspective view of a block diagram of a portion of a positron emission tomography (PET) detector system, according to one embodiment.

FIG. 1A illustrates a perspective view of a PET detector system 100 and positron sources 150 and 151 within a patient 110 (illustrated as a human torso), according to one embodiment. In the illustrated embodiment, the PET detector system 100 includes three rings of gamma radiation detector modules. The first ring 170 of gamma radiation detector modules is closest to the viewer, the second ring 180 of gamma radiation detector modules is in the middle, and the third ring 190 of gamma radiation detector modules is farthest from the viewer. In the illustrated example, each ring 170, 180, and 190 includes forty-eight gamma radiation detector modules. The number of detector modules and the number of rings of detector modules may vary based on a particular application, cost considerations, target size, target resolution, etc.

The positron sources 150 and 151 represent boluses of positron activity that result in annihilation radiation in which two opposing gamma photons are emitted in opposite directions. The opposing gamma photons emitted by the positron source 150 are detected by detector modules 183 and 187. A processor or other circuitry can use the known detector location and measured arrival times of the gamma photons detected by detector modules 183 and 187 to compute the line-of-response (LoR) 130 and determine the location of the positron source 150. The processor or other circuitry may identify a detected gamma photon as being a salient annihilation event based on the total detected energy being equal to or within a threshold range of the expected 511 keV.

The opposing gamma photons emitted by the positron source 151 are detected by detector modules 181 and 185. The processor or other circuitry can use the known detector location and measured arrival times of the gamma photons detected by detector modules 181 and 185 to compute the line-of-response 131 and determine the location of the positron source 151. As discussed in greater detail below, if the positron sources 150 and 151 emit their respective pairs of opposing gamma photons at the same time (or nearly the same time), there is a risk that the processor or other circuitry may erroneously compute a line-of-response 135.

Throughout this disclosure, the detector modules are described and illustrated as being used in a detector ring (e.g., a ring of detector modules). The scintillation crystals in each detector module have a distal end-face that faces into the detector (e.g., into the ring, wherein the distal end faces are located on the inner diameter of the ring) to receive a gamma photon. However, it is appreciated that a detector ring may include detector modules in the shape of a ring without forming a complete or full ring (e.g., with only the top and bottom detector modules in place). Moreover, a detector may be embodied as two (or more) planar panels of detector modules that act in concert to detect annihilation events. For example, a detector may include a first planar panel of detector modules and a second, opposing planar panel of detector modules. A subject may be positioned within the detector by being placed between the two opposing planar panels. As such, a detector module may include a plurality of scintillation crystals (e.g., in a one-dimensional or two-dimensional array) that have distal ends oriented into the detector (e.g., into the cavity or space between the opposing panels, such that the distal end faces are located on the inner diameter of the ring).

Figure 1B:
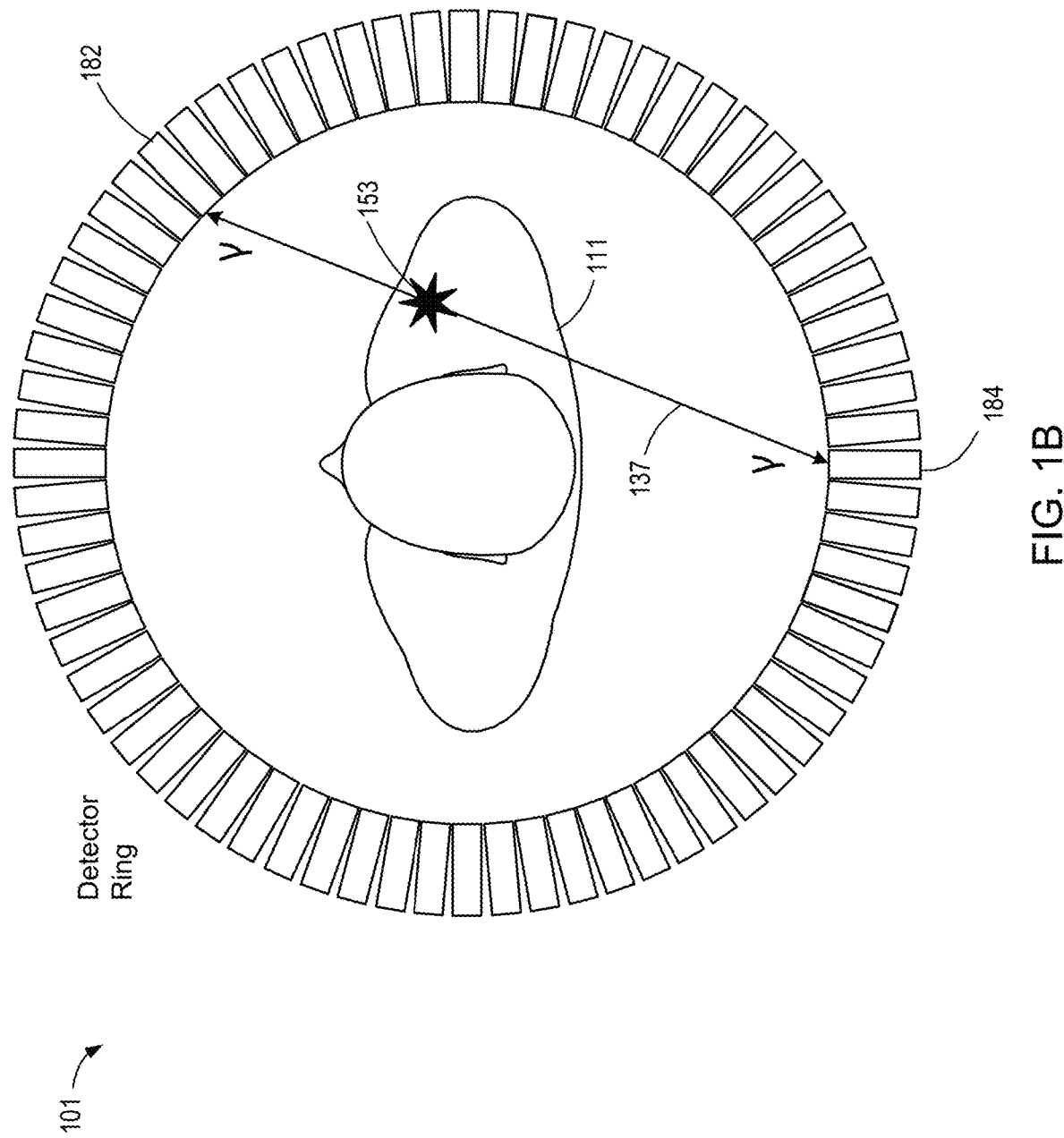
FIG. 1B illustrates another view of a block diagram of a portion of the PET detector system, according to one embodiment.

FIG. 1B illustrates a side view of another example of a PET detector system 101 and a positron source 153 within a human 111, according to one embodiment. In the illustrated embodiment, the PET detector system 101 includes a ring with seventy-two gamma radiation detector modules. The opposing gamma photons emitted by the positron source 153 are detected by detector modules 182 and 184. A processor or other circuitry can use the detector module locations and arrival times of the gamma photons detected by detector modules 182 and 184 to compute the line-of-response 137 and determine the location of the positron source 153.

Figure 2:
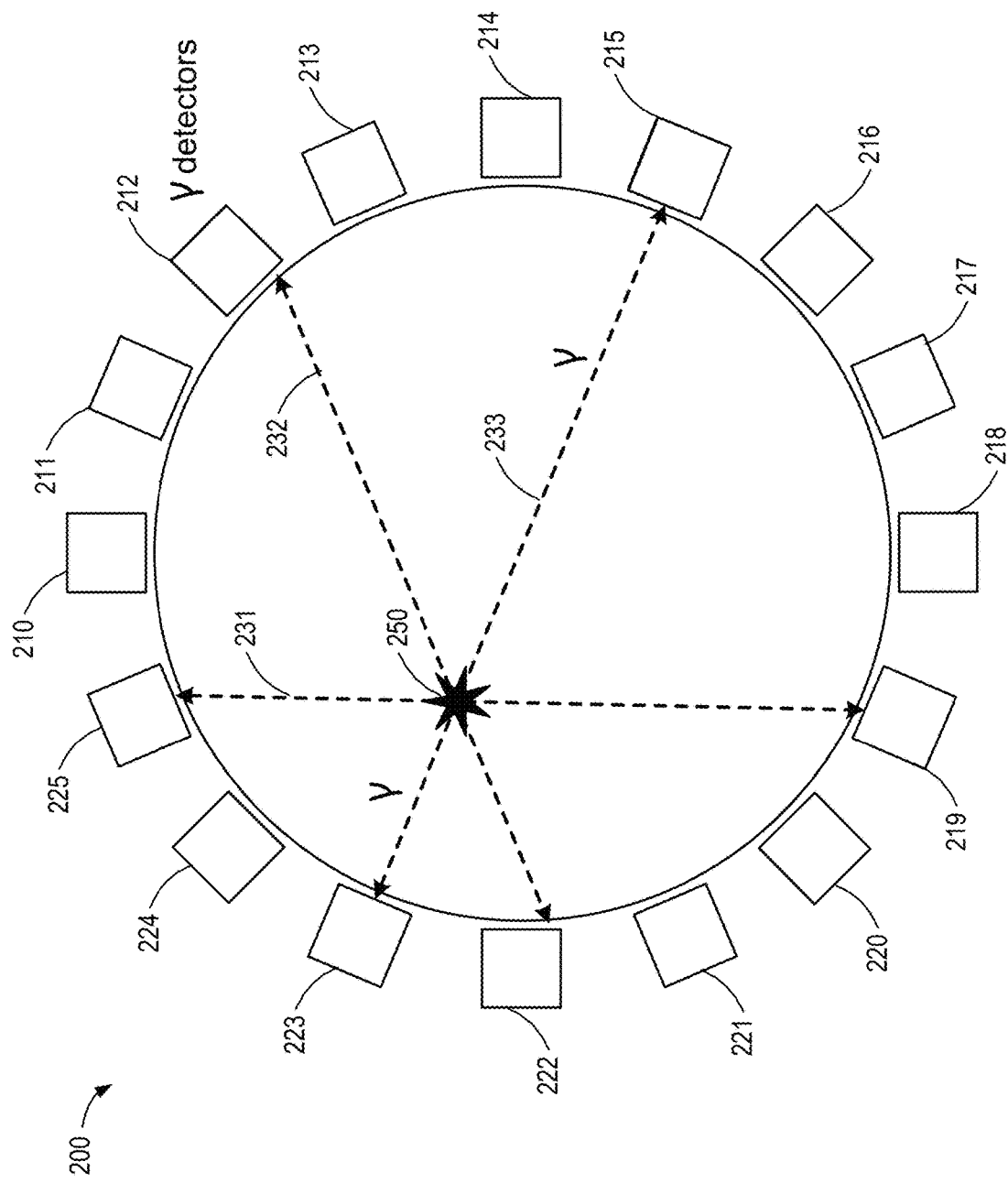
FIG. 2 illustrates a positron source with multiple lines-of-response, according to one embodiment.

FIG. 2 illustrates a block diagram of a PET detector system 200, according to one embodiment. The simplified block diagram includes a single ring of sixteen gamma radiation detector modules 210-225. Multiple lines-of-response 231, 232, and 233 are shown that intersect a bolus 250 of positron activity, according to one embodiment. Annihilation radiation from the bolus 250 of positron activity generates numerous simultaneous emissions of equal and opposite gamma photons. The system 200 can determine a range for a positron's point of origin along the line-of-response 233 extending between its two detection points (e.g., within detector modules 223 and 215).

Additional lines-of-response 231 and 232 are computed during a measurement period in which subsequent annihilation events occur within the bolus 250. A period of time during which annihilation events are detected from the bolus 250 is referred to as a scan. The system 200 is used to capture a scan that provides multiple lines-of-response for localizing a positron matter's point or region of origin. A PET scanner (e.g., including or embodied as a PET detector system as described herein) may use the ring of detector modules 210-225 to develop images of varying concentrations and locations of positron material without the use of shielding collimators, such as those employed in single photon emission computed tomography (SPECT), which filter oblique angles of origin. In other embodiments, a PET scanner may utilize axial collimators, referred to as septa, between multiple detector rings to reduce scatter radiation originating from the field of view (e.g., within a human body). However, other PET scanners operate in "3D" mode, without septa, given faster scintillators and advancements in electronic processing, which can handle larger event rates, leading to enhanced system sensitivity.

Annihilation radiation's dual gamma events are discriminated against (e.g., identified relative to) a multitude of other unrelated gamma events (generally referred to as "singles events") through the use of a time-based coincidence window. The coincidence window, which may be, for example, less than five nanoseconds (e.g., two nanoseconds), is used to filter singles events that could not have occurred from a corresponding single annihilation within the field of view, given the scanner's bore diameter (corresponding to the diameter of the ring of detector modules 210-225) and the propagation speed of gamma radiation. For example, for a PET scanner with detector modules in a ring with a diameter of 70 centimeters (e.g., a bore diameter of 70 centimeters), a positron annihilation in the center of the bore would necessitate approximately 1.167 nanoseconds for each gamma photon, traveling at the speed of light (29.98 centimeters per nanosecond), to arrive within a scintillator of one of the detector modules in the ring. Correspondingly, a positron annihilation located along the circumference of the bore would necessitate twice this amount of time for one of the gamma photons to scintillate into a detector module on the opposite side of the ring. As such, a coincidence window, along with select pairings of detector modules comprising only reasonable geometric lines-of-response, reduces uncorrelated gamma events from being otherwise recorded as coincident.

When two gamma events meet the criteria for being recorded as a singular coincident event (e.g., within the time window and detected by appropriate detector modules), such an event is referred to as a "prompt" event. Prompt events may still yet be comprised of two uncorrelated and independent gamma events originating from different annihilation events or other radiation sources, which are referred to as "random" coincident events. However, when two gamma detections authentically originate from a single positron annihilation, then such an event is referred to as a "true" coincident event. Hence, "true" coincident events occurring from bona fide positron annihilations are equated to the number of "prompt" coincident events (e.g., coincident events from an unknown source) less the number of "random" coincident events (coincidence events known or statistically determined to be random singles measured within the coincidence window).

In various embodiments, a PET scanner may further filter "scatter" events, which result when a gamma photon partially deposits its energy into a nearby material and then propagates its remaining energy into a detector module. Such scatter events are typically filtered since their point of origin is uncertain, given their possible deflection. Scatter events usually terminate in a detector with substantially less energy than their original 511 keV. Therefore, filtering may involve measuring the amount of energy deposited by a gamma event and rejecting such events that fall below a lower-level-discrimination (LLD) threshold. Additionally, upper-level-discrimination (ULD) may also be utilized to reject any near simultaneous accumulation of multiple events into a detector or the possibility of a single higher energy nuclear particle deposition. According to various embodiments, a PET scanner may utilize an LLD threshold value between 325 keV and 511 keV and a ULD threshold value between 511 keV and 675 KeV.

Figure 3:
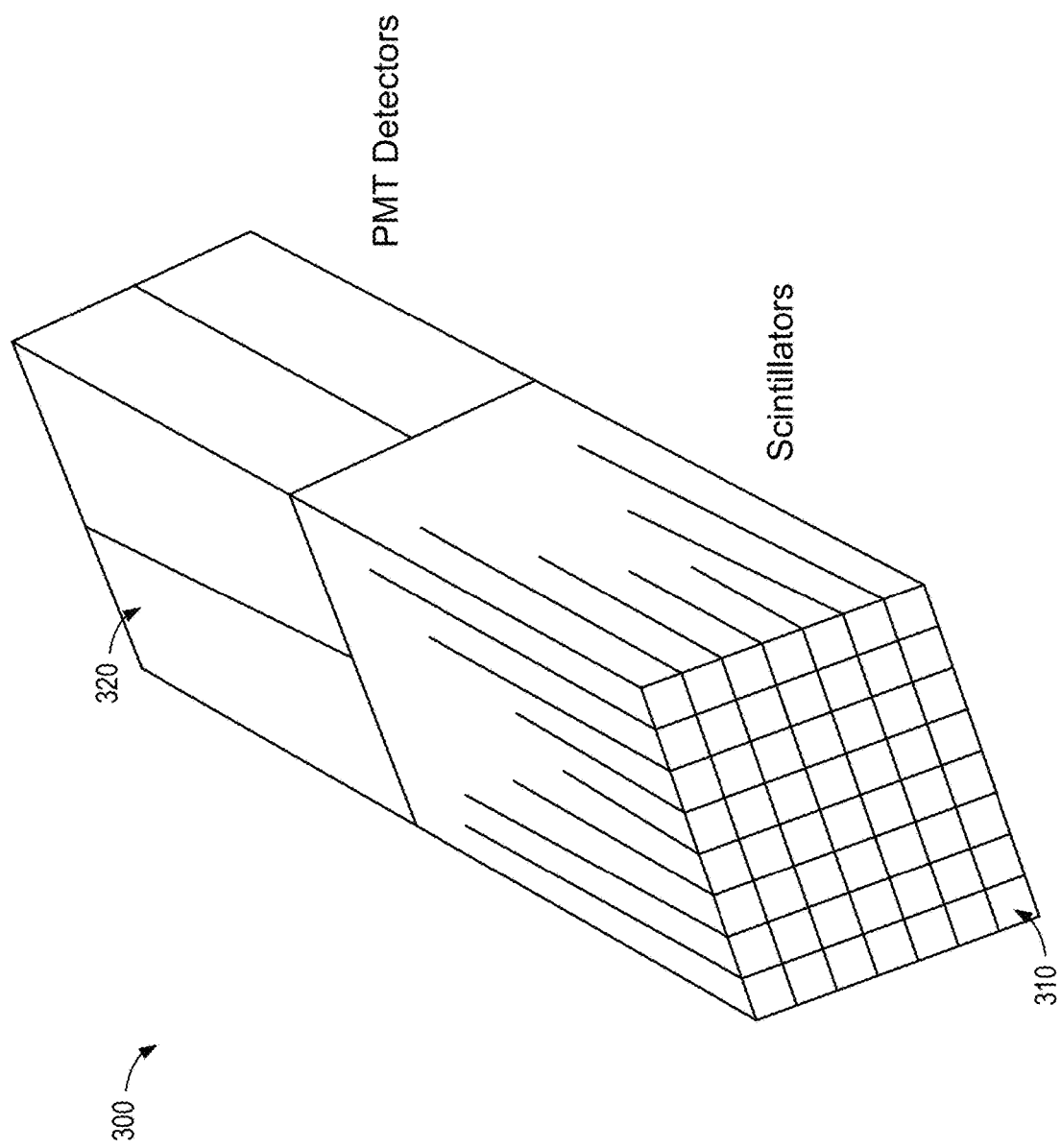
FIG. 3 shows a tube-based block detector with four photomultiplier tubes, according to one embodiment.

FIG. 3 shows a tube-based detector module 300 with four photomultiplier tubes 320 (PMTs) in a quadrant-based detection subsystem, according to one embodiment. The four photomultiplier tubes 320 are connected to a two-dimensional array of elongated scintillation crystals 310. The example two-dimensional array of elongated scintillation crystals 310 includes 56 elongated scintillation crystals in a 7×8 array. Some embodiments of gamma detector modules for PET scanners include inorganic scintillators (e.g., Bismuth Germanate, $Bi_4Ge_3O_{12}$, referred to as BGO, or Lutetium Oxyorthosilicate, $Lu_2(SiO_4)O$, referred to as LSO, $Lu_{2(1-x-y)}Y_{2x}SiO_5$, referred to as LYSO, etc.) coupled to a light guide and connected to a quadrant of photomultiplier tubes.

The illustrated configuration may be referred to as a block detector module. A detector module may comprise one or more block detectors. The block detector, in this case, shares a channel of electronics for processing nuclear gamma singles events from multiple elongated scintillation crystals 310. The elongated scintillation crystals 310 may be pixelated, as illustrated, into a plurality of elongated scintillation crystals 310, which may be etched, polished, and/or wrapped in a reflective material. Pixelation of the elongated scintillation crystals 310 into an array of elongated rectangular prisms facilitates determining the position of an impinging gamma photon within the rectangular area of an end-face of each elongated scintillation crystal 310.

In various embodiments, select areas or faces of each elongated scintillation crystal 310 may be wrapped or coated with a reflective material. The utilization of four photomultiplier tubes 320 allows for the collection of light output from any given crystal to be ratiometrically measured to determine which crystal underwent gamma interaction, thereby locating such an event on an X-Y plane for the detector face.

The sharing of processing electronics for singles events on a block basis is motivated by cost limitations, reduced power consumption and dissipation, and small packaging volume. In the block processing configuration, the detector module 300 exclusively processes a singles event via the block's processing electronics, while any other incident radiation within the same block's processing time is ordinarily rejected. Such processing time is referred to as detector dead-time. The detection area of a defined block is of consideration for PET since sharing processing electronics for too large of a block may curtail count-rate ability and sensitivity, while too small of a block may drive costs exceedingly high and complicate thermal considerations for practical volumes.

In various embodiments, solid-state photosensors (e.g., silicon-based photosensors) may be used instead of photomultiplier tubes. Conventional semiconductor-based PIN photodiodes and/or avalanche photodiodes (APD) produce an analog signal proportional to incident photonic flux. However, APDs result in a gain from impact ionization occurring from its high reverse bias wherein generated electron-hole pairs further collide with nearby atoms liberating additional charge carriers beyond the initially generated photocurrent. Although APDs typically provide much better sensitivity, they commonly possess higher noise levels than PIN photodiodes. More recent developments have resulted in the single-photon-avalanche-photodiode (SPAD), which operates at very high reverse bias, commonly referred to as Geiger-mode. SPADs are optimized for single photon detection, which triggers self-sustaining avalanche breakdown that must be quenched during operation. As a result of this self-sustaining breakdown, SPADs do not provide information on light intensity like that of APDs or PIN photodiodes. However, SPADs may be configured in parallel with large numbers of other SPADs and referred to, on the whole, as a silicon photomultiplier (SiPM) photosensor. An SiPM results in a unique photosensor that produces a signal proportional to light intensity resulting from the corresponding number of triggered SPAD cells. In this manner, the SiPM behaves as an analog photon counter whereby each individually triggered SPAD contributes to the total photocurrent output of the sensor and results in a much higher gain than that of a single APD or a PIN photodiode.

SiPM photosensors, which may include tens, hundreds, or even thousands of single-photon avalanche photodiodes per square millimeter onto a single silicon substrate. Silicon photomultipliers may be used where timing resolution and photonic dynamic range are both required, desired, and/or otherwise determined to be useful in a specific application or use-case. Advantages of such devices over photomultiplier tubes include their reduced packaging volume, reduced bias voltage, reduced sensitivity to magnetic fields, and improved single photon timing resolution. Disadvantages of silicon photomultiplier versus conventional photomultiplier tubes include higher dark currents, or counts, for a given temperature and area, as well as complex multi-exponential pulse shapes. Solid-state photosensors can be used in place of photomultiplier tubes on a one-to-one basis within a block or can be coupled one-to-one to each elongated scintillation crystal within a block.

As used herein, references to a "photosensor," "photodiode," and/or "photodetector" are not meant to be restrictive or exclusive to any particular embodiment unless explicitly stated otherwise. The term "readout," as used herein, refers to the measurement, survey, assessment, or processing of the topic referenced. Similarly, the use of "lateral" readout, "side" readout, and "side" sensing all generally refer to the photo-sensing of a scintillator where a transducing face of the photosensor is coupled to a scintillator face parallel to a transaxial direction of the scanner's bore and, hence, not taken from either end-face parallel to the scanner bore's axis. Additionally, as used herein, "scintillator," "crystal," "pixel," and "block" may each refer to the scintillator material configured in different forms.

Figure 4:
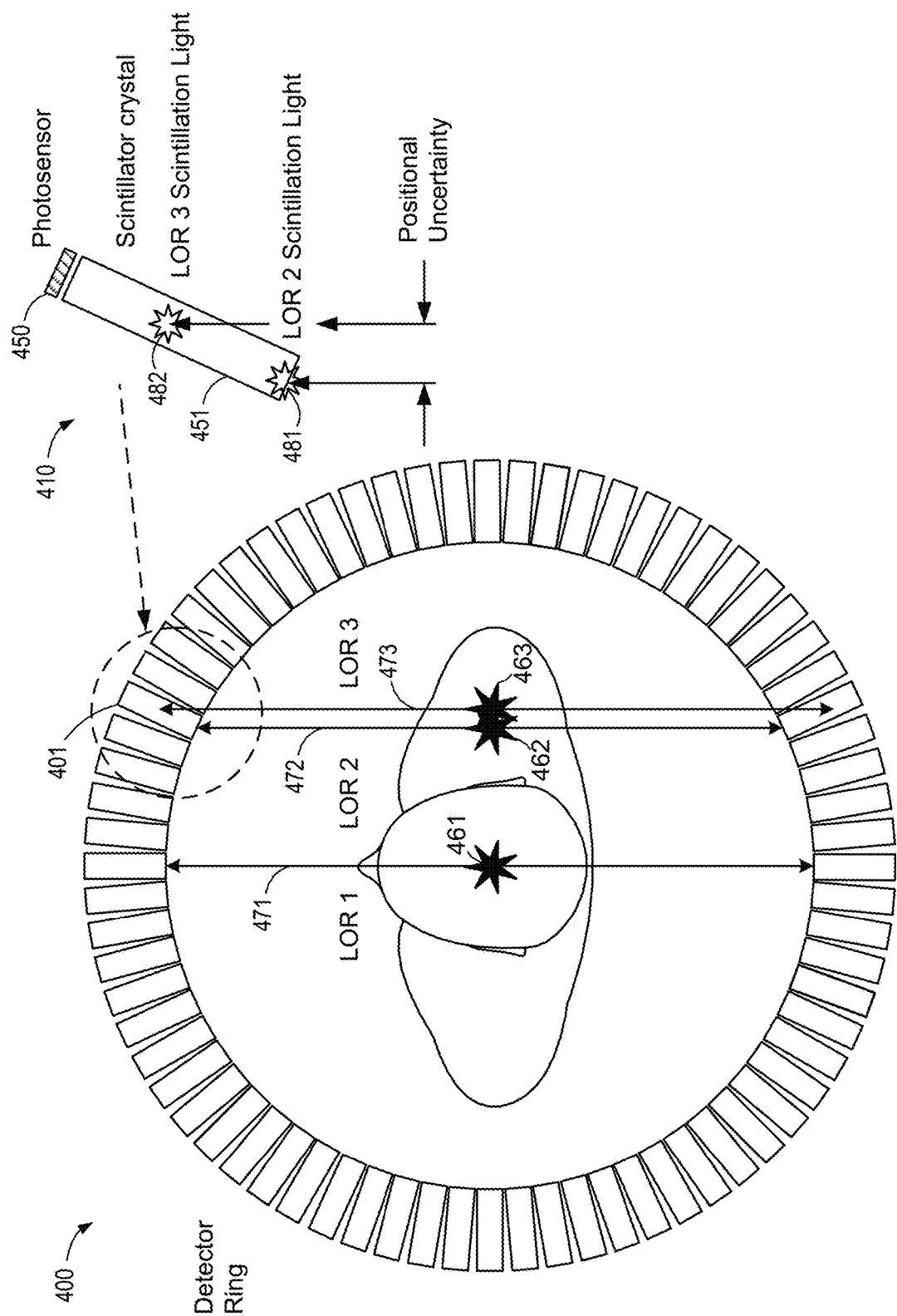
FIG. 4 is a block diagram of a ring of detector modules with multiple lines-of-response, according to one embodiment.

FIG. 4 is a block diagram of PET scanner 400 with a ring of detector modules 401 and multiple lines-of-response 471, 472, and 473, according to one embodiment. A positron annihilation 461 from the center of the ring results in the line-of-response 471 that orthogonally impacts the end-face of the elongated scintillation crystal of a pair of detector modules. Positron annihilations that occur off-center, such as positron annihilations 462 and 463, result in gamma photons that impinge upon scintillators at an oblique angle, resulting in a parallax effect. As shown in the exploded view of an elongated scintillation crystal 410 of a detector module 401 (in the upper right corner of the drawing), two gamma events 481 and 482 scintillate within the same elongated scintillation crystal 410 yet originate from separate locations (at positron annihilations 462 and 463, respectively) within a patient body. An end-face photosensor 450 on the proximal end-face of the elongated scintillation crystal 410 detects the scintillation photons generated by the elongated scintillation crystal 410 in response to the received gamma photon.

The true lines-of-response 472 and 473 for the annihilation events 462 and 463 are illustrated. However, these two gamma scintillation events 481 and 482 within the same crystal 410 may be processed such that the two different positron annihilation events 462 and 463 are detected as originating from the same position, thus resulting in imaging errors. Such a parallax effect results in geometric uncertainty, including the further possibility for a random event given that some embodiments of detector module 401 cannot discern between an event normal to the face of an elongated scintillation crystal 451 versus that arising from a severe oblique angle. The position of the end-face photosensor 450 on the proximal end-face of the elongated scintillation crystal 451 allows the end-face photosensor 450 to detect scintillation photons generated within the elongated scintillation crystal 451 but without the ability to determine a depth-of-interaction. For example, the end-face photosensor 450 does not distinguish between scintillation events 481 and 482.

Figures 5A, 5B:
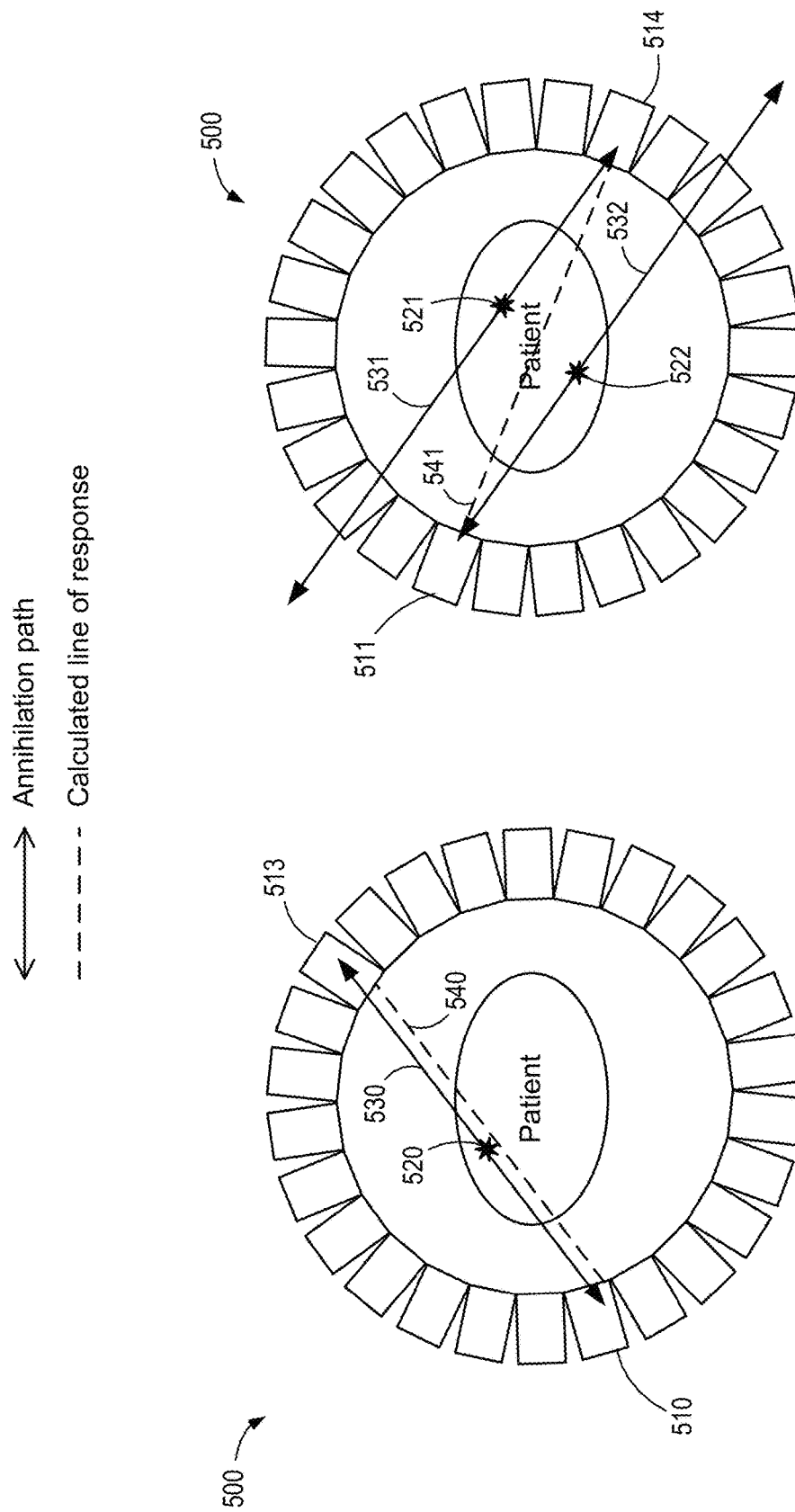
FIG. 5A illustrates a block diagram of a ring of detector modules with a single off-center line-of-response (LoR), according to one embodiment.
FIG. 5B illustrates a block diagram of the ring of detector modules with multiple off-center lines-of-response, according to one embodiment.

FIG. 5A illustrates a block diagram of ring 500 of detector modules, including detector modules 510 and 513, with a single off-center line-of-response 530 from a single annihilation event 520, according to one embodiment. Scintillation events within the detector modules 510 and 513 are used to calculate a line-of-response 540 (a "calculated line-of-response) that corresponds to the true line-of-response 530 but is offset by a parallax error, as described herein. Nevertheless, the detection of scintillation events within detector modules 510 and 513 are representative of a "true" coincidence event, having a pair of detected gamma photons that originated from single annihilation 520.

FIG. 5B illustrates the ring 500 of detector modules with two off-center lines-of-response 531 and 532 based on multiple annihilation events 521 and 522, according to one embodiment. In the illustrated example, the annihilation event 522 produces opposing gamma photons whereby one gamma photon is absorbed and detected by detector module 511 while the opposite corresponding gamma photon escapes the detector ring by virtue of its trajectory outside the ring. Similarly, annihilation event 521 produces opposing gamma photons; however, only one of the gamma photons from the annihilation event 521 is detected (e.g., by detector module 514). If a pair of disassociated scintillation photons from the gamma photons generated by the annihilation events 521 and 522 are detected by detector modules 511 and 514 simultaneously or within a few nanoseconds of each other, the PET scanner may erroneously calculate an artefactual line-of-response 541 referred to as a "random" event. That is, the PET scanner may erroneously estimate that the gamma photon detected by detector module 511 and the gamma photon detected by detector module 514 originate from the same annihilation event. The resulting line-of-response calculated by the PET scanner is "artefactual" in that the calculated line-of-response does not correspond with a true or authentic line-of-response, wherein the coincident prompt is actually a random event instead of a true coincident event.

Figure 6:
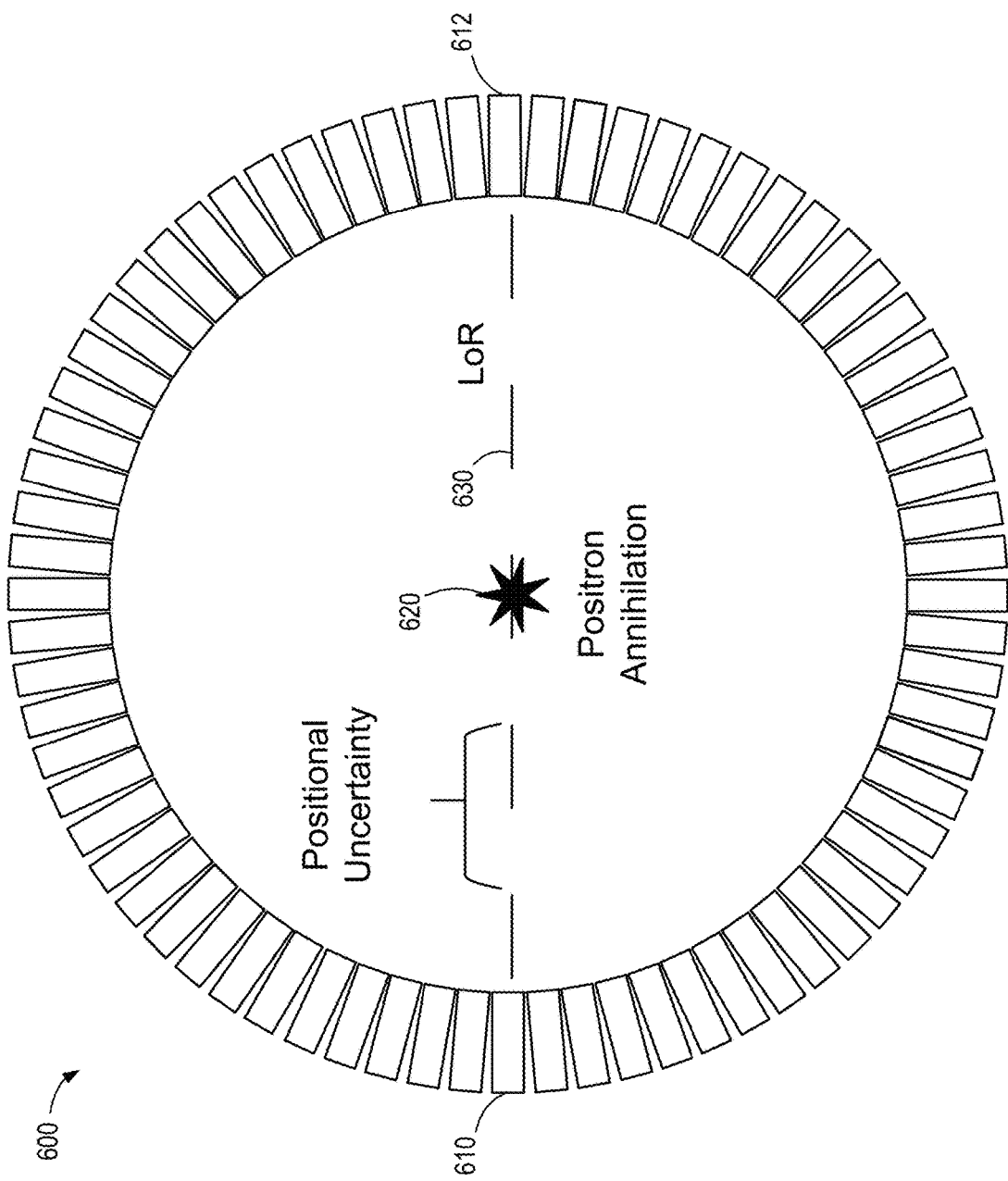
FIG. 6 illustrates a line-of-response segmented for its time and space relationship, according to one embodiment.

FIG. 6 illustrates a ring 600 of detector modules with a line-of-response 630 segmented for its time and space relationship, according to one embodiment. The line-of-response 630 corresponds to a positron annihilation 620 detected by opposing detector modules 610 and 612. According to various embodiments described herein, improved photosensor technology, configuration, placement, and/or the high-speed electronics described herein may facilitate improved measurements of the difference in the time of arrival between two detected gamma photons. Such methodology, referred to in the art as time-of-flight (ToF), enhances the ability to compute the point of origin of the positron annihilation 620 along the line-of-response 630.

For example, a 500-picosecond timing resolution enables the localization of the origin of the positron annihilation 620 along the line-of-response 630 to within about +/−7.5 centimeters, segmenting a scanner's 70-centimeter field of view, for example, into 4.68 sections (or more than +9 sections) for each line-of-response. Improvements in the localization of annihilation events reduce uncertainty, or noise, in image reconstruction, thereby improving the scanner's signal-to-noise ratio. This increase in signal-to-noise is essentially realized as an increase in sensitivity, compared to non-ToF scanners, wherein the realized sensitivity gain is proportional to the square of the signal-to-noise improvement. According to various embodiments, a PET scanner may have a timing resolution of approximately 210 picoseconds.

Various embodiments of the presently described systems and methods facilitate more accurate and precise PET data acquisition. Examples of systems and methods are described herein that reduce, and therefore improve, temporal resolution; improve position delineation for a line-of-response for a given positron annihilation event to reduce parallax error; increase sensitivity to afford better image clarity, reduce scan duration, and/or reduce radiation imaging; and/or a combination thereof.

According to various embodiments, a PET scanner system may reduce such errors by segmenting detector crystals lengthwise (e.g., into two or more crystal pieces) and/or incorporating two distinctly different crystal time-constants. For example, the use of two different time constants allows the PET scanner system to use the shape of a photodetector signal to discern which crystal absorbed an incident gamma photon's energy. In this way, the PET scanner system can determine, within a length segment of each elongated scintillation crystal, the depth at which an incident gamma photon interacted, referred to as the depth-of-interaction (DoI). Such depth-of-interaction improves position resolution and decreases noise in reconstructed images.

In some embodiments, a PET system may include a plurality of detector modules, each of which includes a two-dimensional array of elongated scintillation crystals that are segmented lengthwise into two or more sub-crystals that have two distinctly different crystal time-constants. An array of photodetectors associated with the elongated scintillation crystal detects scintillation photons originating from a scintillation event within one of the segmented volumes. The shape of the signal generated by the array of photosensors will be different based on the crystal time-constant of the segmented volume from which the scintillation photons originate. Accordingly, the system can determine depth-of-interaction information (i.e., from which segmented volume the scintillation light originated) based on the shape of a signal generated by the array of photodetectors. As previously described, depth-of-interaction information can be used to improve positional resolution and decrease noise in reconstructed images. Embodiments in which each lengthwise segmented volume in a particular scintillation crystal has a different (i.e., distinct, unique, and identifiable) crystal time-constant, the reflective material may not be positioned between adjacent segmented volumes.

According to various embodiments, a PET scanner includes one or more rings of detector modules. Each ring of detector modules includes multiple detector modules. Each detector module includes an array of elongated scintillation crystals positioned on the detector ring (e.g., a one- or two-dimensional array of elongated scintillation crystals). A distal end-face of each elongated scintillation crystal is radially oriented into the detector ring to receive a gamma photon from an annihilation event. Each elongated scintillation crystal may also include two axially oriented lateral faces, two transaxially oriented lateral faces, and a proximal end-face. Each elongated scintillation crystal may include an array of photosensors (e.g., a single photodetector or an array of photodetectors) positioned along one of the axially oriented lateral faces. The array of photosensors detects scintillation photons from scintillation events within the corresponding scintillation event.

A reflective material is positioned (e.g., as a layer or coating) on the proximal end-face, the distal end-face, the two opposing transaxially oriented lateral faces, and the other axially oriented lateral face (i.e., the axially oriented lateral face that does not have the array of photosensors) of each elongated scintillation crystal. The reflective material operates to internally reflect scintillation photons, such that all or substantially all the scintillation photons from a scintillation event within a given elongated scintillation crystal are detected by the array of photosensors associated with the given elongated scintillation crystal. Accordingly, the reflective material operates to prevent light sharing between adjacent scintillation crystals. In some embodiments, the reflective material (e.g., coating, layer, film, etc.) may be reflective in both directions, such that a single reflective material layer or coating can be shared by adjacent scintillation crystals.

In various embodiments, each elongated scintillation crystal may be shaped as an elongated N-sided polygonal prism, such as a hexagonal prism, an elongated rectangular prism, a square prism, an octagonal prism, a triangular prism, etc. The length of an elongated scintillation crystal may, for example, be between 10 millimeters and 30 millimeters, and the widths in the axial and transaxial directions may be, for example, between 2 and 10 millimeters. In various examples, the thickness of the array of photosensors may be less than 500 micrometers, and the thickness of the reflective material (e.g., coating) between adjacent elongated scintillation crystals may be less than 100 micrometers.

As described herein, each elongated scintillation crystal in a detector module may be configured for lateral readout via the array of photosensors positioned on one of the axially oriented lateral faces. In some embodiments, the array of photosensors includes a two-dimensional array of individual photodiodes, such as a two-dimensional array of single-photon avalanche diodes in a silicon photomultiplier. The two-dimensional array of individual photodiodes on the axially oriented lateral face may be used to provide distinct photosensor measurements corresponding to distinct depth ranges between the proximal and distal end-faces of each elongated scintillation crystal. In some embodiments, one of the axially oriented lateral faces of each elongated scintillation crystal in a detector module may include multiple silicon photomultipliers positioned along the length of the axially oriented lateral face.

In various examples, the PET scanning system further includes a cooling system to cool the detector modules. The PET scanning system may further include or be in communication with an imaging system connected to the detector modules to generate an image based on electronic outputs from detector modules. The diameter of the detector ring, or bore, of the PET scanning system may be greater than approximately 25 centimeters. In many embodiments, the axial bore depth of the plurality of axially aligned rings is less than the diameter of the detector ring.

Many existing computing devices and infrastructures may be used in combination with the presently described systems and methods. Some of the infrastructure that can be used with embodiments disclosed herein is already available, such as processors, microprocessors, microcontrollers, computer programming tools and techniques, digital storage media, image processor devices, imaging processing techniques, and communication links. Many of the systems, subsystems, modules, components, and the like that are described herein improve temporal resolution, improve position delineation for a given positron's line-of-response in order to reduce parallax error, increase sensitivity to afford better image clarity, reduce scan duration, and/or reduce patient radiation exposure. The systems, subsystems, modules, and components may be implemented as hardware, firmware, and/or software, as understood by those of skill in the art and in the context of the associated description thereof. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, modules, etc. that are described herein may be combined as a single system, subsystem, module, or component. Moreover, many of the systems, subsystems, components, and modules may be duplicated or further divided into discrete systems, subsystems, components, or modules to perform subtasks of those described herein. Any of the embodiments described herein may be combined with any combination of other embodiments described herein.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. Many of the illustrations are provided in a block diagram format to illustrate a general configuration and may not be drawn to scale. The right to add any described embodiment or feature to any one of the figures and/or as a new figure is explicitly reserved.

In some examples of the presently described systems and methods, each array of photosensors comprises one or more (e.g., a two-dimensional array of hundreds or thousands) high-speed diodes for the digital encoding of numerous nuclear scintillation events. A network of circuit components converts the output of the photosensors into two common digital streams. A first of the digital streams may encode high-frequency content for temporal measurements. The second digital stream may encode a lower bandwidth signal version for numerical integration, measuring nuclear energy (e.g., to calculate the total energy). The circuit may be used for nuclear pulse processing in PET or other applications that utilize digital signal processing of numerous photonic signals, demanding high temporal resolution for time-of-flight measurements, such as light detection and ranging (LIDAR).

In some examples, the array of photosensors may offer both a capacitively decoupled high-frequency signal output (referred to as a "fast signal" output) and a "slow signal" output that includes a more comprehensive but lower spectrum of frequencies. In other examples, the array of photosensors may employ only two-terminal photosensors wherein fast timing and/or energy measurements may be obtained at the same or various nodes within a biasing network of resistive, capacitive, inductive, and/or active components. In various embodiments, low-noise analog circuitry detects a low-voltage threshold crossing of the fast signal via a comparator to enable signal propagation of the signal to a high-speed analog-to-digital converter (ADC) for digital encoding. In some embodiments, low-noise analog circuitry detects a low-current or low-voltage threshold crossing of the fast signal via a comparator to enable signal propagation of the signal to a high-speed analog-to-digital converter for digital encoding.

Additionally, a comparator may be utilized for selecting a multiplexer input to enable separate digital encoding of the slow signal (or lower bandwidth). Many of the described examples provide improvements in component propagation delays and their interrelated impact upon bandwidth for successful shared digital encoding of numerous front-end photodiodes that are part of the array of photosensors of one or more scintillation crystals in a detector module of a PET scanner system.

Transmission lines are utilized that are optimized to attain a target propagation delay. Many embodiments of presently described systems and methods enable the superior determination of timing origin for nuclear scintillation events by digitally eliminating conventional analog time-walk and via spectral distortion correction and machine learning algorithms. Furthermore, the systems and methods described herein eliminate or avoid the use of application-specific analog electronics used for timing pickoff and provide for the low-noise sharing of high-speed electronics that save power consumption, thermal dissipation, packaging volume, and cost versus conventional approaches. Additional embodiments provide for the efficient thermal control or cooling of scintillator material and photosensor(s) that may provide a boost in signal-to-noise. Such nuclear scintillation event timing improvements provide profound clinical significance by, for example, reducing image noise, thereby increasing sensitivity and resulting in improved diagnostic clarity.

Figure 7:
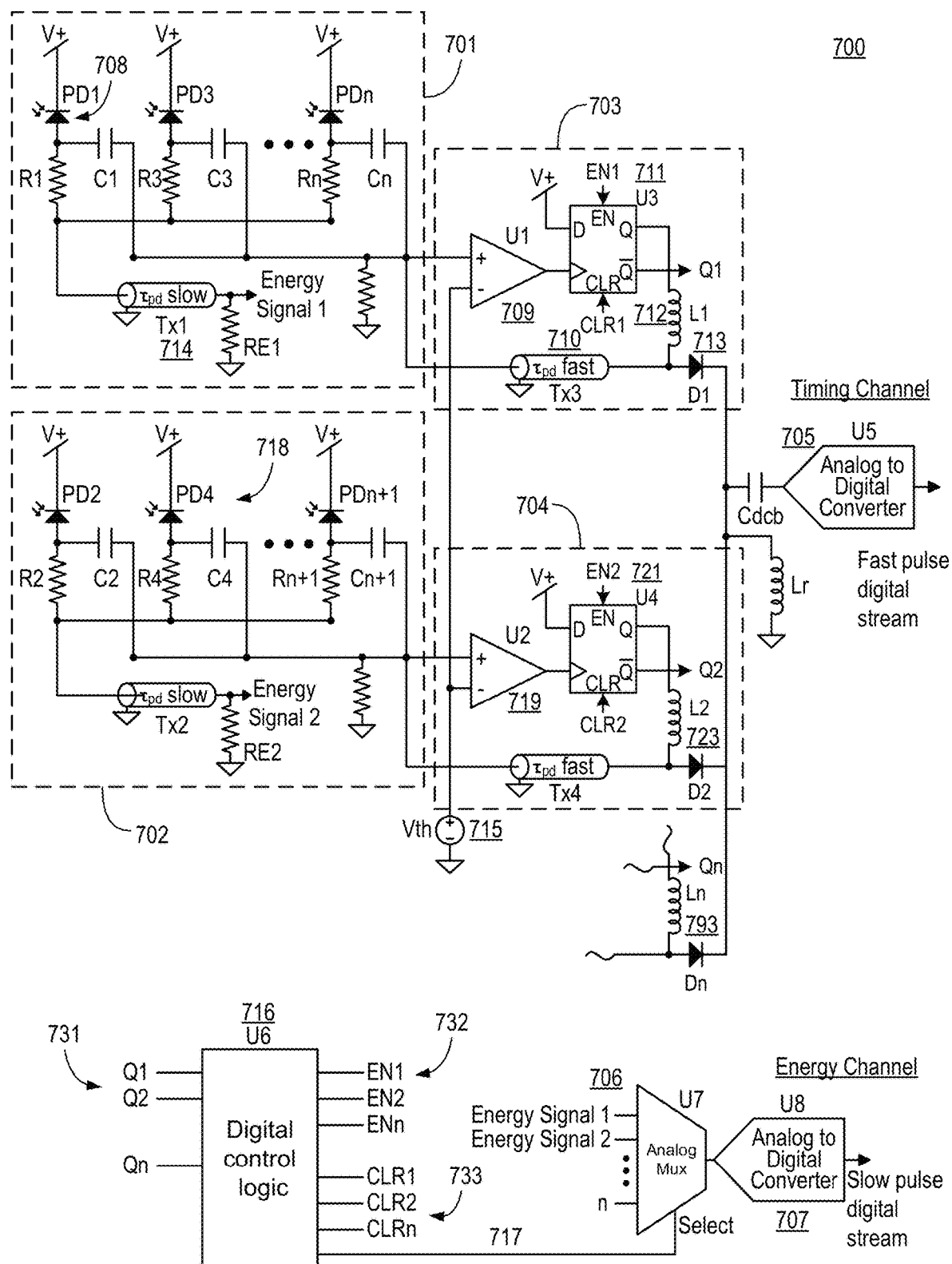
FIG. 7 is a simplified schematic of a high-speed diode network, according to one embodiment.

FIG. 7 is a simplified schematic of a high-speed diode circuit network 700, according to one embodiment. The diode circuit network 700 for photo-sensing operates to provide high bandwidth digital encoding of nuclear scintillation events. One or more photodiodes 708 (illustrated as PD1-PDn) may be reverse-biased to operate in Geiger mode. The highest bandwidth output of each photodiode 708 is capacitively decoupled and connected to comparator 709 and the fast transmission line 710. The lower bandwidth connection of the photodiode 708 is connected to the slow transmission line 714 for selective encoding by analog-to-digital converter 707 through multiplexer 706.

The comparator 709 within switch circuit block 703 compares the signal from the higher bandwidth signal against a low-voltage threshold 715, Vth (which could alternatively be a low-current threshold). The comparator 709 activates the flip-flop 711 when the signal from the higher bandwidth channel exceeds Vth. The output of the flip-flop 711 biases the output diode 713 "on" to thereby propagate the high bandwidth photodiode signal from the fast transmission line 710 for high sampling speed digital encoding by the analog-to-digital converter 705 via a capacitor (labeled Cdcb), with a path to ground via an inductor (labeled Lr).

The circuit blocks 701 and 703 are replicated in blocks 702 and 704, respectively. The output diode 713 of the circuit blocks 701 and 703 is replicated as output diode 723 of blocks 702 and 704. The circuit blocks 701 and 703 can be replicated any number of times to allow sharing of the analog-to-digital converter 705. The output diode 793 represents the nth output of n replicated circuit blocks 701 and 703 for any number of sets of photodiodes of any number of scintillation crystals in a detector module of a PET scanner system.

Digital control logic 716 ensures that only one high-speed signal propagates through any given output diode D1-Dn (713, 723-793) at one time. The control inputs 731 (Q1-Qn) identify to the control logic 716 the particular sets of the photodiode(s) 708, 718 triggered, along with its respective comparator 709, 719 and the flip-flop 711, 721. Control outputs 732 (EN1-ENn), which are ordinarily "on," signal which flip-flops 711, 721 to disable while any particular single diode is triggered and forward conducting. Upon completion of a photodiode's nuclear pulse signal's envelope, which may be predetermined by its characteristic decay constant, the control logic 716 resets any previously fired trigger switch circuit block 703, 704 via a CLR signal. The digital control logic 716 selectively pulses clear outputs 733 (CLR1-CLRn) to clear any triggered flip-flop 711, 721 to its untriggered state, thereby turning off its corresponding output diode D1-Dn (713, 723-793). Thereon or thereafter, all control outputs 732 are resumed "on," providing a ready-state for triggering upon any subsequent qualified nuclear pulse signal.

Additionally, output bus 717 of the control logic 716 is used to select a particular photodiode's lower bandwidth output, based on the trigger switch circuit inputs 731 (Q1-Qn), for propagation through multiplexer 706. As illustrated, the slow signal is propagated through the slow transmission line 714 and received as an "energy signal" input on the multiplexer 706. The energy signal selected by the output bus 717 is sent from the multiplexer 706 to the analog-to-digital converter 707 for digital encoding. The analog-to-digital converter 707 may be a relatively low sampling speed analog-to-digital converter.

The diode network 700 digitally encodes the outputs of numerous sets of photodiodes (e.g., photodiode networks), which are generally illustrated by the circuit blocks 701 and 702. The analog-to-digital converters 705 and 707 may be used to digitally encode any number of sets or photodiodes, where each array of photodiodes includes at least one photodiode. As used herein, a photosensor may include any number of photodiodes.

In some embodiments, the photodiode networks may consist of numerous photodiodes sharing a common high bandwidth output and a relatively lower bandwidth output, propagating through the fast and slow transmission lines 710 and 714, respectively. Corresponding trigger switch circuitry blocks 703 and 704 propagate, on a mutually exclusive basis, high-speed nuclear pulses for digital encoding by analog-to-digital converter 705, providing for a highly encoded signal which may be used for determining the timing of nuclear pulse origination, while multiplexer 706 and the analog-to-digital converter 707 provide a lower bandwidth encoding for use in energy discrimination of the same nuclear pulse. The higher bandwidth signal may commonly be referred to herein as the "fast" signal or "timing" signal, while the lower bandwidth signal may be referred to herein as the "slow" signal or "energy" signal.

The fast transmission line 710, labeled as Tx3 (or Tx4 in corresponding block 704), is configured to enable sufficient delay for the comparator 709 and trigger switch components (e.g., flip-flop 711, inductor 712, and output diode 713) to conduct charge by the time a forthcoming nuclear pulse signal, qualified by the threshold 715 and the comparator 709, arrives at the input of the output diode 713. Likewise, the slow transmission line 714, labeled as Tx1 (or Tx2 in corresponding block 702), is configured to enable enough delay for the trigger switch circuit block 703 (or 704) to activate the control logic 716 and the multiplexer 706 to conduct charge to fully encode the nuclear pulse signal by the analog-to-digital converter 707. The fast and slow transmission lines 710 and 714 are configured to produce sufficient signal delay to enable encoding of the entire nuclear scintillation pulse envelope. The fast and slow transmission lines 710 and 714 are also selected to possess sufficient spectral bandwidth for their respective signal content.

Figure 8A:
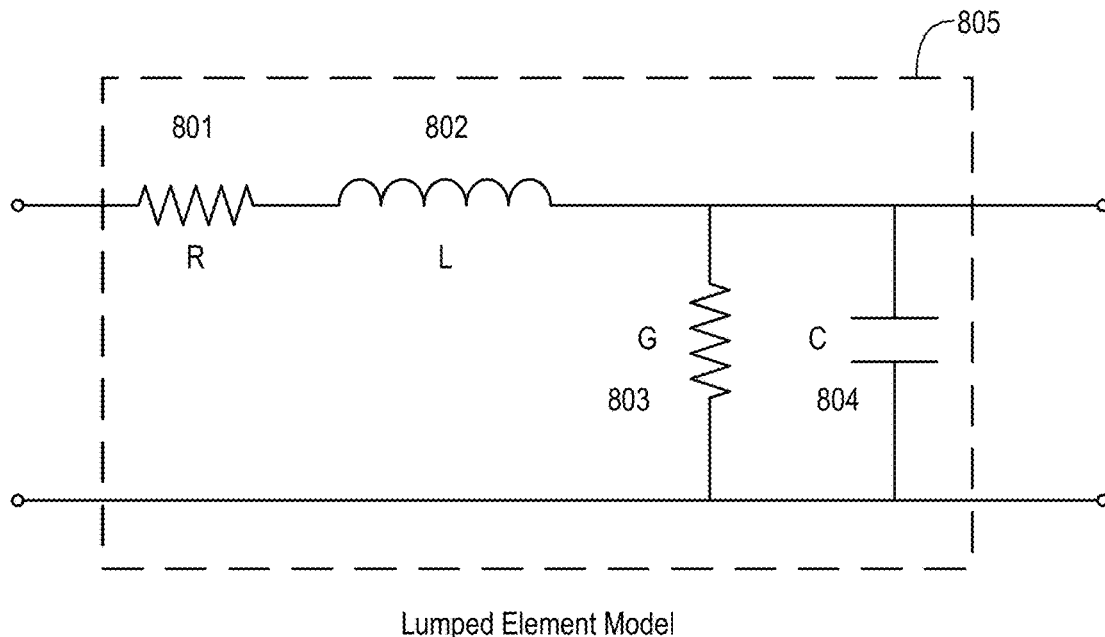
FIG. 8A is a two-port network lumped element model of a conductive transmission line, according to one embodiment.

FIG. 8A is a two-port network lumped element model 800 of a conductive transmission line, according to one embodiment. A lumped element 805 of the transmission line is modeled by discrete elements, as described below. A resistive element 801 represents the series resistance of the transmission line. An inductor element 802 represents the series inductance, or reactance, of the transmission line. A resistive element 803 represents the shunt conductance of the transmission line, and a capacitive element 804 represents the shunt capacitance, or admittance, of the transmission line.

Figure 8B:
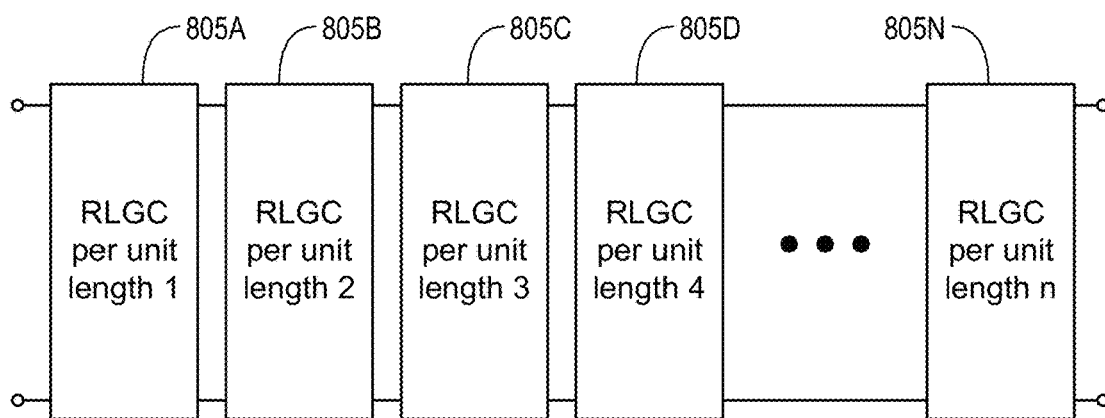
FIG. 8B illustrates a distributed model of lumped elements on a per-unit length basis, according to one embodiment.

FIG. 8B illustrates a distributed model 810 of lumped elements 805A-805N on a per-unit length basis of a transmission line, according to one embodiment. Each lumped element 805A-805N is embodied by the two-port network lumped element 805 from FIG. 8A. Relatively short transmission lines may be embodied as a single two-port lumped element 805. However, longer transmission lines are more accurately modeled as a distributed model of lumped elements 805A-805N on a per-unit length basis, where the values of the discrete elements in each lumped element 805A-805N may be the same or different from one another, as described herein and as understood in the art.

Based on a solution to the telegrapher's equations, derived by Oliver Heaviside from James Maxwell's equations, the transfer function, H ($\omega$, x), for the transmission line, commonly referred to as the propagation function, is given by:

$$H(\omega, x) = e^{-x\sqrt{(j\omega L + R)(j\omega C + G)}}$$

where:
x=length of transmission line
L=series inductance
R=series resistance
C=shunt capacitance
G=shunt conductance
and where R, L, G, and C are on a per-unit length basis.

The propagation coefficient, $\gamma(\omega)$, is obtained by the negative natural logarithm of the propagation function, yielding:

$$\gamma(\omega) = \sqrt{(R + j\omega L)(G + j\omega C)}$$

where the real components of $\gamma$ represent attenuation in nepers per unit length and the imaginary components represent the phase delay in radians per unit length. For frequencies where the reactive components' impedance or admittance greatly exceed that of their respective passive resistance or conductance, the propagation function approximately becomes:

$$\gamma(\omega) \approx \sqrt{(j\omega L)(j\omega C)} = j\omega\sqrt{LC}$$

which is a linear phase delay where the per-unit propagation velocity is given by its inverse:

$$v \approx \frac{1}{\sqrt{LC}}$$

which can be equated to the material-induced per-unit velocity:

$$v \approx \frac{1}{\sqrt{LC}} = \frac{c}{\sqrt{\varepsilon_r \mu_r}}$$

where:
$\varepsilon_r$=relative permittivity
$\mu_r$=relative permeability
and where the propagation delay is given by the inverse of the line's signal velocity.

The impedance of the transmission line is given by the square-root of the ratio of series line resistance and impedance to the shunt conductance and admittance:

$$Z(\omega) = \sqrt{\frac{(R + j\omega L)}{(G + j\omega C)}}$$

and, for frequencies where the per-unit reactive impedance and admittance significantly exceeds the per-unit passive resistance and conductance, the characteristic impedance simply becomes the square-root of the ratio of inductance to capacitance for all frequencies therebeyond and, therefore, theoretically appears purely resistive.

For conductive transmission lines, where the line's overall propagation delay is much shorter than its input signal's rise- or fall-time, then such mode of operation is commonly referred to as the lumped-element region, which can be modeled by two-port network lumped element model 800. The lumped-element region may be considered when:

$$|x \cdot \gamma(\omega)| < 1/4$$

where x is the transmission line's length and γ (gamma) is the propagation coefficient.

Transmission lines operating at lengths beyond the lumped-element boundary but at relatively low frequencies (e.g., <1 MHz;) enter into the RC region. In this region of operation, the inductance reactance is negligible, yet the series resistance remains significant, especially when considered in combination with the overall capacitance of the line. In this mode, the bandwidth of the line is essentially dominated by a single pole response, limiting signal bandwidth to:

$$f_{3db} = \frac{1}{2\pi RC}$$

where $f_{3db}$ represents the corner of the low-pass frequency response.

Beyond this region of frequencies, and again for lengths greater than the lumped-element region, the transmission line operates in the LC region (e.g., 1 MHz<f<10 MHz), where the series inductive reactance dominates the line's resistance as well as the capacitive admittance over that of the line's shunt conductance. On a more practical basis, nonlinear effects occur at frequencies beyond the LC region, including alternating current (AC) skin-effect, which attenuates the line's signal and limits bandwidth. Furthermore, for commonly used materials and construction, and at frequencies approximately 1 GHz and above, dielectric losses become significant.

The per-unit propagation delay of a conductive transmission line is dictated by the square-root of the product of the per-unit inductance and capacitance. The longer the line, the greater the delay. Ideally, at least theoretically, a properly terminated transmission line appears to a signal transmitter as merely resistive at moderate frequencies and above. In reality, losses occur at higher frequencies arising from the skin-effect and dielectric losses. These losses effectively limit bandwidth and result in group delay. Accordingly, it is understood that conductive transmission line delay and bandwidth are inversely related. This inverse relationship presents a quandary for the design and implementation of the fast transmission line 710, where delays beyond two nanoseconds are desirable to afford the ensuing propagation delays resulting from the implementation of elements 709, 711, 712, and 713.

The output diode 713 is activated in advance of a qualified propagating signal (e.g., when the photosensor signal exceeds the threshold, Vin, 715) arriving from the fast transmission line 710 (or another fast delay element) to the input of output diode 713. Concurrently, the bandwidth of the fast transmission line 710 (or another fast delay element) is sufficiently high in order to preserve the fast-rising, high-bandwidth signal(s) from photosensor(s) 708 necessary for timing resolution. Likewise, slow transmission line 714 possesses sufficient bandwidth while also providing sufficient propagation delay to allow the trigger switch circuit block 703, control logic 716, and multiplexer 706 to activate and enable conduction in time for the corresponding energy signal to be completely digitally encoded by analog-to-digital converter 707.

Figure 9:
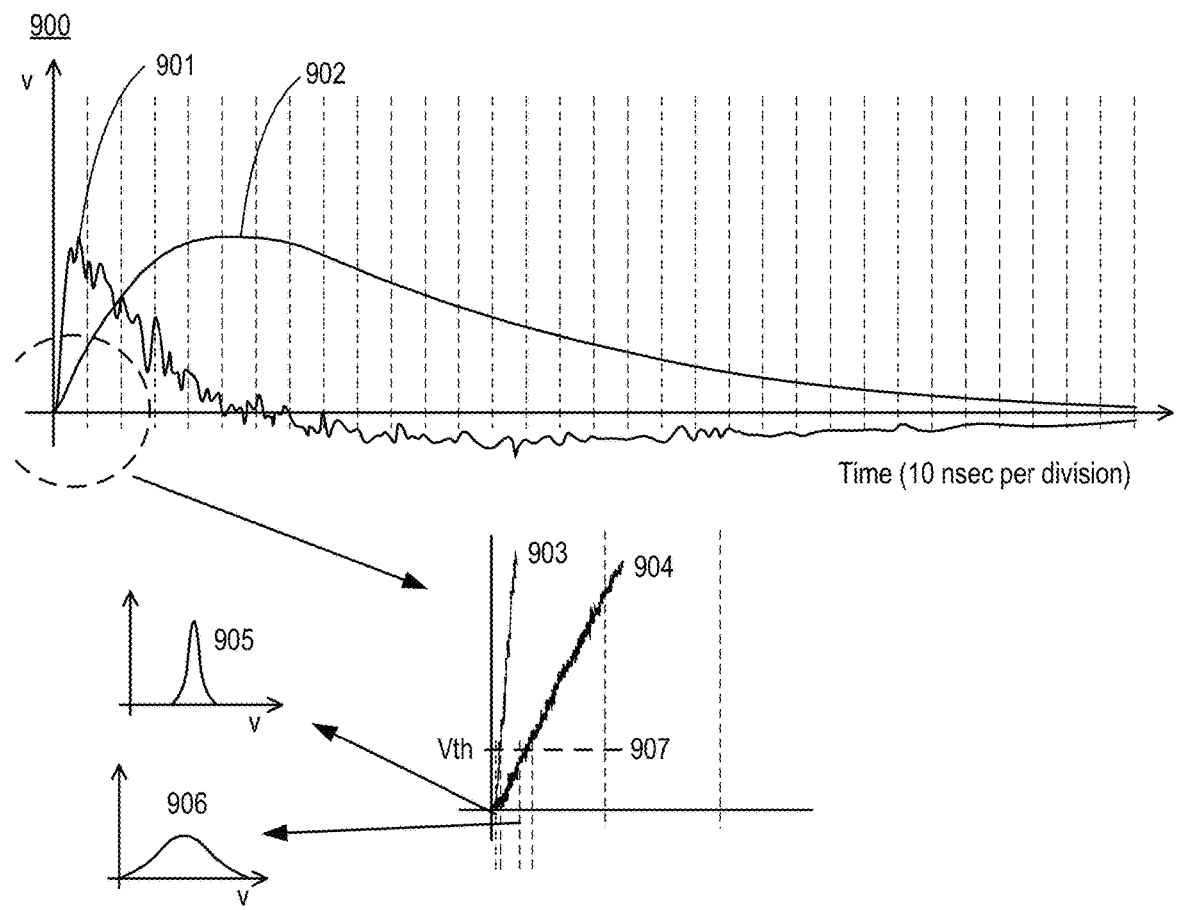
FIG. 9 illustrates a graph of the time-domain of two nuclear pulse signals, according to one embodiment.

FIG. 9 illustrates a time-domain graph 900 of two nuclear pulse signals, according to one embodiment. Each of the illustrated silicon photomultiplier photosensor signals 901 and 902 arises from a nuclear particle's deposition into a coupled scintillator. Signal 901 is typical of a capacitively decoupled (i.e., high-pass filtered) silicon photomultiplier avalanche diode signal, referred to herein as the fast signal or timing signal of a detector module. Signal 902 is representative of a low-pass filtered version of the same avalanche diode signal, referred to herein as the slow signal or energy signal of the detector module. Provided the decay constant of the slow signal 902 is much slower than the decay constant of the elongated scintillation crystal ($\tau_{low\text{-}pass} > 5 \cdot \tau_{scint}$), then the maximum peak of the signal 902 will approximate the total charge collected from the photosensor, Q, divided by the circuit's capacitance, C. The total charge collected, in this case, will be proportional to the energy deposited into the scintillator. In an alternative embodiment, a circuit or processing device may be used to integrate the unfiltered photosensor signal to obtain a proportional energy measurement.

A detector module may use the fast timing signal 901 to determine the timing of a nuclear scintillation genesis event (also referred to herein as original or initial). The fast signal 901 and slow signal 902 are reproduced in greater detail by signals 903 and 904, respectively, illustrating a white, or wideband, thermal noise thereon, which possesses an approximate Gaussian amplitude distribution. This, as well as other noise sources, introduces timing uncertainty when using voltage discrimination, illustrated by voltage level threshold 907. The use of voltage level threshold 907 to identify the timing of a signal is referred to as "timing-pickoff."

Using voltage discrimination for signal 904 (corresponding to the slow signal 902) results in timing uncertainty. The Gaussian noise of the slow signal 902 results in a Gaussian timing jitter histogram with the timing uncertainty graphed as 906. This effect is pronounced since the timing pickoff of the slow-rising signal (i.e., the shallow slope) is more susceptible to the vertical amplitude effects of the noise, referred to herein as the slope-to-noise consideration. However, the fast signal 903 (corresponding to the fast signal 901) is less susceptible, given its fast-rising signal (i.e., the steep slope). Comparing the fast signal 903 to the voltage level threshold 907 (e.g., a threshold value) results in a narrower timing distribution, graphed as 905. Hence, the impact on temporal resolution resulting from noise upon fast signals 901 and 903 is reduced, or better, compared to the impact on the temporal resolution from noise upon the slow signals 902 and 904.

Accordingly, various embodiments of the presently described systems and methods utilize a timing circuit to analyze a fast, capacitively decoupled output signal of one or more photodiodes to determine timing information of a scintillation event (e.g., a timing-pickoff value). Similarly, various embodiments of the presently described systems and methods utilize a separate energy circuit to determine the energy information (e.g., a total energy value) of a scintillation event. It is appreciated that some circuit components may be shared between the timing circuit and the energy circuit. In some embodiments, each elongated scintillation crystal in a detector module may be associated with a dedicated energy circuit and a dedicated timing circuit, including dedicated analog-to-digital converters. In other embodiments, a plurality of scintillation crystals may share energy circuits and timing circuits and/or share analog-to-digital converters. Each energy circuit and timing circuit may include multiple channels of discrete electronic components, where each channel is dedicated to one or more scintillation crystals and where the channels share the same analog-to-digital converter.

Figure 10:
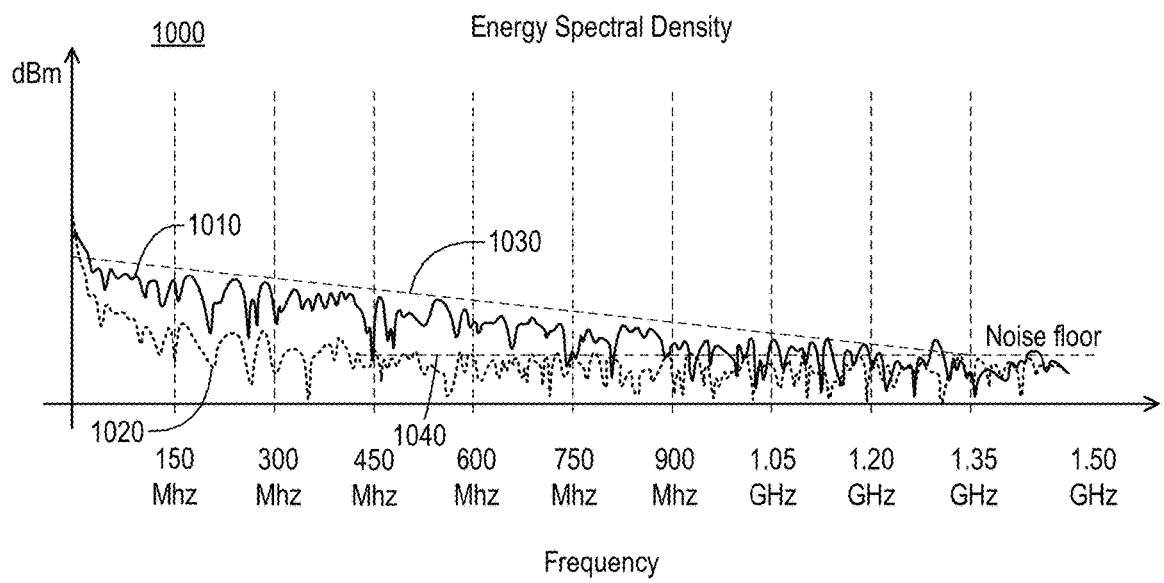
FIG. 10 illustrates a graph of the energy spectral density of the two nuclear pulse signals of FIG. 9, according to one embodiment.

FIG. 10 illustrates a graph 1000 of the energy spectral density of the two nuclear pulse signals of FIG. 9 in the frequency domain, according to one embodiment. The energy spectral density of signal 901 of FIG. 9 is illustrated by graph line 1010. The signal 902 of FIG. 9 is illustrated as graph line 1020. As can be seen, the frequency spectrum of slow signal 902 is generally cut-off around 400 MHz, where the trend line 1040 is the approximate level of the noise floor therebeyond. However, for signal 901, the corresponding high-frequency spectrum of graph line 1010 is more pronounced, with the trend line 1030 extending up to approximately 1.2 GHz before nearing the noise floor. For a single-pole low-pass filter circuit, the 10-90% rise time of a signal acting upon the circuit can be derived and shown as proportional to the circuit's time constant by the following relationship:

$$t_r = \frac{2 \ln 3}{2\pi f_{3db}} \approx \frac{0.35}{BW}$$

where:

$\tau_r$ = a step signal's 10 to 90% rise time, and $f_{3db}$ = the 3 db bandwidth (BW) of the circuit.

In various embodiments, the high-frequency content is preserved to produce a steeper timing signal than would otherwise be attainable. In consideration of the slope-to-noise ratio and the slope limitations of the timing signal due to the bandwidth of the transmission lines, some embodiments of the system optimally preserve a wide bandwidth timing channel to improve the timing-pickoff with reduced timing jitter (e.g., uncertainty).

As such, returning to FIG. 7, the fast transmission line 710 may be selected to have a minimum or shortest length practical to reduce high-frequency attenuation while still producing sufficient delay necessary for the remaining circuitry elements in the box for block 703 (e.g., comparator 709, flip flop 711, inductor 712, and diode 713) to activate in time for encoding the capacitively decoupled "fast signal" from the photodiodes 708 by the analog-to-digital converter 705. Consequently, propagation delays for comparator 709, flip-flop 711, bias-tee inductor 712, and the output diode 713 are selected to operate as quickly as possible to facilitate a shorter propagation delay in the fast transmission line 710 (e.g., fast transmission line 710 is physically shorter). Bias-tee inductor 712, for instance, may be designed for high-speed switching utilizing low-loss, low relative permeability cores, such as an air core, and present a low inductance, such as less than 100 nanohenries, for example, to facilitate fast biasing of diode 713. In contrast, the slow-rising energy signal from the photodiodes 708 may employ a much longer slow transmission line 714, resulting in more propagation delay, given that the high-frequency content is considerably lower than that of the faster timing signal. For example, the delay of the slow transmission line 714 may be more than twice as long as the delay of the fast transmission line 710. In some embodiments, the delay of the slow transmission line 714 may be five times as long, or even longer, than the delay of the fast transmission line 710

Given the significance of the high-frequency spectrum of timing signals, a special high-frequency, fast-switching diode, such as a PIN diode, utilizing an intrinsic semiconductor region with high-level injection, may be utilized to reduce the delay required of the fast transmission line 710. For small signals at high frequencies, a forward-biased PIN diode favorably behaves as a current-controlled variable resistor providing resistances of less than 100 ohms at 1 GHz and for small currents such as roughly ten milliamperes or resistances even less than ten ohms in some cases. A relatively large cross-sectional intrinsic area reduces a PIN diode's forward-conducting (i.e., "on") resistance, thereby improving (i.e., reducing) insertion loss, yet undesirably increasing junction capacitance in the reverse bias state (i.e., "off"). Increasing the thickness of the intrinsic region between the neighboring P and N regions reduces capacitance while also increasing reverse bias breakdown, both favorable for improving isolation in the "off" state. However, a thicker intrinsic region undesirably increases switching time, thereby requiring a correspondingly longer delay from the fast transmission line 710. In various embodiments, low junction capacitance improves the operation of circuit blocks 703 and 704 (e.g., for optimal operation) in the untriggered state in order to isolate photosensor noise from circuit blocks 701 and 702 from feeding through to the common node existing at the input of analog-to-digital converter 705.

According to various embodiments, these tradeoffs are considered and carefully accounted for in the design and selection of the fast transmission line 710 (or other delay element) and the output diode 713 to achieve an acceptable timing resolution, or even an optimized timing resolution. The use of high-energy bandgap semiconductors, with energies greater than 1.3 eV (at 300° K), such as that provided by gallium arsenide, increases reverse bias breakdown voltage over silicon, thereby allowing thinner intrinsic regions to provide faster switching times. Furthermore, gallium arsenide provides for faster carrier lifetimes, generally less than ten nanoseconds nominally at small currents (e.g., 1-20 milliamperes) and, in some cases, faster than five nanoseconds nominally, enabling quicker removal of charge from the intrinsic region.

In some cases, the turn "on" (i.e., forward-conducting mode) time for a PIN diode may be faster than the turn "off" time (i.e., reverse bias configuration) due to the difference in injection versus removal of charge carriers. Such characteristics of PIN diodes are acceptable, in some embodiments, given the unique nature of PET signals. This slow turn-off time allowance is afforded by the relatively infrequent nature of PET singles events on a typical block basis, whereby each event typically takes a long duration for decay (e.g., approximately 200 nanoseconds for Lutetium Oxyorthosilicate based scintillators), thus enabling several orders of turn-off duration, relative to turn-on, to be tolerated in this unique case (i.e., a fast turn-on and slow turn-off for PET singles events). Desirable characteristics for a PIN diode used to fulfill output diode 713 include low insertion loss (e.g., <1 dB) and high turn-off isolation (e.g., >15 dB) for frequencies commonly encountered from a gamma scintillation photodiode signal, such as those depicted by FIG. 10, for example, and up to several gigahertz (e.g., 4 GHZ) or more. High turn-off isolation is accomplished using relatively low junction capacitances of less than, for example, one hundred and fifty (150) femtofarads at these frequencies. The diode's cathode may optionally be offset negatively to reduce the threshold voltage that causes the diode to operate in an on-state (e.g., for forward active/conducting). Fast conducting, low resistance, and ultra-low capacitance gallium arsenide (GaAs) or aluminum gallium arsenide (AlGaAs) diodes may be used to achieve the target fast switching times for the target bandwidth of the transmission line 710. A target rise time for the fast signal from the photodiodes 708 may be, for example, less than one nanosecond under expected PET scanner noise levels to achieve precise timing. A target bandwidth for the transmission line 710 may be, for example, greater than 350 MHz at full length.

Analog-to-digital converters 705 and 707 may sample at the Nyquist rate (i.e., half the period of the highest bandwidth of the respective input signals) or greater to encode the timing and energy signals, respectively. The sampling rate may be selected in accordance with the Nyquist-Shannon sampling theorem. Alternatively, the analog-to-digital converter conversion rate may be chosen in terms of the propagation of uncertainty to achieve optimal timing-pickoff wherein one or more data points of a signal's decay curve may be utilized to minimize the propagation of uncertainty given by:

$$\sigma_f^2 \sum_i^n a_i^2 \sigma_i^2 + \sum_i^n \sum_{j(j \neq i)}^n a_i a_j \rho_{ij} \sigma_i \sigma_j.$$

In this case, each datapoint has an uncertainty of $\sigma$ which is also correlated to other datapoints by the correlation coefficient, $\rho$. The system may utilize the equation to reduce or minimize the uncertainty for timing-pickoff. The correlation coefficient may further be given by the instrument response function.

The specific components and circuit designs provided herein are merely examples of possible embodiments. Those skilled in the art will appreciate that the general concepts may be accomplished with other circuits, components, and techniques to achieve the same or similar results. For example, the slow-energy analog-to-digital converter 707 may be eliminated, and the signal from the high-speed analog-to-digital converter 705 may also be digitally integrated to determine the total energy of the signal. Furthermore, the trigger circuit 703 could be implemented using alternative components, such as with a two-stage comparator with an RC delay circuit therebetween, since the time constant, and therefore the signal envelope, of the scintillator is uniquely known. Additionally, switch elements 712 (shown as an inductive element) and output diode 713 may alternatively be implemented with a transistor (e.g., with a common-base or common-gate) and operating in an open-drain configuration. Even further, fast and slow transmission lines 710 and 714, respectively, may be implemented optically by the use of fiber optics or other light guides. Photodiodes 708 may also be configured differently, with a pull-up resistor connected to the cathode and the fast signal capacitively decoupled therefrom while still optionally retaining an anode resistor for low-frequency energy signal detection. As a further alternative, the anode of the photodiode may be directly connected to the input of a low input-impedance transimpedance amplifier.

Figure 11:
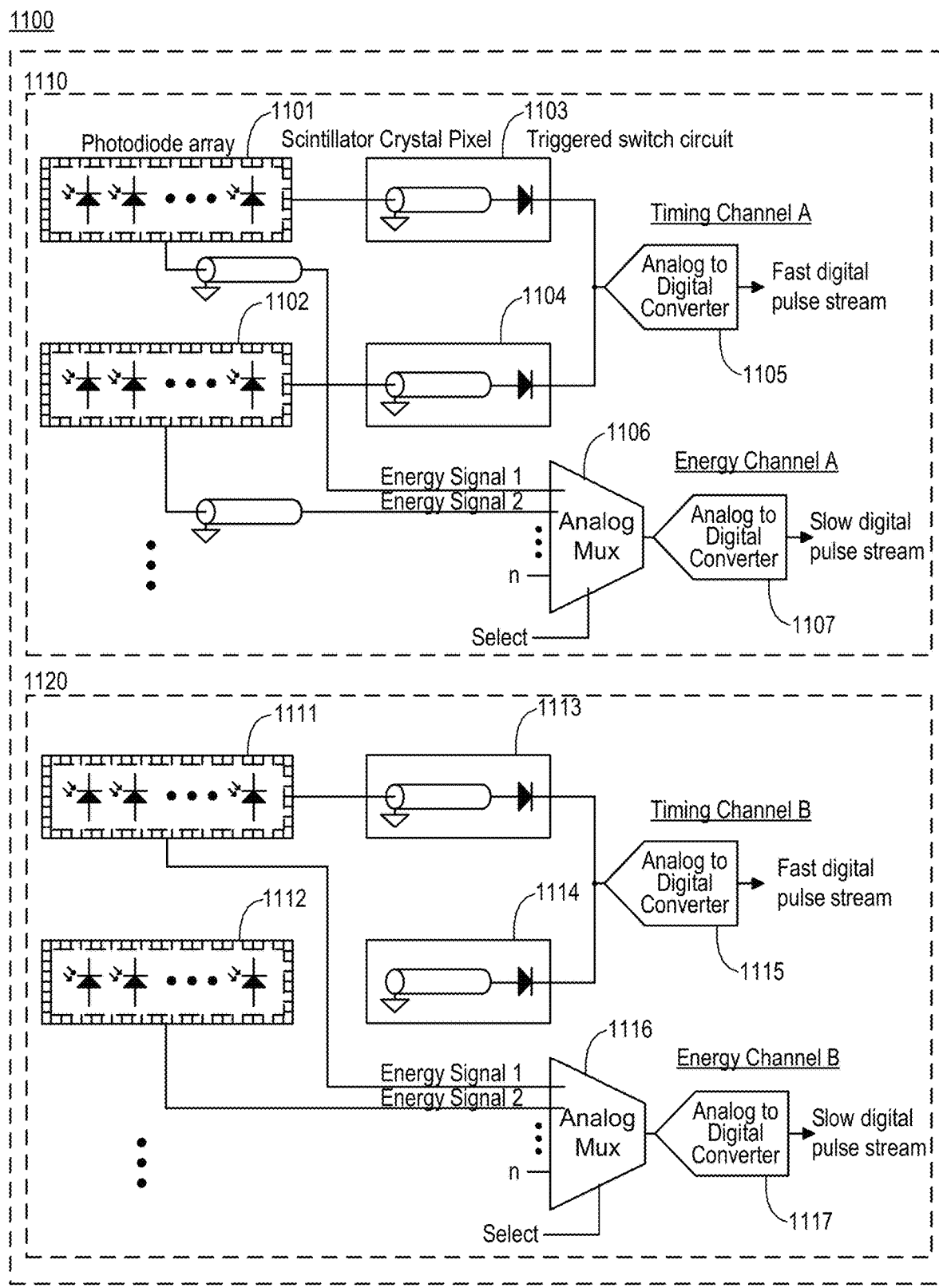
FIG. 11 is a hierarchical block diagram of a high-speed diode network, according to one embodiment.

FIG. 11 is a hierarchical block diagram of high-speed diode network 1100, according to one embodiment. As described herein, a gamma radiation detector module may include an array of photosensors associated with each elongated scintillation crystal. The array of photosensors may include any number of photodiodes arranged in, for example, a photodiode array (e.g., one or more single photon avalanche photodiodes or silicon photomultipliers). The illustrated diagram includes two electronic processing channels 1110 and 1120. The first electronic processing channel 1110 is associated with a first array of photodiodes, including the illustrated first and second arrays of photodiodes 1101 and 1102. The second electronic processing channel 1120 is associated with a second array of photodiodes, including the illustrated third and fourth photodiode arrays 1111 and 1112.

According to various embodiments, a processing circuit associated with a detector module includes two processing channels to ensure that signals from adjacent scintillation crystals can be processed at the same time. However, it is appreciated that the processing circuit of a detector module can include any number of channels that share any number of analog-to-digital converters. Each channel in an N-channel processing circuit may be associated with any number of adjacent or non-adjacent scintillation crystals in a block of scintillation crystals of a detector module.

In the illustrated example, the detector module may include the single high-speed diode network 1100 with two electronic processing channels 1110 and 1120. Half of the elongated scintillation crystals in the detector module (e.g., every other one) may be associated with the first electronic processing channel 1110. More specifically, the photodiodes associated with half of the elongated scintillation crystals in the detector module are connected to the first electronic processing channel 1110 and share a single fast-timing analog-to-digital converter 1105 and a single slow or energy analog-to-digital converter 1107.

Accordingly, the first electronic processing channel 1110 may be associated with any number of photodiode arrays, including the illustrated first photodiode array 1101 and the second photodiode array 1102. The photodiode arrays 1101 and 1102 may have their own triggered switch circuits 1103 and 1104 and/or share a single triggered switch circuit. The triggered switch circuits 1103 and 1104 (or shared single triggered switch circuit) may, for example, be embodied as described in conjunction with FIG. 7 and/or according to the various alternative embodiments described herein. A multiplexor 1106 is used to select between the various photodiode arrays, including photodiode arrays 1101 and 1102, for the energy signal encoding by the energy analog-to-digital converter 1107.

The arrays of photodiodes of the other half of the elongated scintillation crystals in the detector module may be associated with the second electronic processing channel 1120. These arrays of photodiodes share a single fast-timing analog-to-digital converter 1115 and a single slow or energy analog-to-digital converter 1117. The second electronic processing channel 1120 may be associated with any number of photodiode arrays, including the illustrated third photodiode array 1111 and the fourth photodiode array 1112. The photodiode arrays 1111 and 1112 may have their own triggered switch circuits 1113 and 1114 and/or share a single triggered switch circuit. The triggered switch circuits 1113 and 1114 (or shared single triggered switch circuit) may, for example, be embodied as described in conjunction with FIG. 7 and/or according to the various alternative embodiments described herein. A multiplexor 1116 is used to select between the various photodiode arrays, including photodiode arrays 1111 and 1112, for the energy signal encoding by the energy analog-to-digital converter 1117. The digital control logic, as described in conjunction with FIG. 7 or variations thereof may be used to control the multiplexors 1106 and 1116 and/or the diode bias in the triggered switch circuits 1103, 1104, 1113, and 1114.

As described in greater detail herein with respect to other figures, portions of (or all) of the electronic processing channels 1110 and 1120 for a particular scintillation crystal in a detector module may be integrated within an interposer. The interposer may be positioned on the backside of the photosensors on a lateral face of an elongated scintillation crystal. In some embodiments, each elongated scintillation crystal is associated with a distinct interposer. In other embodiments, multiple elongated scintillation crystals may share a single interposer. An interposer associated with one or more elongated scintillation crystals may, for example, include the bias and signal shaping circuitry of the circuit block 701, according to any of the various embodiments described herein.

In other embodiments, additional portions of the high-speed diode circuit network 700 may be incorporated into the interposer associated with one or more of the elongated scintillation crystals. An interposer may include and/or be connected to a timing circuit and an energy circuit, according to any of the various embodiments described herein. The energy circuit may, for example, include a first analog-to-digital converter, a multiplexer to select between output signals of the photodiodes for conversion by the first analog-to-digital converter, a signal delay transmission line to connect the photodiodes to the multiplexer, and digital control logic to control the multiplexer selection of output signals of the photodiodes. The timing circuit may include, for example, a second analog-to-digital converter for high-speed digital encoding of an output signal of each photodiode, a flip-flop, or other triggering component, to selectively trigger encoding by the second analog-to-digital converter, and a comparator to compare the output signals of each photodiode to a threshold value.

Figure 12:
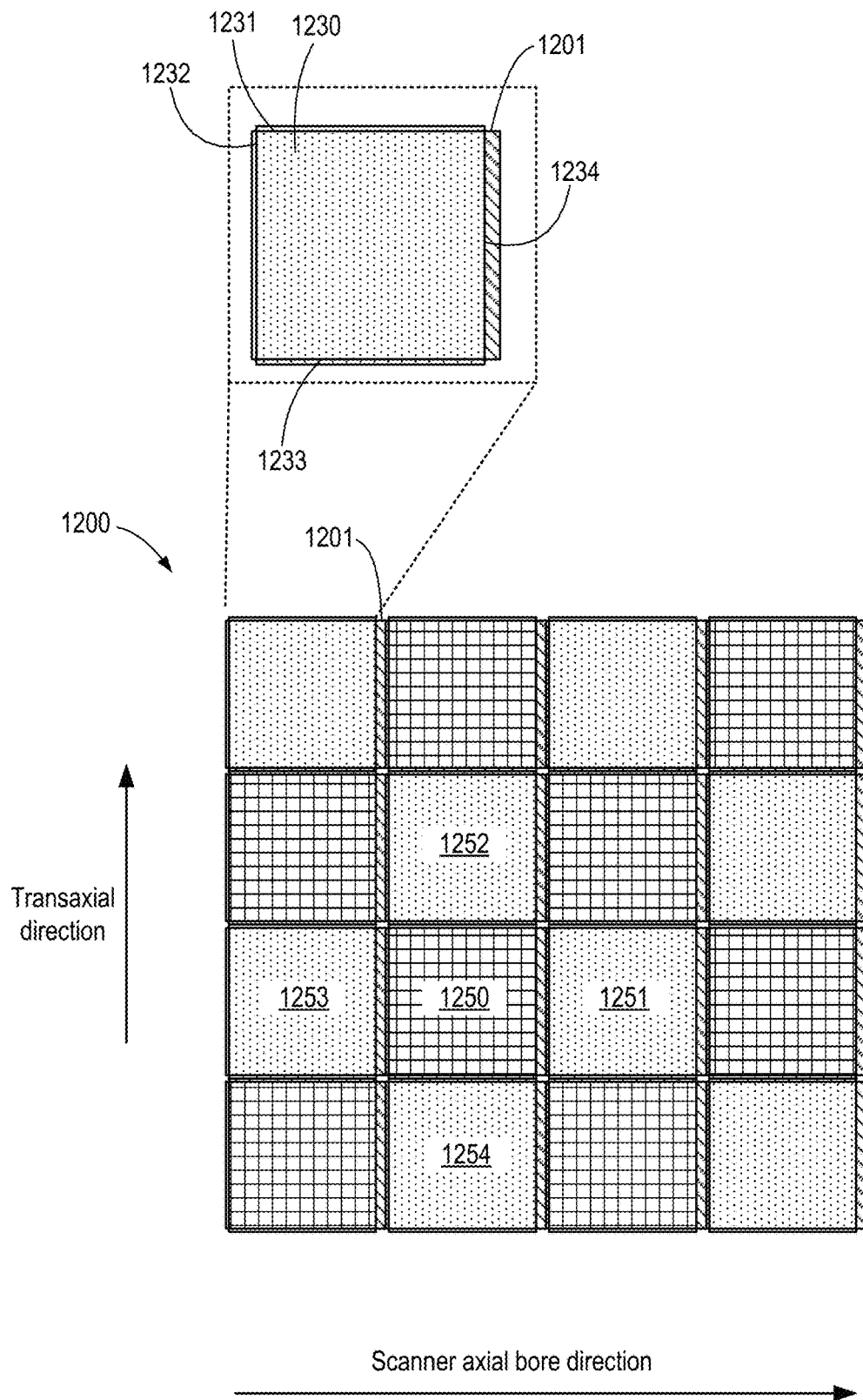
FIG. 12 illustrates a detector module with a block of elongated scintillation crystals arranged in a two-dimensional array with arrays of photosensors for lateral photosensor readout, according to one embodiment.

FIG. 12 illustrates a block of scintillation crystals 1200 arranged in a two-dimensional array, according to one embodiment. The illustrated view shows the distal end-faces faces of the elongated scintillation crystals. As illustrated in the expanded view of the upper left elongated scintillation crystal, each elongated scintillation crystal includes a reflective material as a layer or coating applied to a distal end-face 1230, transaxially oriented lateral faces 1231 and 1233, and a first axially oriented face 1232. The reflective material is also positioned on a proximal end-face (not shown). In some embodiments, the reflective material is a thermally conductive reflective material, such as, but not limited to, one or more of aluminum, magnesium, silver, stainless steel, and/or combinations thereof.

An array of photosensors 1201 (e.g., one or more arrays of photodiodes) are positioned along the opposing, second axially oriented face 1234, which is not coated with the reflective material. Accordingly, scintillation photons from a scintillation event within one of the elongated scintillation crystals are reflected internally within the elongated scintillation crystal until it is received by a laterally positioned photosensor. The reflective material prevents light sharing between adjacent crystals in a two-dimensional array of elongated scintillation crystals. The simplified illustration includes an array of 16 scintillation crystals. However, it is appreciated that the two-dimensional array of elongated scintillation crystals may include M elongated scintillation crystals in an axial direction of a detector ring and N elongated scintillation crystals in a transaxial direction of the detector ring, where M and N are each an integer value.

The elongated scintillation crystals in the two-dimensional array are arranged seamlessly such that each elongated scintillation crystal, its reflective layers/coatings, and its photosensor(s) are abutted against each other. Alternating shading is used for adjacent elongated scintillation crystals to represent the electronics processing channel associated with each of the elongated scintillation crystals in the two-dimensional array. In the illustrated embodiment, the elongated scintillation crystals illustrated with a dotted fill pattern may utilize a first electronics processing channel (e.g., electronics processing channel 1110 of FIG. 11). The elongated scintillation crystals illustrated with the cross-hatch fill pattern may utilize a second electronics processing channel (e.g., electronics processing channel 1120 of FIG. 11). In this configuration, inter-crystal scatter radiation of a gamma photon, which may partially deposit energy into one crystal and then deposit the remainder of its energy into an adjacent crystal, may be processed without otherwise being discarded due to the deadtime of a single processing channel per block.

While reflective materials may be thin (e.g., as a thin panel, deposited layer, applied film, coating, etc.) relative to the size of each elongated scintillation crystal, the photodiode(s) thickness may be substantially thicker. Such thickness from reflective materials and sensors consumes space between crystals, thereby reducing the scintillator area (and volume) compared to the same geometry block detector without lateral side-facing photodetectors and reflective coatings. The percent ratio of the scintillator area on the radiation face (the illustrated distal end-face) to a defined block area is referred to herein as a block's fill-factor. The lower the fill-factor, the less sensitive the detector. Minimizing the thickness of the reflective material and/or the thickness of the laterally positioned (e.g., laterally mounted, laterally integrated, and/or otherwise laterally placed) photosensors leads to a higher fill-factor.

Photosensor thicknesses under 400 µm are attained by coupling photosensors, which may be comprised of bare silicon sensors, to a scintillation crystal utilizing micro-lead frame packaging (also referred to as flat no-leads) or wafer-scale packaging, optionally employing through-silicon-vias, and electrically bonded to flexible polyimide printed circuit board substrates, or similar materials. The bonding or coupling of photosensors to the lateral face of an elongated scintillation crystal may be achieved via the use of an optical couplant, or grease, such as silicone grease or transparent epoxies, which aid in optical transduction efficiency and may additionally serve as a glue to aid in manufacturing and/or increase durability. Such coupling between scintillation crystal, couplant material, and/or photosensors may be photonically optimized by selecting materials within a narrow range of refractive indices to maximize the critical angle for reflection, thereby providing efficient photonic coupling with low reflection. For lutetium oxyorthosilicate (LSO), the refractive index is approximately 1.82. For bismuth germanate (BGO), the refractive index is about 2.15, and for perovskites, the refractive index ranges from about 2.0 to 2.3.

The elongated scintillation crystal and/or photosensor surface areas may also be treated, such as by polishing or roughening to enhance photonic transfer. Bonding between silicon packaging and interposers and/or printed circuit boards may be achieved through the use of solder spheres, conductive amalgam pastes, conductive epoxies, ultrasonic welds, etc. The use of these techniques allows for fill-factors above 85% and even above 88% for various sizes of scintillation crystals having elongated rectangular prism shapes.

In some instances, a semiconductor wafer support material, such as glass, is utilized during photosensor fabrication. The glass or other support material may be adhered to the photosensitive face of the wafer. Such glass, or other transparent or translucent material, may also be desirable for its optical properties used during photosensing. The glass or translucent material may be thinned to achieve optimal (increased) fill-factor, for example, where the transparent or translucent optical material may be thinner than the finished semiconductor photosensor. Alternatively, a scintillator material may be utilized instead of glass or other transparent or translucent material as a wafer support material.

For scintillation crystals with lateral-facing photosensors employing one or more lateral-facing photodiodes, there exists an optimum for PET. Scintillators, such as BGO or LSO, for example, generally exhibit a double-exponential response, modeling a scintillator's finite-time necessary to initially populate luminescent states, followed thereafter by fluorescence decay. The overall shape of the response may generally be modeled as:

$$I = I_0 \left( e^{\frac{-t}{\tau_r}} - e^{\frac{-t}{\tau_f}} \right)$$

where the time constants $\tau_{r}$ corresponds to the typically fast population of luminescence states while $\tau_{f}$ models the typically slower light decay.

Light output (e.g., in the released quantity of photons, N) is directly proportional to the energy absorbed by a scintillator. For instance, LSO emits approximately 25,000 photons per mega-electron-volt (MeV) absorbed with a decay time constant ($\tau_{f}$) of roughly 47 nanoseconds (ns). The photonic output's statistical uncertainty, or sample variance, is approximately equal to the square-root of the number of measured photons. Since the double exponential response results in a specific peaking time, increased light output results in a steeper signal front (i.e., rise-time), regardless of amplitude. Correspondingly, the timing uncertainty, or jitter, is inversely proportional to a scintillator's photosensor(s) signal amplitude, as generally depicted in the graph 900, and hence:

$$t_{jitter} \propto \frac{1}{\sqrt{N}}$$

whereby timing jitter, $t_{jitter}$, is reduced by inverse proportion to the square-root of the number of measured photons, N.

For PET employing time-of-flight, a reduction in timing uncertainty reduces image noise, thereby increasing an image's signal-to-noise ratio (SNR) by $$SNR_{ToF} = \sqrt{\frac{2D}{c \cdot t_{jitter}}} SNR_{non-ToF}$$

where:
D=effective diameter of the object being imaged,
c=speed of light, and
$SNR_{non-ToF}$=the signal-to-noise ratio without time-of-flight applied.

The SNR of a PET scanner is proportional to the square-root of its noise-effective-counts (NEC). Accordingly, a gain in SNR is comparable to a gain in coincident events. Hence, as previously described, the sensitivity of a PET scanner is therefore boosted in proportion to the square of SNR improvement. However, fill-factor losses decrease sensitivity. Since PET images are constructed by lines of coincident response (i.e., from two detectors), any fill-factor loss suffers by the square of the fill-factor. Hence, for example, a fill-factor of 90% would result in a PET sensitivity loss of 81%. Therefore, there exists a design optimum for lateral readout relative to the volume displaced by lateral photosensors.

In various embodiments, multiple rings of detector modules are used to form a detection cylinder. The multiple rings of detector modules forming the cylinder can be described as having an axial depth, d, of the cylinder (e.g., the bore). The axial depth is, in many embodiments, much less than the diameter, D, of the rings, especially for human tomographs. Blocks of detector modules are usually sequentially abutted axially to define a certain number of rings throughout the cylinder's depth.

Coupling side-facing or laterally-facing photodiode(s) to a plurality of crystals in a circumferential or transaxial manner increases the cylinder's diameter. Increasing the diameter opens the bore, increasing susceptibility to radiation originating outside the field of view, thereby increasing random or scattered radiation resulting in noise in acquired images. Additionally, increased bore diameter reduces the acceptance angle of radiation within the scanner, or the angle for a line-of-response to occur along the axial length of the bore, reducing sensitivity. The scanner's geometric efficiency is related to the solid angle coverage provided by its detectors for a given point source in the field of view:

$$\eta = \sin\left(\tan^{-1}\left(\frac{d}{D}\right)\right).$$

In contrast, orienting the thickness of the side-facing or laterally positioned photodiodes along the axial length of the bore (i.e., along the axially oriented lateral faces of each elongated scintillation crystal) lengthens the bore depth but leaves the cylindrical diameter unaffected. Lengthening the bore with inactive material (i.e., non-scintillator material) decreases sensitivity as a result of reduced fill-factor. However, this decrease in fill-factor occurs the same regardless of whether the photosensors are positioned on the axially oriented lateral faces of the elongated scintillation crystals or the transaxially oriented lateral faces of the elongated scintillation crystals. Notwithstanding the fill-factor sensitivity loss on a per-unit length basis, the increased length of the bore does increase sensitivity arising from the increased acceptance angle. Therefore, the positioning of the photosensors on the axially oriented faces of the elongated scintillation crystals reduces noise from random or scattered radiation and increases sensitivity from improved acceptance angles compared to positioning the photodiodes on the transaxially oriented faces (e.g., sequentially along the circumference of the bore).

For reference, the elongated scintillation crystal 1250 is axially adjacent to the elongated scintillation crystal 1251 and axially adjacent to the elongated scintillation crystal 1253 (i.e., adjacent in the axial direction). In contrast, the elongated scintillation crystal 1250 is transaxially adjacent to the elongated scintillation crystal 1252 and transaxially adjacent to the elongated scintillation crystal 1254 (i.e., adjacent in the transaxial direction).

Figure 13B:
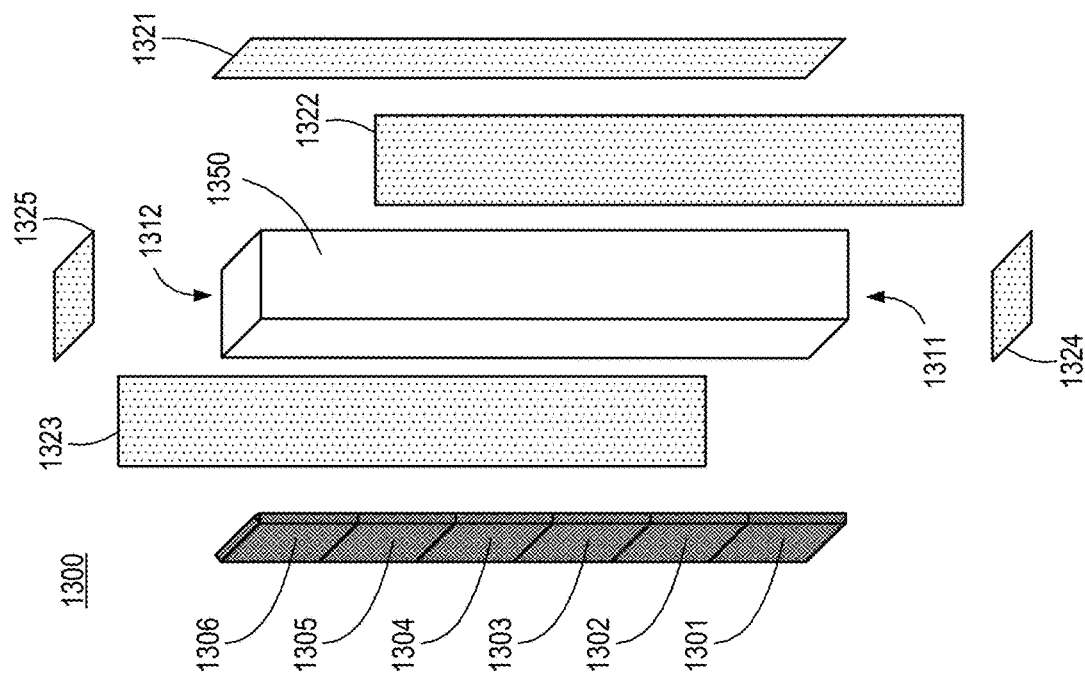
FIG. 13B illustrates an exploded view of the single elongated scintillation crystal, according to one embodiment.
Figure 13A:
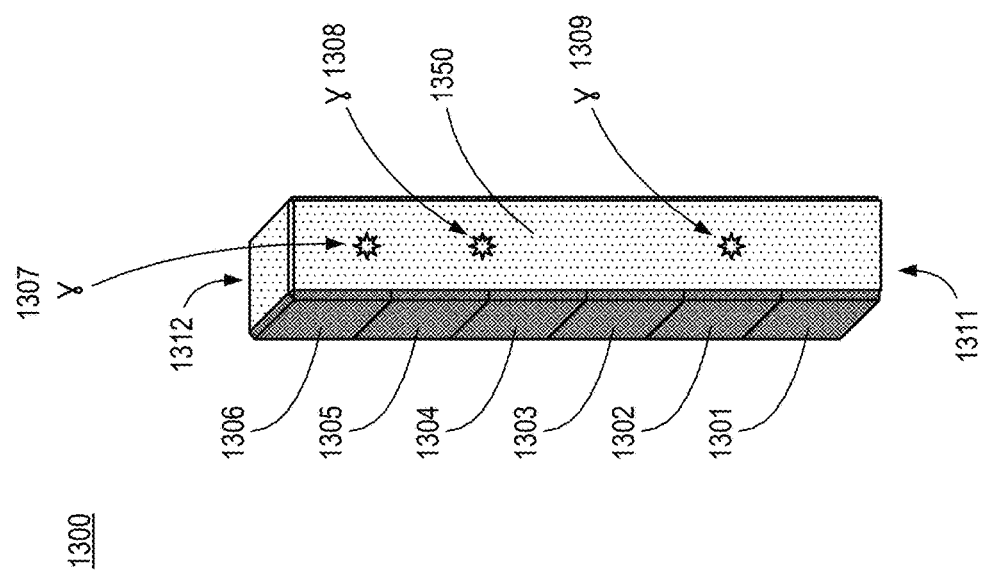
FIG. 13A is a diagram of a single elongated scintillation crystal pixel with multiple arrays of photosensors for lateral photosensor readout, according to one embodiment.

FIG. 13A is a diagram of a single scintillation crystal pixel 1300 with arrays of photosensors 1301-1306 for lateral readout, according to one embodiment. An elongated scintillation crystal 1350 has a rectangular prism shape and is covered (i.e., enclosed or coated) on five faces by reflective material (e.g., a coating or thin layer) and by the arrays of photosensors 1301-1306 on one face. The elongated scintillation crystal 1350 is described as having four lateral faces, two that are axially oriented and two that are transaxially oriented. A distal end-face 1312 is described as the radiation face and is radially oriented into a detector ring to receive a gamma photon from an annihilation event. The proximal end-face 1311 is at the opposite end of the length of the elongated scintillation crystal 1350. The arrays of photosensors 1301-1306 are positioned on an axially oriented lateral face of the elongated scintillation crystal 1350. Each array of photosensors 1301, 1302, 1303, 1304, 1305, and 1306 may include a plurality (e.g., a two-dimensional array) of photodiodes. For example, the array of photosensors 1301 may comprise a two-dimensional array of single-photon avalanche photodiodes operating in Geiger mode, such that array of photosensors 1301 is a silicon photomultiplier.

By way of example, gamma radiation (e.g., a gamma photon) may impact a location 1307 near the distal end-face 1312 of the elongated scintillation crystal 1350. In existing embodiments in which a single photosensor is located at the proximal end, the scintillation light must travel from the location 1307 to the proximal end of the elongated scintillation crystal 1350, potentially experiencing absorption and/or multiple reflections along the length of the elongated scintillation crystal 1350 and traveling at varying angles, resulting in a distribution of photon arrival times at the proximal detection end-face. Such travel results in attenuation of scintillation light and further results in a distribution of photon arrival times that slows down the signal rise-time and overall ensuing photodetection (e.g., as discussed in conjunction with FIG. 9), resulting in timing jitter.

In contrast, the detection of scintillation light along the lateral face of the elongated scintillation crystal 1350 by laterally positioned arrays of photosensors 1301-1306 results in a higher light collection with a shorter photonic travel path. The faster detection afforded by the laterally positioned arrays of photosensors 1301-1306 exhibits reduced attenuation and range of photon arrival time distribution, thereby increasing photosensor output signal and slope.

The laterally positioned (e.g., laterally mounted, laterally integrated, or otherwise laterally placed) arrays of photosensors 1301-1306 additionally aid in the determination of depth-of-interaction, or scintillation genesis (e.g., localizing the location 1307) providing a scanner system with the ability to reduce parallax error, as previously described, and also to attain improved time-of-flight resolution by reducing the space-time uncertainty of a gamma photon's point of absorption/scintillation. A point of scintillation occurring from a gamma photon at location 1307, for example, absorbed within the distal portion of the elongated scintillation crystal 1350, will result in a gradient of illumination (or photon impingement) upon the arrays of photosensors 1306-1301, in order of magnitude (or photonic flux). By measuring the output magnitude of each array of photosensors 1301-1306, a region of gamma photon absorption can be determined.

As a second example, gamma photon 1308, originating at an oblique angle to the elongated scintillation crystal 1350, results in a scintillation as shown, causing greater illumination of arrays of photosensors 1304 and 1305 than that of the array of photosensors 1306 and results in a gradient of light extending in both directions (i.e., proximal and distal) enabling the ratio-metric determination for point of gamma absorption within the elongated scintillation crystal 1350. By way of yet another example, gamma photon 1309 is absorbed within the proximal end of the elongated scintillation crystal 1350, resulting in the greatest extent of light in the array of photosensors 1302 relative to all other arrays of photosensors 1301 and 1303-1306. From this point of absorption, a gradient of light will extend in both proximal and distal directions of the elongated scintillation crystal 1350, resulting from the absorption of light along the lateral length of the elongated scintillation crystal 1350, again enabling the ratio-metric determination for the point of absorption to be determined by comparing each photosensor's output amplitude and/or timing. One method for determining the absorption region is via the following method for the set of lateral photosensors, for example, S={1301, 1302, . . . 1306}:

$$AF_i = \frac{AP_i}{\sum_{j=1}^{|S|} AP_j}$$

where,
$AF_i$=amplitude fraction for photosensor i, where i∈S,
$AP_i$=amplitude peak for photosensor i,
|S| denoting the cardinality of set S, and
I=argmax (AF[j]) for all sensors j in set S, where I is the index number of the sensor with the greatest amplitude representing the geometric region of scintillation (or partial scintillation as the case may be for inter-crystal scatter).

Amplitude peak, AP, may be the peak of signal 902, for example, representing the approximate total charge collected by the photosensor, as previously described. Other methods may optionally be employed to alternatively obtain AP, such as integration of the fast-timing signal 901 by means of digital signal processing or by taking the peak of signal 901. Furthermore, only certain amplitude ranges may optionally be considered valid, such that scatter or pile-up energies are rejected (e.g., via the use of a lower level discriminator (LLD) and an upper level discriminator (ULD)). Alternatively, scatter energy (i.e., less than an LLD value) deposited in more than one crystal may be utilized for interpolating a position of scintillation as occurring between two or more crystals where the total energy among the two or more crystals sums between an LLD and ULD value, thus being considered overall as resulting from a single gamma photon with inter-crystal scatter. Even further, scatter energy measured among various crystals may be utilized for reconstructing a geometric line-of-response for a single gamma photon with total energy summing between an LLD and ULD (e.g., summing to roughly 511 keV). The gamma photon resulting in inter-crystal scatter may be determined as terminating at the point of its last partial scintillation location, its initial point of partial scintillation, or any point therebetween.

In some embodiments, the depth-of-interaction is determined by measuring the time of photon arrival to the various arrays of photosensors, 1301-1306. As an example, for gamma photon 1309, absorbed within the proximal end-face 1311 of the elongated scintillation crystal 1350, the earliest detection of scintillation light would occur at the nearest array of photosensors 1302, then later by 1301 and 1303, followed by 1304, 1305, and finally, 1306. Localization of the scintillator event may be determined by measuring the time of first photonic detection by each photosensor (or photosensor array) in the array (or arrays) of photosensors 1301-1306, based on the known speed within the corresponding elongated scintillation crystal 1350 (e.g., speed of light through the medium or mediums).

FIG. 13B illustrates an exploded view of the single scintillation crystal pixel 1300 with the array of photosensors 1301-1306 and panels of reflective material 1321-1325 separated from the elongated scintillation crystal 1350, according to one embodiment.

Figure 13C:
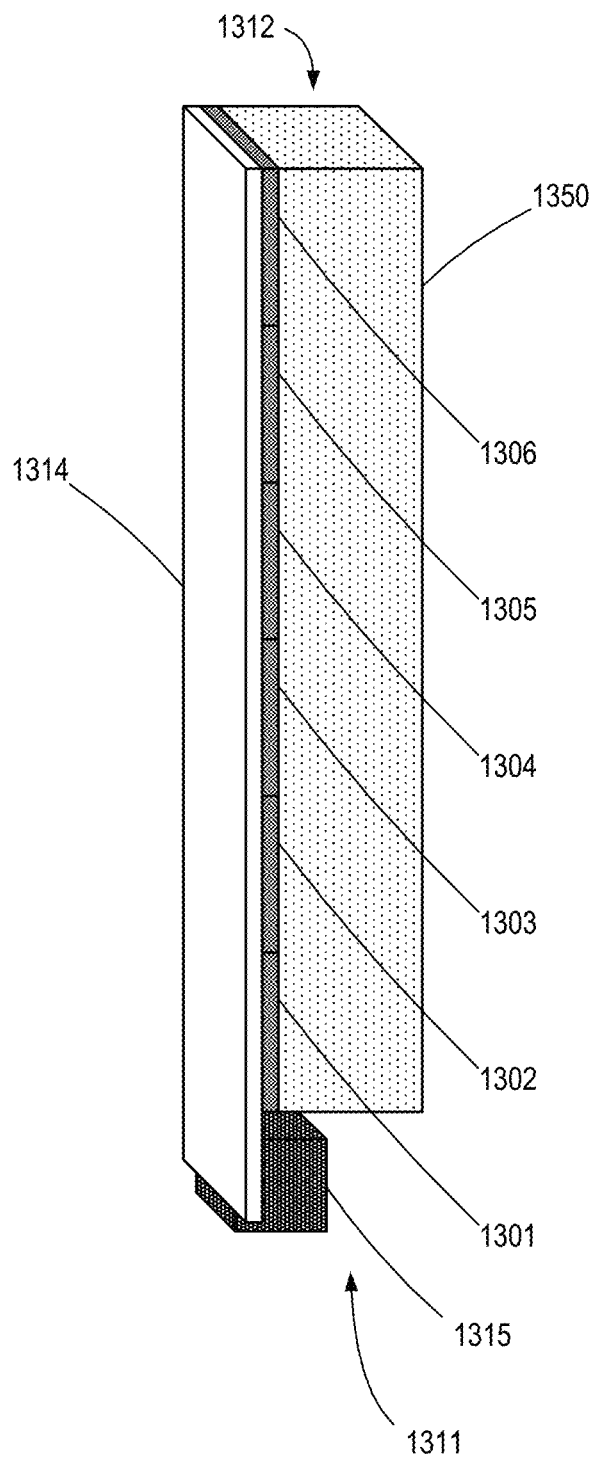
FIG. 13C is a diagram of the single elongated scintillation crystal pixel with arrays of photosensors for lateral photosensor readout, an interposer, and a connector array, according to one embodiment.

FIG. 13C is a diagram of the elongated scintillation crystal 1350 with the arrays of photosensors 1301-1306 for lateral photosensor readout, along with an interposer 1314 and connector array 1315, according to one embodiment. The interposer 1314 is connected to, or optionally integral to, the arrays of photosensors 1301-1306 along the first axially oriented lateral face of the elongated scintillation crystal 1350. The interposer 1314 is operable to convey and/or modify electrical signals from the arrays of photosensors 1301-1306 of the elongated scintillation crystal 1350 toward the proximal end-face 1311 (e.g., to the connector array 1315).

Electrical signals from a semiconductor die of photodiodes forming an array of photosensors may be directly connected to or integrated within the very thin electrical interposer, 1314. The electrical interposer 1314 may be, for example, constructed from silicon, glass, fiberglass, or organic substrates to form either a homogenous or heterogeneous integrated component. In various embodiments, the interposer 1314 may include integral connections to the individual photodiodes within an array of photosensors. In various embodiments, the interposer 1314 may, for example, include the circuit components illustrated within the circuit block 701 of FIG. 7. The interposer 1314 enables a very high fill-factor crystal array. The interposer 1314 may utilize any combination of metal, polysilicon, through-silicon-vias, conductive pads, wire bonds, or similar technology for interconnections. The interposer 1314 may optionally make use of solder spheres, micro-bumps, conductive amalgam pastes, conductive epoxies, ultrasonic welds, etc. The interposer 1314 may connect, actively and/or passively modify and/or network, and/or convey the signals of multiple photodiodes to the proximal end of the elongated scintillation crystal 1350. An interposer may be embodied as an integrated circuit. Connections to the interposer 1314 at the proximal end-face 1311 may be made via the connector array 1315, which may include, for example, solder spheres, such as a ball grid array (BGA), or rigid metallic conductors.

In some embodiments, BGA connections on the interposer 1314 may optionally form connections to a flex-circuit board, enabling the routing of interposer signals out of the elongated scintillation crystal array volume or otherwise therefrom. As such, the interposer 1314 is distinct from (optional) flex-circuit substrates, such as flex-circuit substrates fabricated from polyimide or thick printed circuit board substrates, such as those fabricated from fiberglass (e.g., commonly 1.6 mm thick or thicker).

In some embodiments, the interposer 1314 receives power or signals from external circuitry through the connector array 1315. The interposer 1314 may be passive or active, possessing the ability to multiplex, amplify, or otherwise process signals, including conversion to optical signals, for example. Active components for such processing may be fabricated directly within the interposer 1314, such as in the case of a silicon interposer, or they may be bonded and directly connected upon the interposer 1314.

In some embodiments, the interposer 1314 provides very thin mechanical support for the array of photosensors. The interposer 1314 also enables the routing of power and signals to and from its respective photodiodes. In this way, power and signaling route through the interposer 1314 as an electrical component forming a serial chain comprising the photodiodes in the arrays of photosensors 1301-1306, the interposer 1314, and finally, the electrical connector array 1315.

Figure 14B:
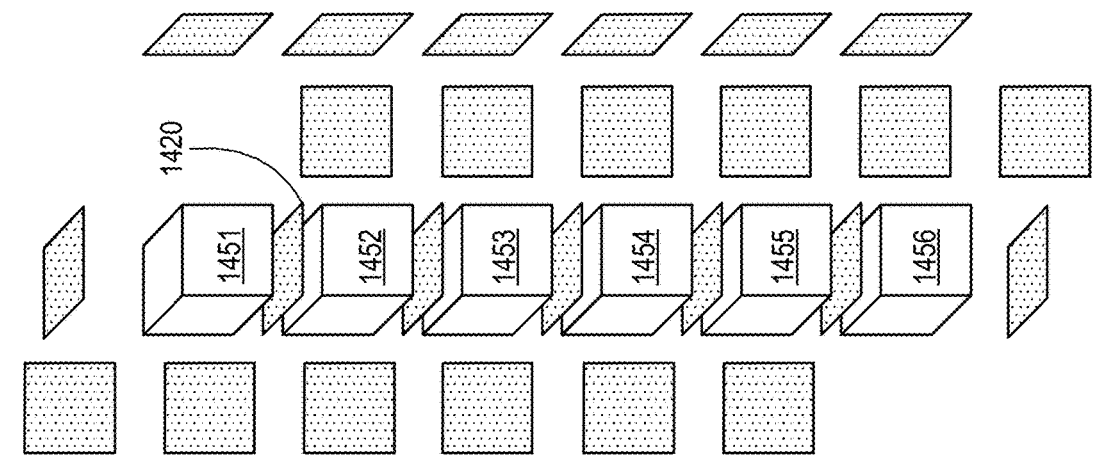
FIG. 14B illustrates an exploded view of the sub-divided scintillation pixel, according to one embodiment.
Figure 14A:
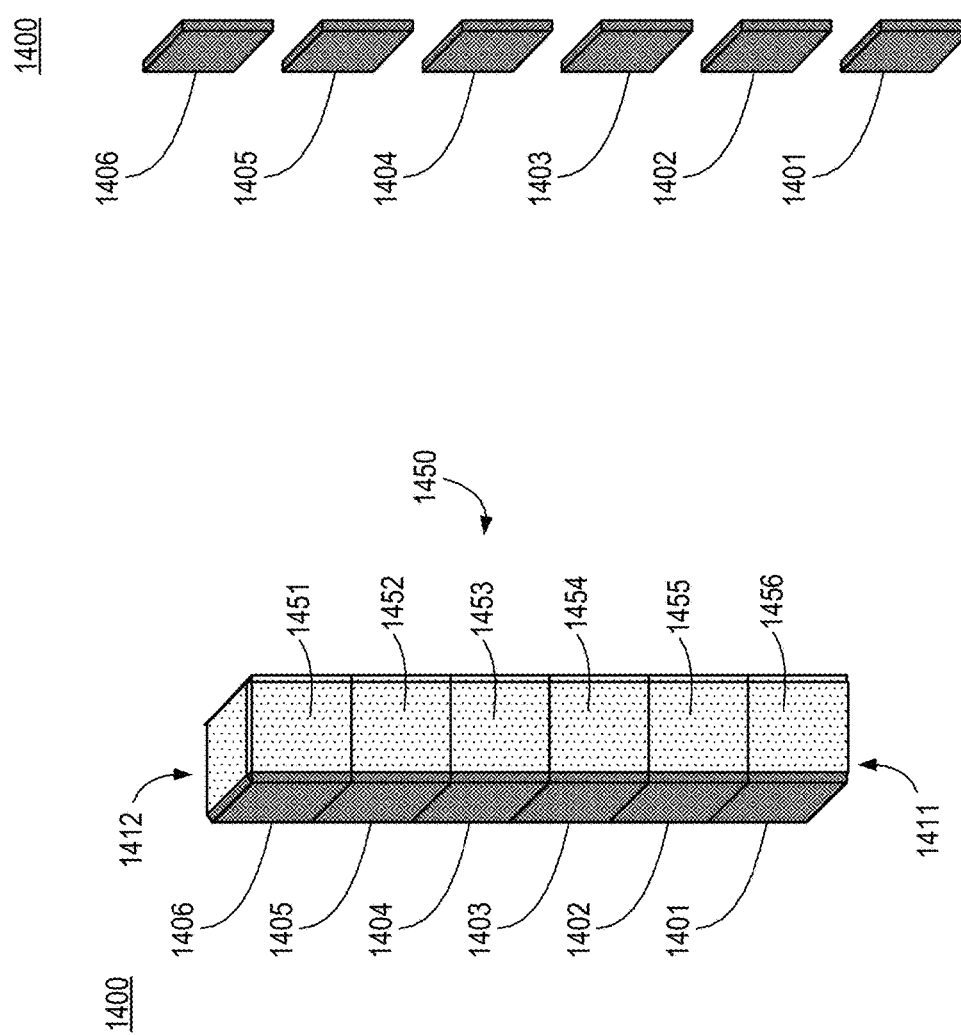
FIG. 14A illustrates a sub-divided elongated scintillation crystal pixel with arrays of photosensors for lateral photosensor readout, according to one embodiment.

FIG. 14A is a diagram of another embodiment of a sub-divided scintillation crystal pixel 1400 with arrays of photosensors 1401-1406 for lateral photosensor readout, according to one embodiment. As illustrated, an elongated scintillation crystal 1450 has the shape of a rectangular prism. The elongated scintillation crystal 1450 is divided along its length into a plurality of segmented volumes with reflective layers positioned between adjacent faces of the segmented volumes. In the illustrated embodiment, the elongated scintillation crystal 1450 is segmented into six cubic volumes 1451-1456, each separated by reflective layers 1420 (see FIG. 14B). As such, each segmented cubic volume 1451-1456 contains scintillation light within its distinct volume, sharing light exclusively with its corresponding array of photosensors 1401-1406. Little or even no scintillation light is shared between the cubic volumes 1451-1456.

Figure 14C:
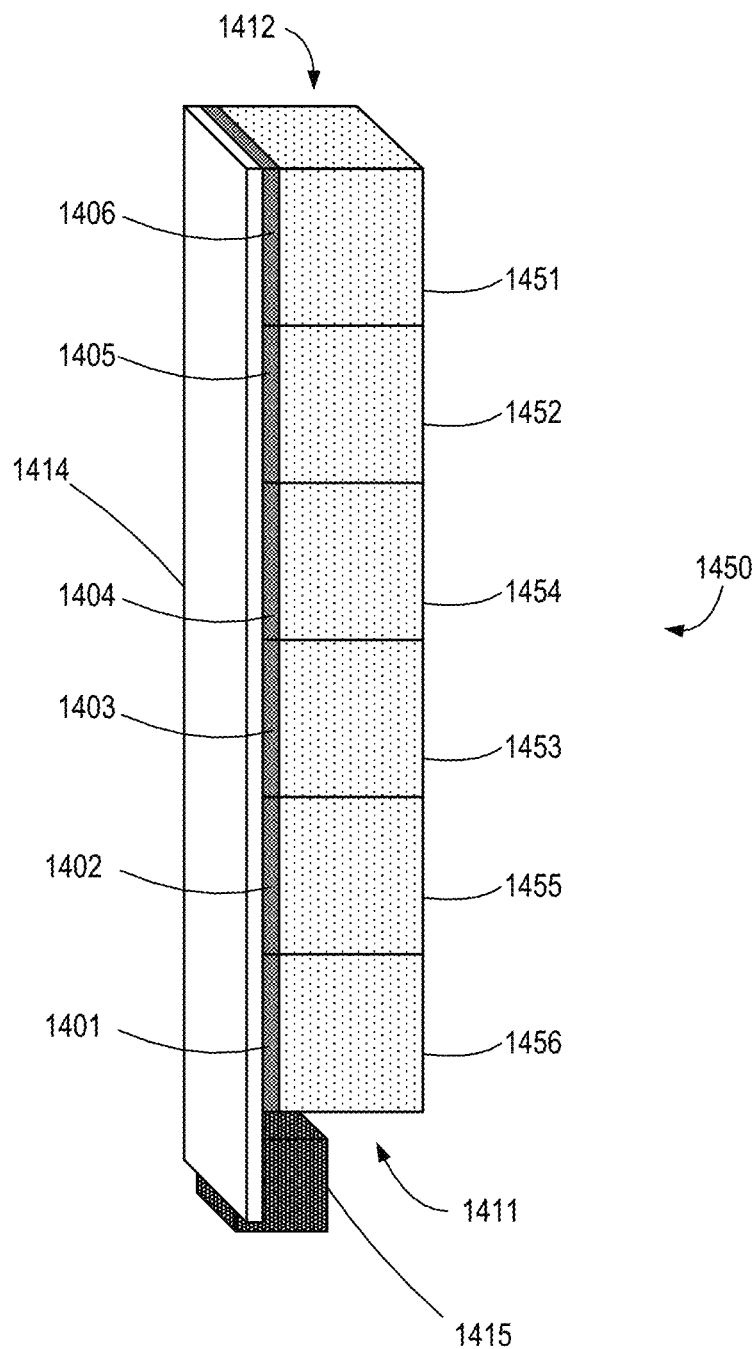
FIG. 14C is a diagram of the sub-divided scintillation pixel with arrays of photosensors for lateral photosensor readout, an interposer, and a connector array, according to one embodiment.

For example, scintillation light generated by an impinging gamma photon within cubic volume 1454 is internally reflected within cubic volume 1454 and received (e.g., detected) by the array of photosensors 1403. Similarly, scintillation light generated within cubic volume 1451 is detected exclusively or almost exclusively by the array of photosensors 1406. One advantage of the embodiments illustrated in FIGS. 14A-C is that a maximum amount of scintillation light is identifiable as originating from a particular region (i.e., cubic volume). Additionally, the full collection of light occurs within a specific cubic volume, reducing photon travel length and, hence, reducing the variation in the timing of photon arrival at the photosensor(s).

FIG. 14B illustrates an exploded view of the sub-divided scintillation crystal pixel 1400 with the array of photosensors 1401-1406 and panels of reflective material 1420 separating each segmented cubic volume 1451-1456, according to one embodiment. The elongated scintillation crystal may be segmented into more or less than six segmented volumes. Moreover, each segmented volume need not be cubic. For example, the elongated scintillation crystal may be segmented into only two volumes, each of which would still be in the shape of an elongated rectangular prism. In other embodiments, the elongated scintillation crystal may not have square end faces, and so the segmented volumes would necessarily not be cubic volumes.

FIG. 14C is a diagram of a sub-divided scintillation pixel with the arrays of photosensors 1401-1406 for lateral photosensor readout, along with an interposer 1414 and connector array 1415, according to one embodiment. The interposer 1414 may operate and/or be configured according to any of the variations and embodiments described in conjunction with the interposer 1314 of FIG. 13C. Similarly, the connector array 1415 may operate and/or be configured according to any of the variations and embodiments described in conjunction with the connector array 1315 of FIG. 13C. As in all the figures, the sizes, proportions, shapes, and dimensions of the various components and elements are not drawn to scale, nor are they necessarily drawn proportionally to one another. For example, the connector array 1415 may be much smaller and/or shaped differently than illustrated. Moreover, the interposer 1414 and/or connector array 1415 may be closer to or extend further from the proximal end-face 1411 of the elongated scintillation crystal 1450.

An additional advantage of lateral photosensing is attained when, otherwise undesirable, high-attenuation scintillation crystals are employed, which may otherwise be incompatible with end readout methods. By lining the lateral face of a rectangular prism with photosensors, light local to scintillation may be efficiently captured where it would otherwise be significantly attenuated in an end-readout method. Furthermore, for scintillators of low density and stopping power, where longer crystals may be necessary to attain similar conversion efficiency (or stopping power) as shorter denser crystals, lateral photosensing is of even greater advantage where the photon arrival time range is greatly reduced via side photosensing versus the end readout where long photonic pathways would otherwise ensue and degrade timing resolution. Therefore, lateral photosensing (or readout) may enable more economical or higher-performing scintillators to be utilized where they would otherwise be incompatible or undesirable for an end-readout configuration.

Figure 15A:
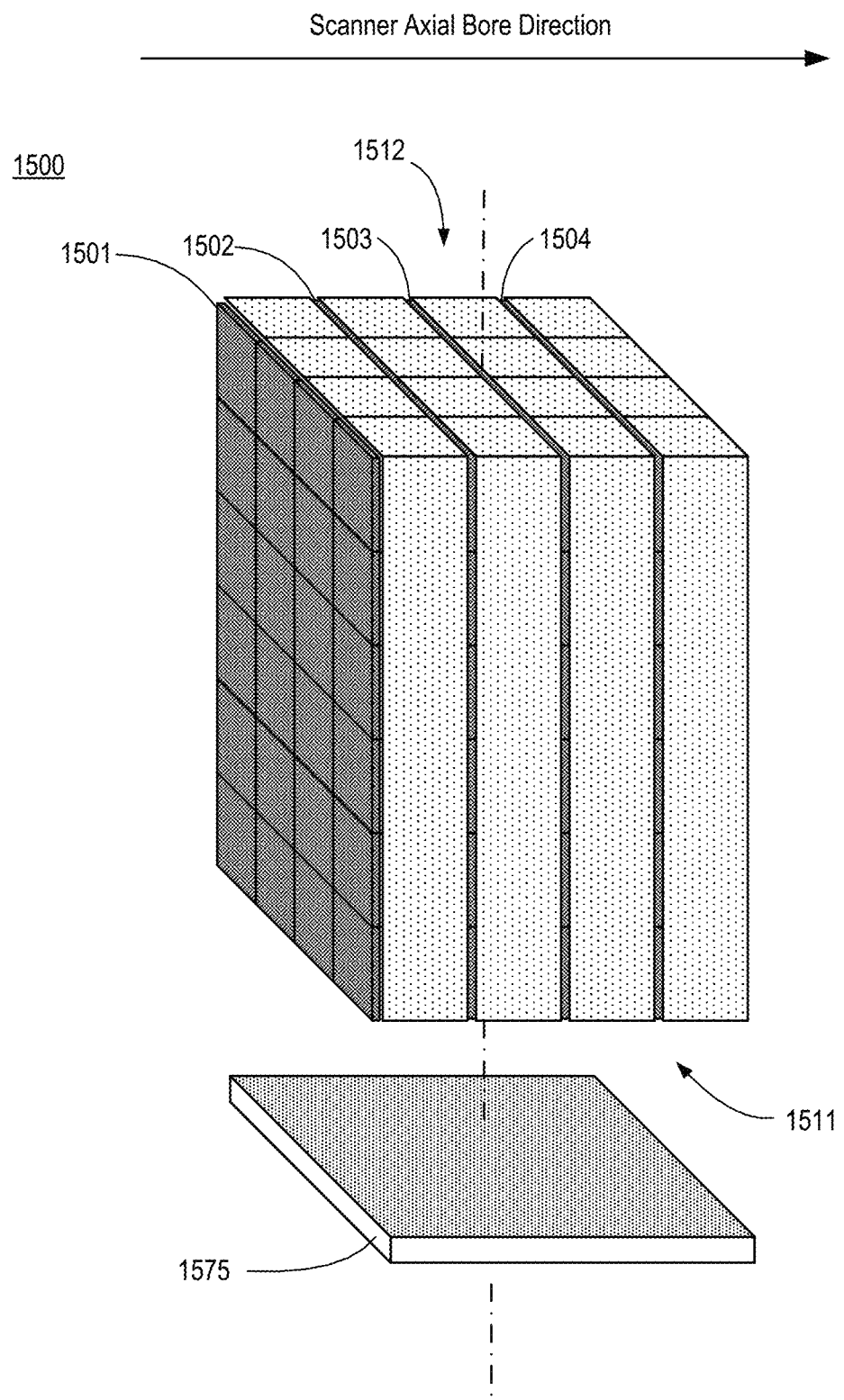
FIG. 15A is a diagram of a block of elongated scintillation crystals with lateral readout photosensors and a plate for thermal management, according to one embodiment.

FIG. 15A is a diagram of a detector module block of scintillation crystals 1500 with lateral readout photosensors 1501-1504 and a thermal plate 1575 for thermal management, according to one embodiment. The use of lateral photosensing via the arrays of photosensors 1501-1504 allows for the thermal plate 1575 to be placed on a proximal end-face 1511 of the block of scintillation crystals 1500 for thermal conduction. A distal end-face 1512 of the block of scintillation crystals 1500 is oriented to face radially into the bore of the scanner to receive gamma radiation therefrom. The thermal plate 1575 conceptually illustrates a thermal conductor positioned in contact with the proximal end-face 1511 of each respective elongated scintillation crystal in the block of scintillation crystals 1500. The reflective material on five of the faces of each of the elongated scintillation crystals may, in some embodiments, be thermally conductive.

As such, the thermal plate 1575 may thermally conduct heat through the reflective material on the proximal end-face 1511 of each elongated scintillation crystal to cool the elongated scintillation crystals. The reflective material (e.g., coating or thin material layer) on the proximal end-face 1511 of each elongated scintillation crystal may be thermally coupled to the reflective material on the other faces of each elongated scintillation crystal. In such embodiments, the elongated scintillation crystals (and the laterally positioned arrays of photosensors) may be cooled from all sides as heat is conducted through the reflective material and into the thermal plate 1575.

In some embodiments, the thermal plate 1575 also serves as a reflector. For example, the thermal plate 1575 may simultaneously serve as a reflector by polishing, sandblasting, or other finishing processes to provide specular or diffuse reflection. In some embodiments, the thermal plate 1575 may be connected to the proximal end-faces 1511 of the block of elongated scintillation crystals via thermally conductive paste or via a weldment to the reflectors of each elongated scintillation crystal, or both. Examples of thermally conductive and reflective materials that may be used to form the reflectors (or reflective coatings) and/or the thermal plate 1575 include but are not limited to, aluminum, magnesium, silver, or compounds thereof (e.g., $Al_2O_3$, MgO), and stainless steel. In some embodiments, the thermal plate 1575 may be slotted or otherwise possess holes or electrical conduits to support the routing of signals into and out of the crystal block volume supporting side-readout. In some embodiments, the thermal plate 1575 is formed as a portion of the reflector material, which comprises a continuous metal member formed to wrap the sides and ends of each crystal. In some embodiments, the thermal plate 1575 is formed as a continuous metal member to wrap the distal end 1512 and the sides of the block of scintillation crystals 1500.

In the illustrated embodiment, the two-dimensional array of elongated scintillation crystals comprises a 4×4 array of 16 total elongated scintillation crystals. It is appreciated that any number of elongated scintillation crystals, in one-dimensional or two-dimensional arrays, may be used to form the block of scintillation crystals in a detector module. In the illustrated embodiment, each elongated scintillation crystal is associated with six discrete arrays of photosensors, which may each comprise a plurality of photodiode sensors. In alternative embodiments, a single, elongated array of photosensors may be positioned on the axially oriented lateral face of each elongated scintillation crystal.

The use of thermally conductive materials in contact with the elongated scintillation crystals and, either directly or indirectly, abutting photosensors may stabilize and/or increase scintillator light emission and photosensor gain via cooling. Thermal fluctuations in the elongated scintillation crystals and/or photosensors result in modulated signal outputs for a given energy absorption, thereby reducing the resolution of the measurements. In various embodiments, a PET scanner is intended for installation within controlled room conditions. In some instances, the PET scanner may have access to water at ambient temperature or colder for use by a scanner. In other instances, air-to-air heat exchangers may be available to remove convective electronic thermal heat from within the scanner to a cooler surrounding ambient environment.

In other instances, air-to-liquid heat exchangers may be utilized to conduct heat via liquid conduction (e.g., via water) from thermally connected plates (such as thermal plate 1575) to external ambient air (i.e., outside a scanner's enclosure). In still other embodiments, the PET scanner may have access to liquid-to-liquid heat exchangers to conduct heat. In many cooling configurations, thermal conduction or convection is only applied generally or broadly within the enclosure of a scanner without any direct or significant thermal conduction from or to the array of elongated scintillation crystals within an individual detector module (e.g., between laterally adjacent crystal faces within an individual detector module).

Moreover, in many embodiments, the PET scanner may not have a cooling system configured to cool the system below room temperature. One reason a PET scanner may be configured to operate at or near ambient temperatures is due to the risk of condensation from very cold active cooling surfaces damaging components therein. Hence, scanner thermal control systems may monitor dewpoint conditions and temperature thresholds thereof to maintain cooling surfaces above condensing temperatures.

However, some embodiments of the presently described systems and methods utilize a cooling system intended to directly cool the elongated scintillation crystals and/or the photosensors for improved thermal regulation and output resolution (e.g., scintillator light and photosensor signal). Additionally, some embodiments of the presently described systems and methods cool the elongated scintillation crystals below ambient temperature to increase scintillator light output and photosensor gain. By insulating cooled surfaces possessing temperatures below the dewpoint, such that their exposed outer surfaces to ambient conditions rise above the dewpoint threshold, the elongated scintillation crystals and/or the photosensors in the detector modules of a PET scanner can be operated at temperatures substantially colder than ambient room conditions. In some examples, each gamma radiation detector module is hermetically sealed with an insulating layer to encapsulate the elongated scintillation crystals, the arrays of photosensors, and the reflective material. In some embodiments, routing wires may pass through the hermetically sealed enclosure.

Figure 15B:
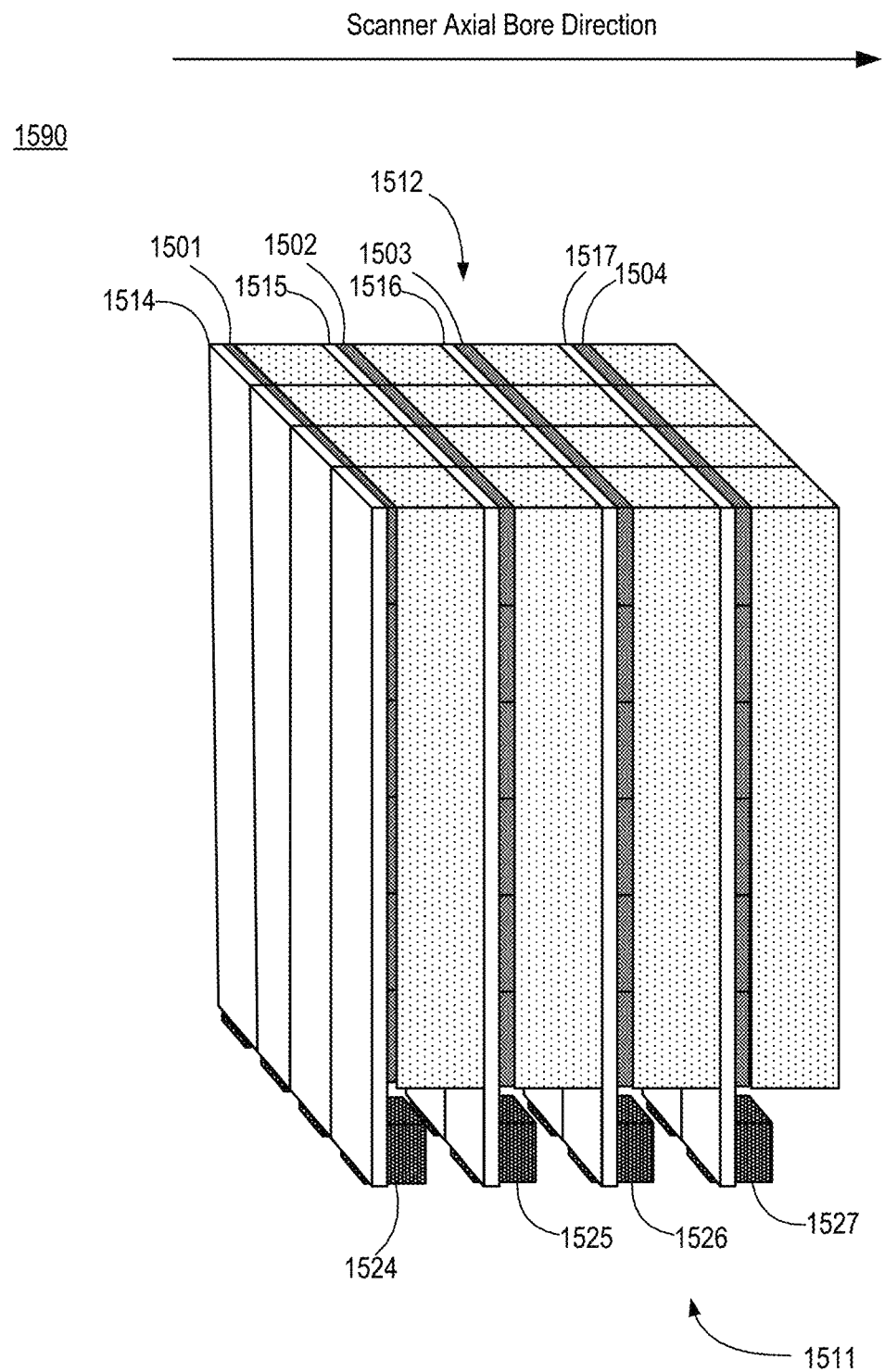
FIG. 15B is a diagram of a block of elongated scintillation crystals with arrays of photosensors, interposers, and connector arrays, according to one embodiment.

FIG. 15B is a diagram of a block of scintillation crystals 1590 with photosensors 1501, 1502, 1503, and 1504, interposers 1514, 1515, 1516, and 1517, and connector arrays 1524, 1525, 1526, and 1527, according to one embodiment. In various embodiments, a detector module receives a gamma photon on a distal end-face 1512. The gamma photon is scintillated within one (or more) of the elongated scintillation crystals to generate lower-frequency scintillation photons. The scintillation photons are received by the lateral photosensor(s) associated with the elongated scintillation crystal. The electrical signal generated by the lateral photosensors is conveyed by the electrical interposer to the connector array (e.g., a ball grid array). In the illustrated embodiment, each of the sixteen elongated scintillation crystals is associated with six arrays of photosensors and a laterally positioned interposer. As such, the block of scintillation crystals 1590 includes sixteen elongated scintillation crystals, sixteen interposers, and ninety-six arrays of photosensors (e.g., ninety-six silicon photomultipliers, each containing a plurality of photodiodes), not all of which are labeled with a reference number.

In some embodiments, a single laterally positioned interposer may be associated with multiple elongated scintillation crystals. For example, an interposer may be shared by two adjacent scintillation crystals. As another example, each column of four scintillation crystals may share a single interposer (e.g., that spans the lateral faces of all four scintillation crystals). In such an example, the block of scintillation crystals 1590 would include sixteen elongated scintillation crystals, four interposers, and ninety-six arrays of photosensors (each of which may contain numerous individual photodiodes). Even further, a single laterally positioned interposer may integrate photosensors on the face of two opposite sides, thereby optically mating with two crystals, or more, on each side of the interposer.

In various embodiments, a PET scanning system includes one or more rings of detector modules arranged with the photosensors and electrical interposers axially oriented with respect to the ring. In such embodiments, the axial width of each ring of detector modules includes the sum of the widths of the elongated scintillation crystals in the axial direction, the sum of the widths of the axially aligned photosensor arrays on the lateral surfaces of each of the elongated scintillation crystals, the sum of the widths of the axially aligned reflectors or reflective coatings, and the sum of the widths of the axially aligned interposers connected to the photosensors. The illustrated embodiment is simplified to include only four elongated scintillation crystals in the axial direction, where each elongated scintillation crystal has a square end (e.g., the height and width of each elongated scintillation crystal are the same).

As such, the width of the block of scintillation crystals 1590 in the axial direction is equal to four times the sum of the width of an interposer, a photosensor, and an elongated scintillation crystal, plus the relatively negligible widths of the reflective coatings on the axially aligned surfaces of the elongated scintillation crystal. The width of the detector module in the transaxial direction is equal to four times the height of the elongated scintillation crystal, plus the relatively negligible widths of the reflective coatings on the axially aligned surfaces of the elongated scintillation crystal.

Figure 15C:
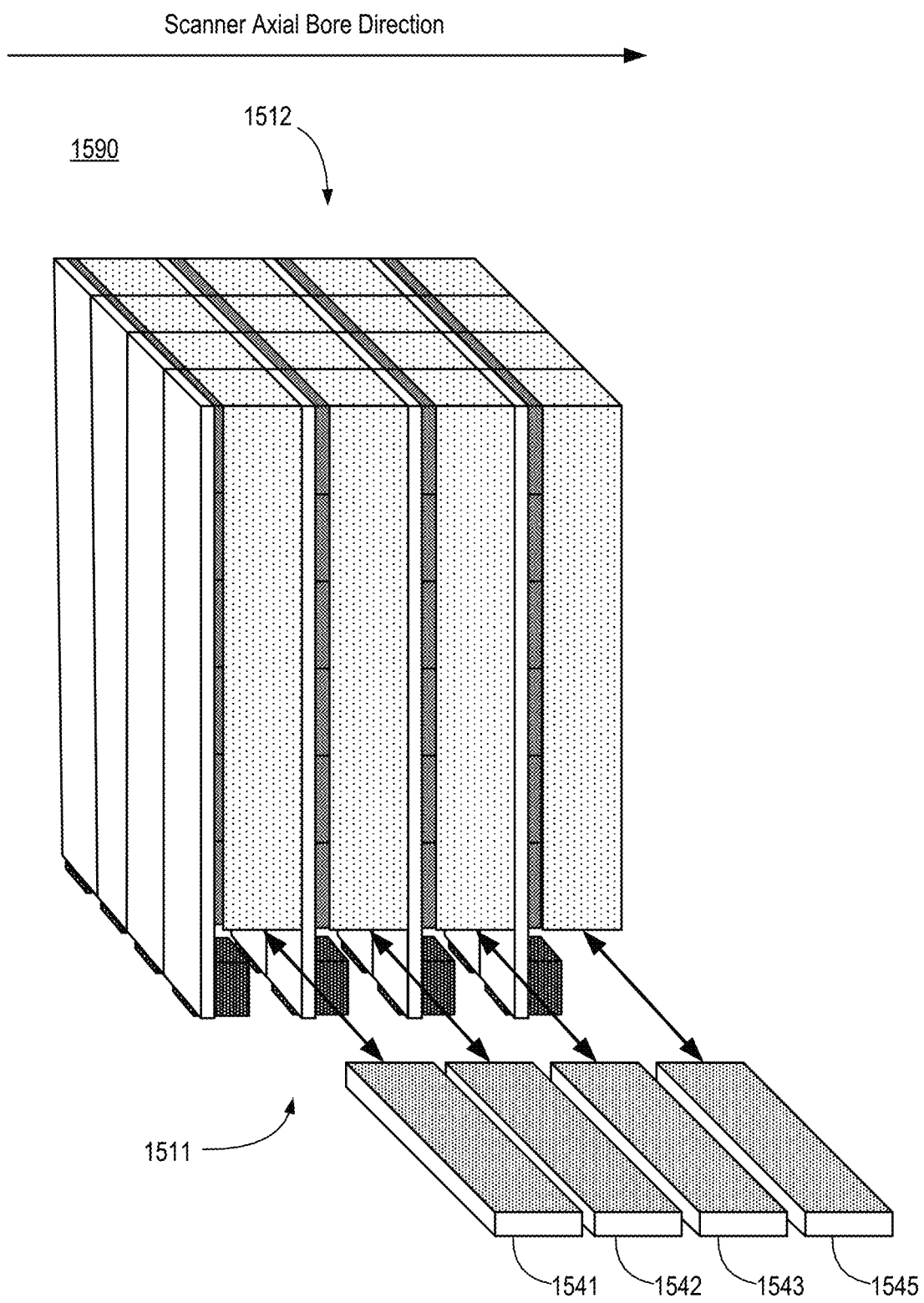
FIG. 15C is a diagram of a block of elongated scintillation crystals with arrays of photosensors, interposers, connector arrays, and a plate for thermal management, according to one embodiment.

FIG. 15C is a diagram of the detector block of scintillation crystals 1590 of FIG. 15B with thermal plates 1541, 1542, 1543, and 1545 added to the proximal end-faces 1511 of each column of elongated scintillation crystals of the block of scintillation crystals 1590. The thermal plates 1541, 1542, 1543, and 1545 may be configured and/or operate according to any of the various embodiments and variations described in conjunction with the thermal plate 1575 of FIG. 15A. The use of multiple thermal plates 1541, 1542, 1543, and 1545 facilitates the routing of signals via the interposers to the connector arrays and/or facilitates connections to the connector arrays.

Figure 15D:
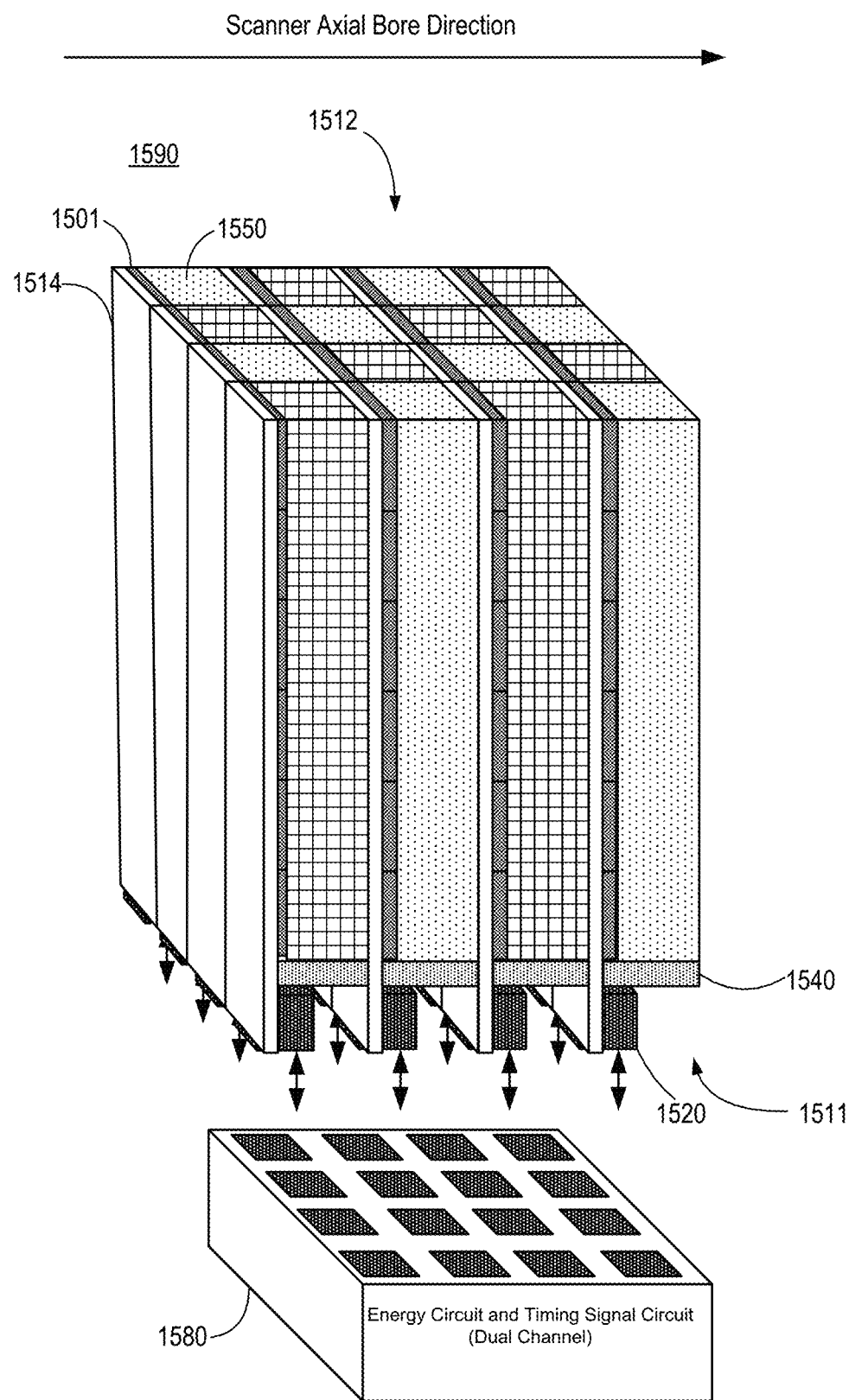
FIG. 15D is a diagram of a block of elongated scintillation crystals connected to a dual-channel processing circuit, according to one embodiment.

FIG. 15D is a diagram of a detector block of scintillation crystals 1590 connected to a dual-channel processing circuit 1580, according to one embodiment. In the illustrated embodiment, the dual-channel processing circuit 1580 includes connection features to connect to connector arrays 1520 of interposers 1514 associated with a respective elongated scintillation crystal 1550. The interposers 1514 operate to convey electrical signals from a plurality of arrays of photosensors 1501 of each elongated scintillation crystal 1550 to a respective connector array 1520. Thermal plates 1540 are installed to facilitate thermal cooling of the elongated scintillation crystals 1550, the photosensors 1501, and/or the electronic and conductive components within the interposers 1514.

In the illustrated embodiment, each scintillation crystal 1550 is associated with a distinct interposer 1514. In some embodiments, a single interposer may be associated with multiple scintillation crystals. For example, a single interposer may have a width to span across the lateral surfaces of multiple scintillation crystals. A single interposer may, for example, be associated with four or five scintillation crystals.

As described in conjunction with FIG. 7 and FIG. 12, the first channel of the processing circuit 1580 includes an energy circuit and a timing circuit to process signals from the elongated scintillation crystals 1550 with dotted shading. A second channel of the processing circuit 1580 includes an energy circuit and a timing circuit to process signals from the elongated scintillation crystals 1550 with crosshatch shading. A PET scanner may include numerous detector modules, each of which includes a block or blocks of scintillation crystals 1590 with a processing circuit 1580. An image processing circuit of the PET scanner may receive the timing signals and the energy signals from the dual-channel processing circuit 1580 of each detector module to reconstruct an image, as understood in the art.

Figure 16:
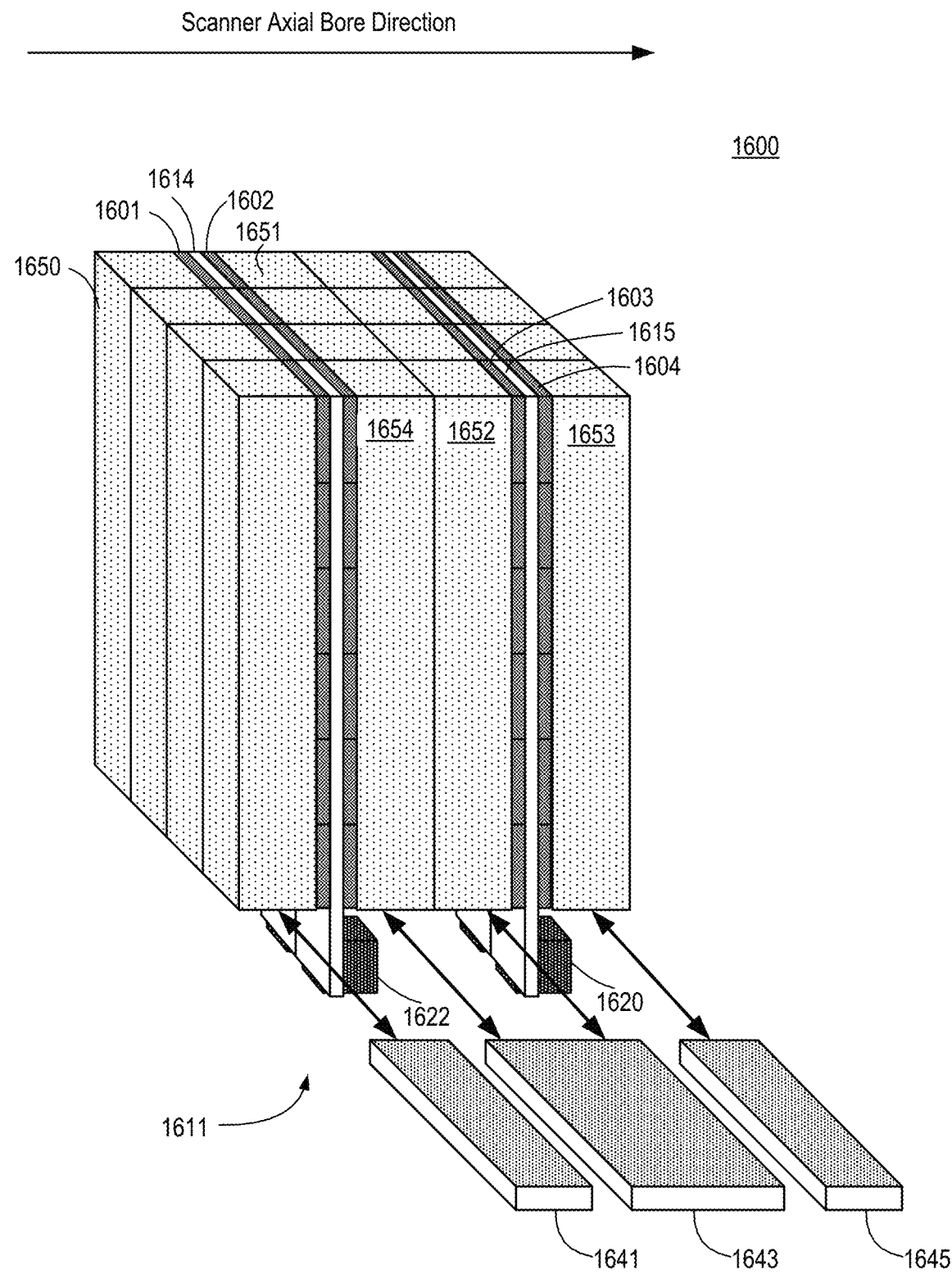
FIG. 16 is a diagram of a block of elongated scintillation crystals with double-sided interposers connected to photosensor arrays of adjacent elongated scintillation crystals, according to one embodiment.

FIG. 16 is a diagram of a block 1600 of elongated scintillation crystals with double-sided interposers 1614 and 1615 connected to photosensor arrays of adjacent elongated scintillation crystals, according to one embodiment. As described in conjunction with other embodiments, thermal plates 1641, 1643, and 1645 are spaced to contact the proximal end faces 1611 of the block of elongated scintillation crystals 1600. The specific dimensions of the thermal plates 1641, 1643, and 1645 may be selected to facilitate the routing of signals via the interposers 1614 and 1615 via the connector arrays 1620 and 1622.

In the illustrated example, the block 1600 of elongated scintillation crystals includes sixteen elongated scintillation crystals, including numbered elongated scintillation crystals 1650, 1651, 1652, 1653, and 1654, and eight interposers, including numbered interposers 1614 and 1615. It is appreciated that a block of scintillation crystals may include any number of elongated scintillation crystals in one-dimensional or two-dimensional arrays with even numbers or odd numbers of elongated scintillation crystals. Each elongated scintillation crystal has reflective material or coating on five faces, such that any optical radiation generated by a scintillation event within any given elongated scintillation crystal is reflected for detection by the array of photosensors associated therewith. In the illustrated example, each interposer has arrays of photosensors on opposing faces in the axial bore direction.

As illustrated, the interposer 1614 has a first array of photosensors 1601 on a first lateral face to detect optical radiation within the elongated scintillation crystal 1650 (e.g., from a scintillation event therein). A second array of photosensors 1602 on the second lateral face of the interposer 1614 detects optical radiation within the elongated scintillation crystal 1651. Electrical signals from the first and second arrays of photosensors 1601 and 1602 are conveyed, processed, and/or partially processed through the interposer 1614. Interposer 1614 conveys the processed or partially processed electrical signals from the photosensors 1601 and 1602 to a connector array (not visible) at the proximal end 1611 of the block 1600.

Reiterating the functionality of double-sided interposers, interposer 1615 has a first array of photosensors 1603 on a first lateral face to detect optical radiation within the elongated scintillation crystal 1652. A second array of photosensors 1604 on the second lateral face of the interposer 1615 detects optical radiation within the elongated scintillation crystal 1653. Electrical signals from the first and second arrays of photosensors 1603 and 1604 are conveyed, processed, and/or partially processed through the interposer 1615. Interposer 1615 conveys the processed or partially processed electrical signals from the photosensors 1603 and 1604 to a connector array 1620 at the proximal end 1611 of the block 1600. In the illustrated example, each of the first and second arrays of photosensors 1603 and 1604 includes six discrete arrays of photosensors. It is appreciated that each photosensor may include more or fewer discrete photosensors.

In the illustrated embodiment, the block 1600 includes an even number of scintillation crystals in the direction of the axial bore, such that an even number of double-sided interposers is used. In some embodiments, the block of elongated scintillation crystals includes an odd number of scintillation crystals in the direction of the axial bore. In such embodiments, an odd number of interposers may be utilized, where the interposers on one end of the block are single-sided interposers that each serve a single elongated scintillation crystal.

Figure 17:
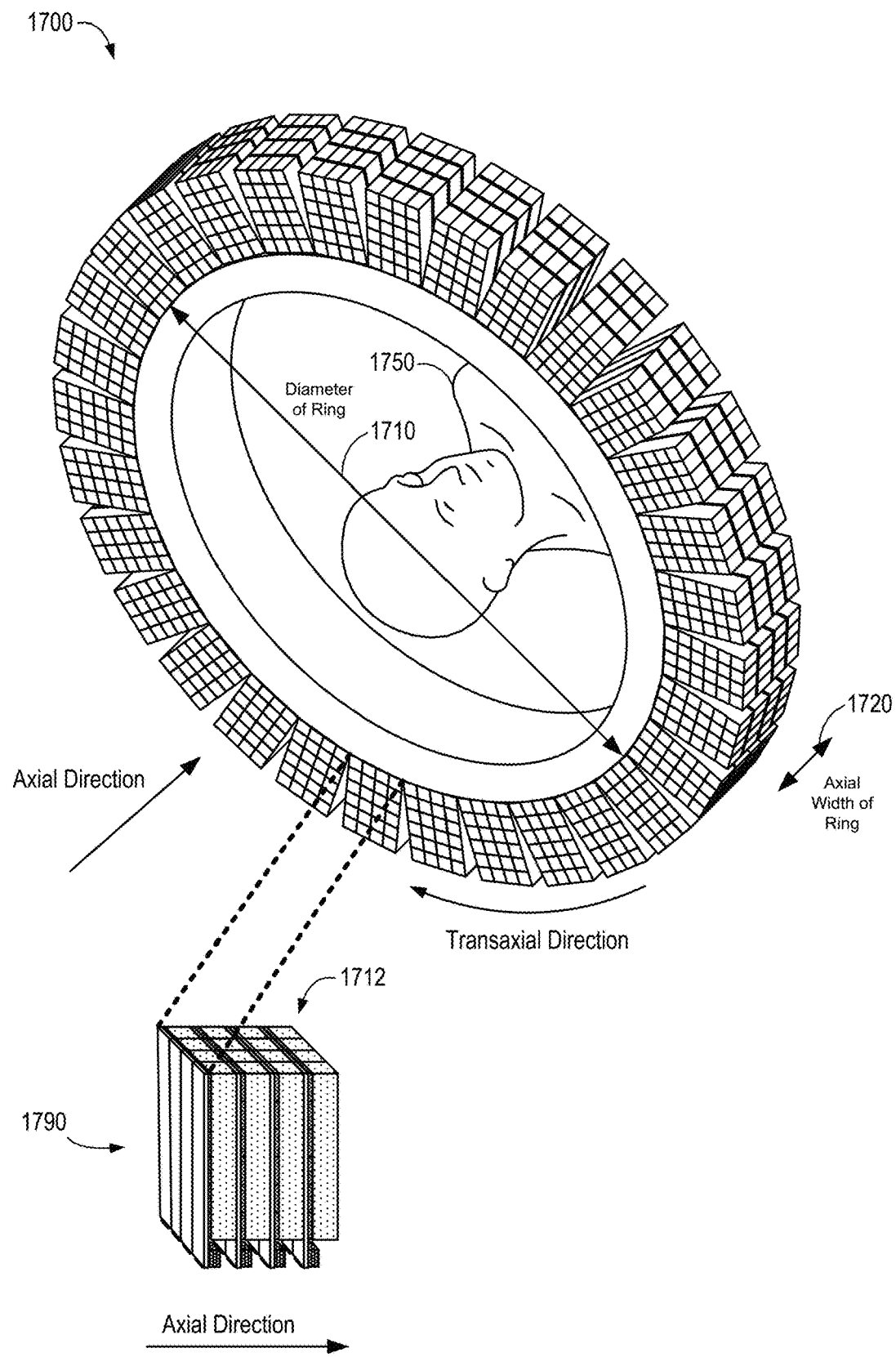
FIG. 17 illustrates a ring of detector modules with axially oriented arrays of photosensors on the lateral faces of elongated scintillation crystals, according to one embodiment.

FIG. 17 illustrates a ring 1700 of detector modules 1790 (e.g., blocks) with axially oriented photosensors on lateral faces of elongated scintillation crystals, according to one embodiment. Each of the detector modules 1790 is simplified but intended to represent any of the various embodiments of detector modules described herein. For example, while not illustrated in each instance, each detector module 1790 may include interposers on the axially aligned lateral faces of the photosensors, which are, in turn, positioned on the axially aligned lateral faces of each respective elongated scintillation crystal. Each detector module 1790 is positioned with a distal end-face 1712 facing into the ring 1700 to receive gamma photons from annihilation events within the patient 1750. The ring 1700 has a diameter 1710 and an axial width 1720. The ring 1700 defines an axial direction (through the bore) and a transaxial direction around the circumference of the ring 1700.

In the illustrated embodiment, the elongated scintillation crystals of each detector module 1790 or "block" are seamlessly positioned in the axial direction of the detector ring without substantial gaps therebetween, such that two adjacent elongated scintillation crystals are separated from one another by (i) the array of photosensors on the first axially oriented lateral face of one of the adjacent elongated scintillation crystals, (ii) the reflective material on the second axially oriented lateral face of the other adjacent elongated scintillation crystal, and (iii) optionally, the interposer connected to the array of photosensors on the first axially oriented lateral face of each respective elongated scintillation crystal.

Figure 18:
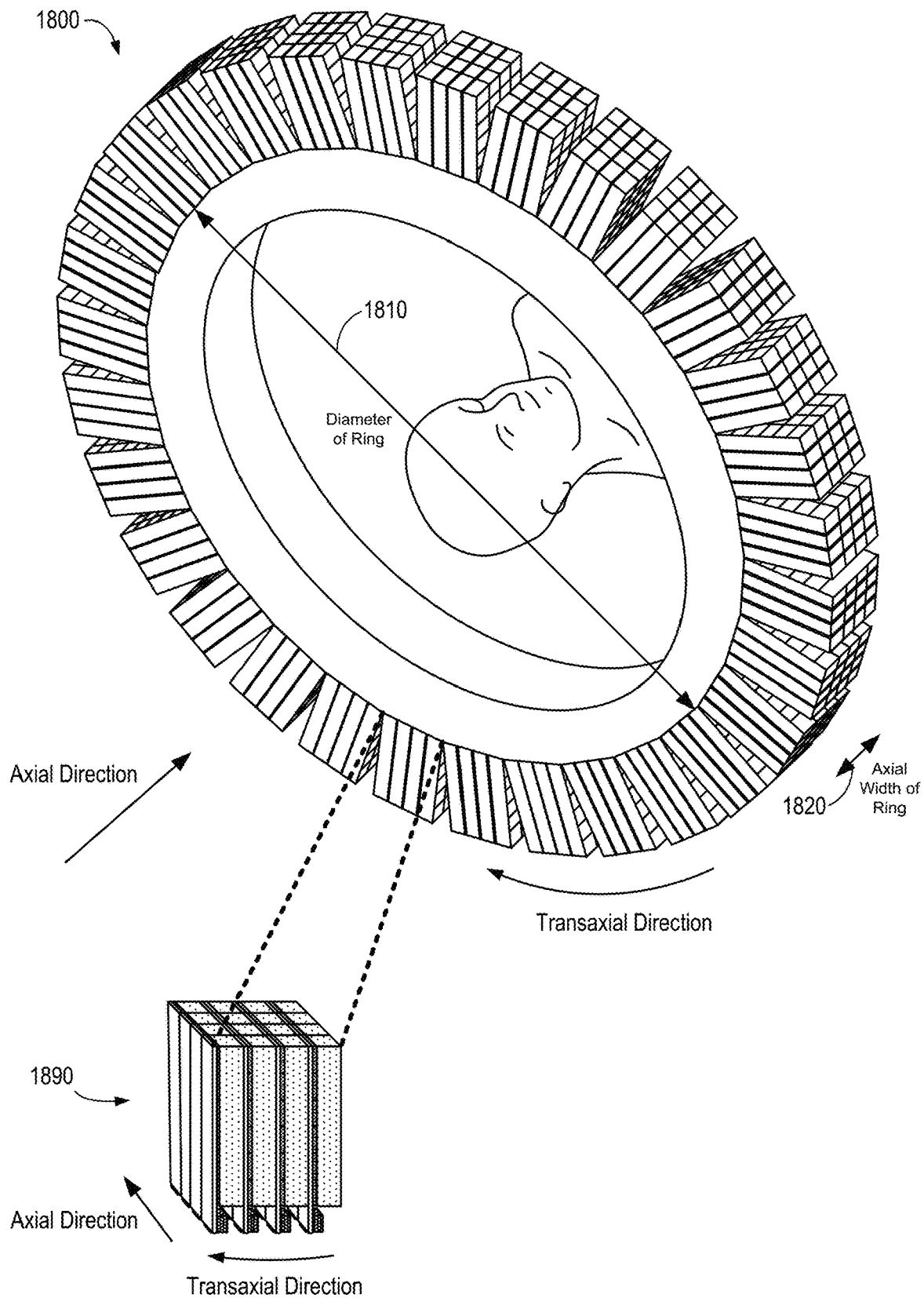
FIG. 18 illustrates a ring of detector modules with transaxially oriented arrays of photosensors on the lateral faces of the elongated scintillation crystals, according to one embodiment.

FIG. 18 illustrates a ring 1800 of detector modules 1890 with transaxially oriented photosensors on lateral faces of elongated scintillation crystals, according to one embodiment. Again, each of the detector modules 1890 in the ring 1800 is simplified but intended to represent any of the various embodiments of detector modules described herein. For example, each detector module 1890 in the ring 1800 may include interposers on the transaxially aligned lateral faces of the photosensors, which are, in turn, positioned on the transaxially aligned lateral faces of each respective elongated scintillation crystal.

The transaxial orientation of the interposers and photosensors results in an axial width 1820 of the ring 1800 that is smaller than the axial width 1720 of the ring 1700 in FIG. 17, even though the same number of detector modules are utilized to form the ring. However, the transaxial orientation of the interposers and photosensors results in an inner diameter 1810 of the ring 1800 that is larger than the inner diameter 1710 of the ring 1700 in FIG. 17, even though the same number of detector modules are utilized. As described herein, the axial orientation of FIG. 17 results in a smaller inner diameter 1710 for a given number of detector modules. A smaller diameter is advantageous, in some applications, for the reasons described herein.

Figure 19:
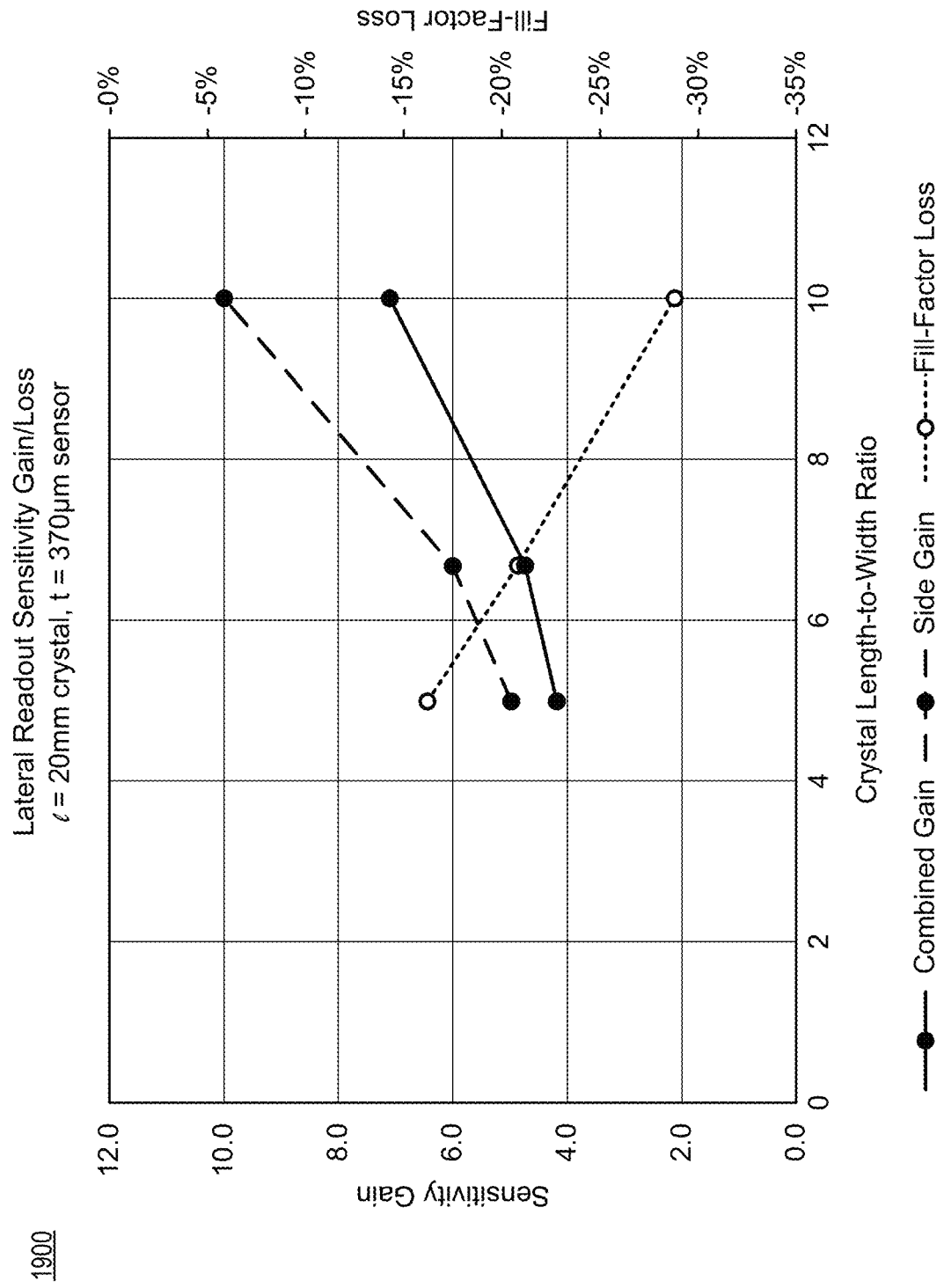
FIG. 19 is a graph of sensitivity gain and fill-factor loss of lateral photosensor readout, according to one embodiment.

FIG. 19 is a graph 1900 of the sensitivity gain and fill-factor loss of a lateral photosensor readout verses various crystal geometries using end-readout as a baseline, according to one embodiment. As illustrated, lateral sensitivity (compared to end-readout), plotted with a dashed line (labeled Side Gain), increases nearly linearly with the length of an elongated scintillation crystal relative to the width of the end-face of the elongated scintillation crystal (plotted for square end-faces sizes two $mm^2$, three $mm^2$, and four $mm^2$). Conversely, as the aspect ratio of length versus width is correspondingly increased (i.e., for thinner crystals), the thickness of the photosensor (370 µm as plotted) becomes significant and fill-factor losses increase, as shown by the dotted-line (labeled Fill-Factor Losses), reducing side readout gains. Nonetheless, the sensitivity gains resulting from lateral photosensor readout prevail advantageous over the fill-factor losses, as shown by the solid-line (labeled Combined Gain) for the plotted ratios.

Figure 20:
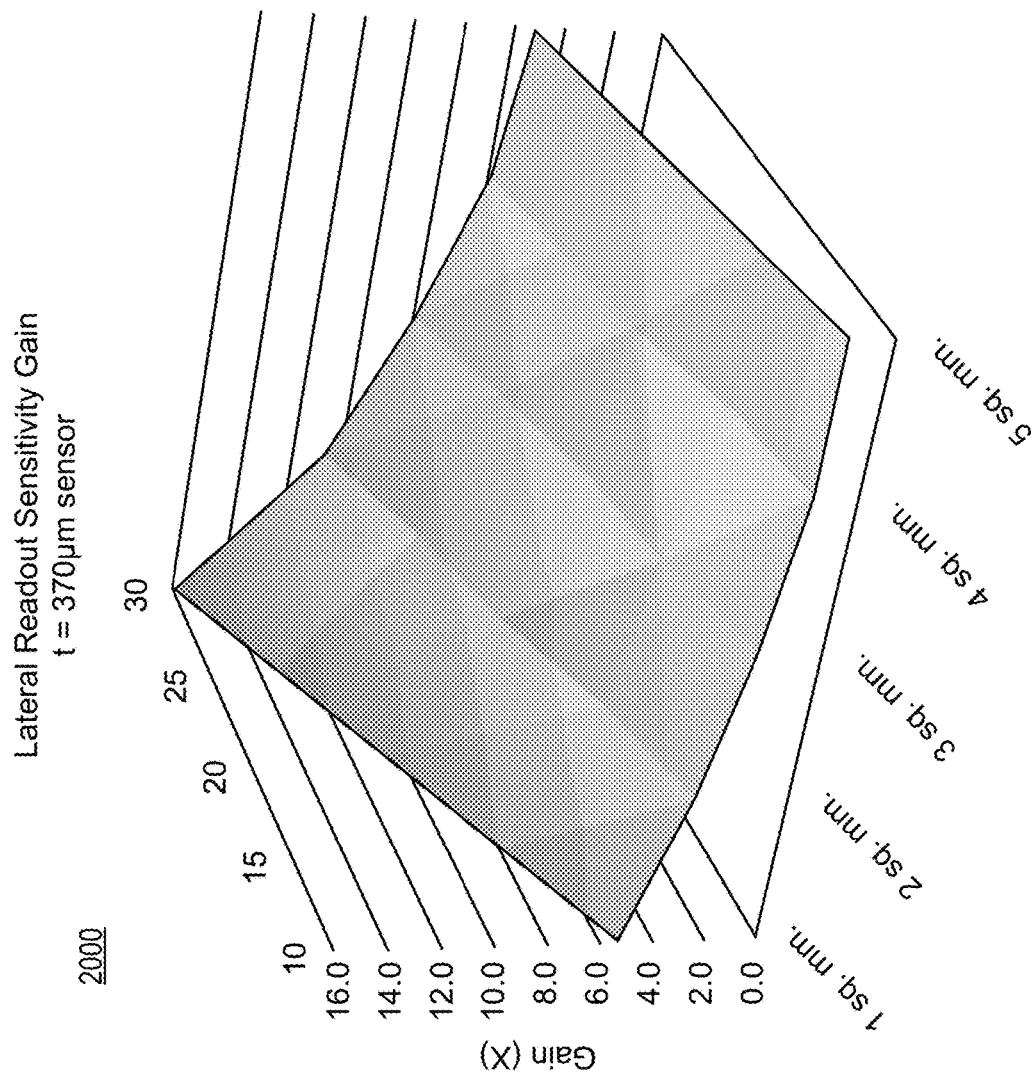
FIG. 20 is a graph of the overall sensitivity gain of rectangular prism scintillation crystals of varying lengths with square end-faces, according to one embodiment.

FIG. 20 is a graph 2000 of the overall lateral sensitivity gain (compared to end-readout) of rectangular prism scintillation crystals of varying lengths (e.g., 10-30 mm long) with square end-faces, according to various embodiments. As illustrated, longer/higher aspect ratios exhibit higher side readout gain. Fill-factor losses become prevalent for thinner crystals (e.g., approximately less than 2 mm), while short, wide crystals gain the least due to reduced lateral photosensor surface area versus that of end readout.

In the context of the information conveyed in FIGS. 19 and 20, various embodiments of the presently described systems and methods include detector modules with two-dimensional or three-dimensional arrays of scintillation crystals with target dimensions to target relatively higher gains over that of end-readout. In some embodiments, the dimensions of the elongated scintillation crystals are selected as a function to increase the total gain with reduced or minimized fill-factor loss. For example, the two-dimensional array of elongated scintillation crystals in a detector module may utilize scintillation crystals having dimensions and length-to-width ratios that provide for a fill-factor greater than 85%. In various embodiments, each elongated scintillation crystal has a length between the distal and proximal end-faces of between 10 millimeters and 30 millimeters, a ratio of the length to an axial width of 3-15, and a ratio of the length to a transaxial width of 3-15. In various embodiments, the end-faces of the elongated scintillation crystals are square, such that the transaxial width and the axial width are equal.

Figure 21:
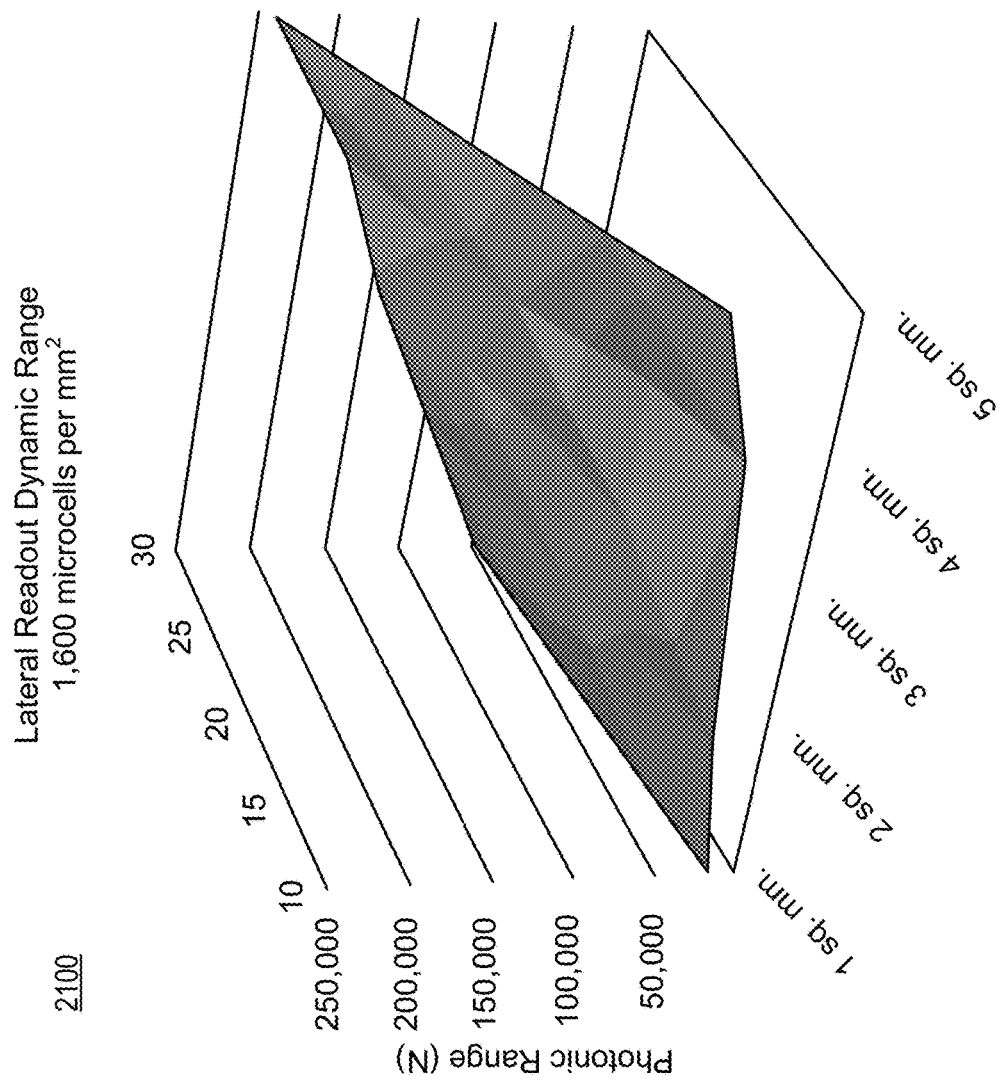
FIG. 21 is a graph of the photonic dynamic range for a silicon photomultiplier photosensor with respect to various dimensions of elongated, rectangular prism scintillation crystals, according to one embodiment.

FIG. 21 is a graph 2100 of a photonic dynamic range for a silicon photomultiplier photosensor possessing 1,600 single-photon avalanche photodiode microcells per square millimeter of rectangular prism scintillation crystals of varying dimensions, according to one embodiment. The dynamic range scales with crystal lateral surface area. In various embodiments, each elongated scintillation crystal is associated with an array of photosensors. The array of photosensors may comprise one or more silicon photomultiplier photosensors positioned on an axially oriented lateral face of the elongated scintillation crystal.

Figure 22:
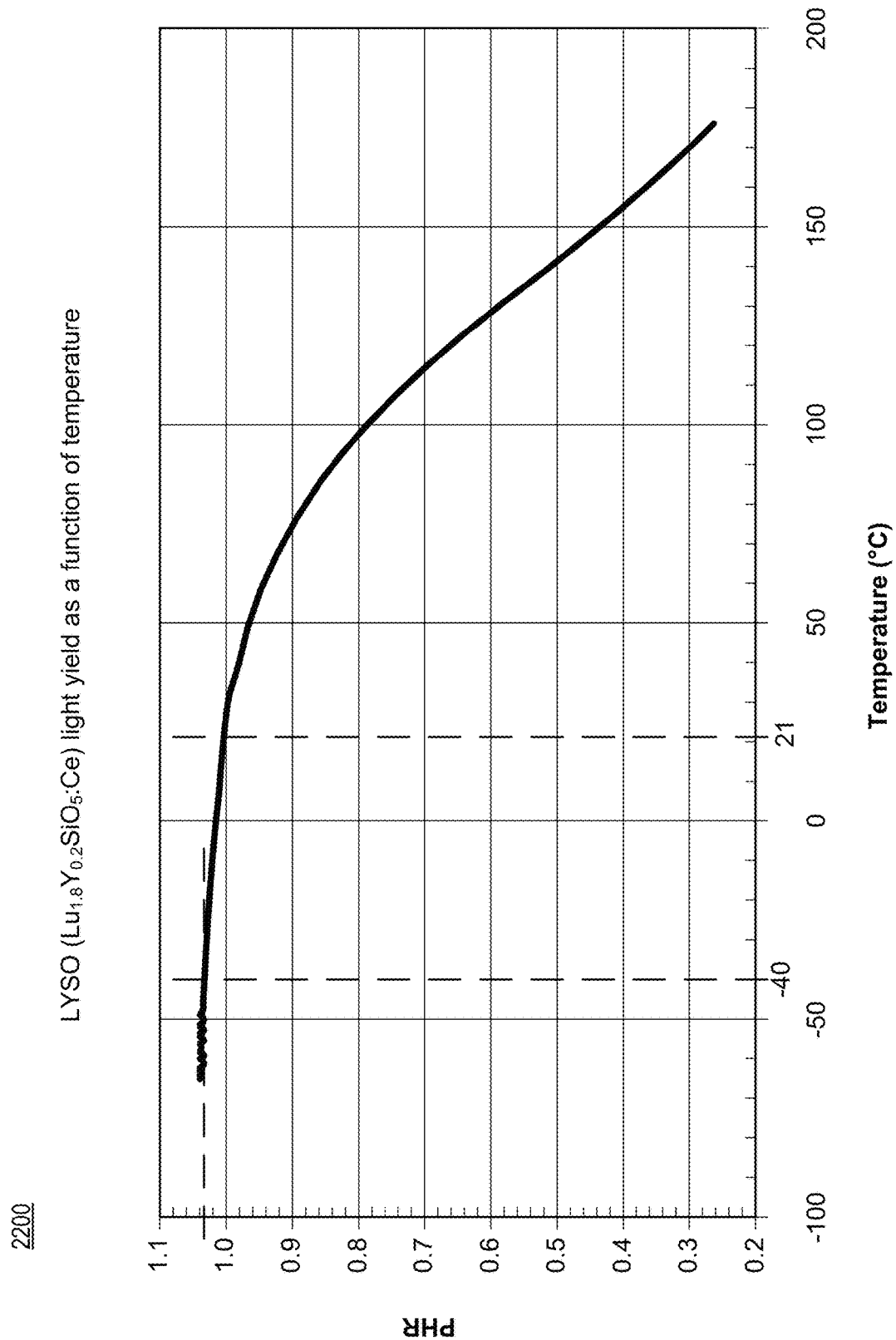
FIG. 22 is a graph of the light output of a scintillator relative to temperature, according to one embodiment.

FIG. 22 is a graph 2200 of the light output of scintillator LYSO: Ce versus temperature, according to one embodiment. According to various embodiments, the elongated scintillation crystals may be maintained at a temperature below ambient temperature to attain higher light yield outputs. For example, a light output increase of approximately 4% is attained in some embodiments by operating the elongated scintillation crystals within each detector module at −40° C. instead of an approximate room temperature of 21° C. Notably, the voltage variance per hertz bandwidth of thermally induced electronic noise of the arrays of photosensors, referred to in the art as Johnson-Nyquist noise, is given by:

$$\overline{v_n^2} = 4k_B TR$$

where,
$k_B$=Boltzmann's constant in joules per degree Kelvin,
T=the resistor's absolute temperature in Kelvin, and
R=the photosensor's quenching or other equivalent resistance.

Therefore, for a reduction in temperature, with all other factors constant, there exists a reduction in thermal noise given by:

$$v_{nr} = \sqrt{\frac{T_2}{T_1}}$$

where,
$T_1$=higher operating temperature in degrees Kelvin, and
$T_2$=lower operating temperature in degrees Kelvin.

Thus, a reduction from 21° C. to −40° C., for example, induces a reduction in root-mean-square (RMS) noise totaling about 11%. Combined with a gain in light output of about 4%, for example, the SNR is boosted by nearly 17%. In addition to a thermal noise reduction for a silicon photomultiplier photosensor at lower temperatures, there additionally exists a boost in photoelectric gain. According to various embodiments, detector modules with lateral photosensing with sub-ambient cooled scintillation crystals provide an increase in light collection efficiency and include thermal management components (such as thermal plates) to efficiently reduce the temperature for greater scintillator light output, increased photosensor transduction, and reduced noise.

In some embodiments, condensation on cooled surfaces within a PET scanning environment is eliminated or reduced by controlling the surrounding environment and/or by insulating cold surfaces from warmer moist air. At a surface temperature of −40° C., an absolute humidity of about 119.3 mg/m$^3$ (or 79 ppm), under standard conditions, may result in condensation. In some embodiments, the cooled detector modules are enclosed within a substantially gas-tight chamber. In some embodiments, the gas-tight chamber is positively pressurized with an inert gas such as nitrogen. The water vapor concentration within the sealed and positively pressurized chamber may be reduced to less than one ppm. In some embodiments, the sealed chamber is evacuated of air utilizing a vacuum pump to reduce pressure to roughly ten millibars or less. Dry nitrogen gas may be used to purge the chamber. Thereafter, dry nitrogen gas may be used to pressurize the insulating chamber above atmospheric pressure.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

Clause 1. A gamma radiation detector module, comprising: an array of scintillation crystals to be positioned on a detector, wherein each scintillation crystal includes a proximal end-face, a distal end-face to be oriented into the detector to receive a gamma photon, and four lateral faces, including a first lateral face, a second lateral face, a third lateral face, and a fourth lateral face; an array of photosensors positioned along the first lateral face of each scintillation crystal to detect scintillation photons; and a reflective material positioned on the proximal end-face, the distal end-face, and the second, third, and fourth lateral faces of each scintillation crystal to internally reflect scintillation photons.

Clause 2. The gamma radiation detector module of clause 1, wherein each scintillation crystal comprises an elongated scintillation crystal, wherein the array of elongated scintillation crystals is configured to be positioned on a detector ring, wherein the four lateral faces of each scintillation crystal comprise two axially oriented lateral faces and two transaxially oriented lateral faces, and wherein the distal end-face is radially oriented into the detector ring to receive the gamma photon.

Clause 3. The gamma radiation detector module of clause 2, wherein the first lateral face is axially oriented, such that the photosensors are positioned along an axially oriented lateral face.

Clause 4. The gamma radiation detector module of clause 1, wherein the array of elongated scintillation crystals is configured to be positioned on a detector panel that operates in concert with an opposing detector panel.

Clause 5. The gamma radiation detector module of clause 1, wherein each scintillation crystal is shaped as an elongated N-sided polygonal prism, where N is an integer value.

Clause 6. The gamma radiation detector module of clause 1, wherein each scintillation crystal comprises a cube-shaped scintillation crystal.

Clause 7. The gamma radiation detector module of clause 1, wherein each scintillation crystal comprises an elongated scintillation crystal shaped as an elongated rectangular prism.

Clause 8. The gamma radiation detector module of clause 7, wherein the distal end-face of each elongated scintillation crystal is square.

Clause 9. The gamma radiation detector module of clause 8, wherein each elongated scintillation crystal has a length between the distal and proximal end-faces of between 10 millimeters and 30 millimeters, and wherein a ratio of the length of each elongated scintillation crystal to a width of each elongated scintillation crystal is between three and ten (3-10).

Clause 10. The gamma radiation detector module of clause 3, wherein the array of elongated scintillation crystals comprises a one-dimensional array of elongated scintillation crystals arranged along an axial direction of the detector ring.

Clause 11. The gamma radiation detector module of clause 10, wherein the elongated scintillation crystals are seamlessly positioned in the axial direction of the detector ring without gaps therebetween, such that a given elongated scintillation crystal is separated from an axially adjacent elongated scintillation crystal by (i) the photosensors on the first axially oriented lateral face of the given elongated scintillation crystal and (ii) the reflective material on the second axially oriented lateral face of the axially adjacent elongated scintillation crystal.

Clause 12. The gamma radiation detector module of clause 3, wherein the array of elongated scintillation crystals comprises a two-dimensional array of elongated scintillation crystals, wherein the two-dimensional array of elongated scintillation crystals includes M elongated scintillation crystals in an axial direction of the detector ring and N elongated scintillation crystals in a transaxial direction of the detector ring, where M and N are each an integer value.

Clause 13. The gamma radiation detector module of clause 12, wherein the elongated scintillation crystals are seamlessly positioned adjacent to one another in the axial and transaxial directions of the detector ring without gaps therebetween, such that a given elongated scintillation crystal is separated from an axially adjacent elongated scintillation crystal by (i) the photosensors on the first axially oriented lateral face of the given elongated scintillation crystal and (ii) the reflective material on the second axially oriented lateral face of the axially adjacent elongated scintillation crystal, and such that the given elongated scintillation crystal and a transaxially adjacent elongated scintillation crystal are separated from one another in the transaxial direction by the reflective material.

Clause 14. The gamma radiation detector module of clause 13, wherein a thickness of the photosensors and reflective material between adjacent elongated scintillation crystals in the axial direction of the detector ring is less than 500 micrometers, and wherein a thickness of the reflective material between adjacent elongated scintillation crystals in the transaxial direction of the detector ring is less than 100 micrometers.

Clause 15. The gamma radiation detector module of clause 14, wherein each elongated scintillation crystal has a length between the distal and proximal end-faces of between 10 millimeters and 30 millimeters, wherein a ratio of the length to an axial width of each elongated scintillation crystal is between three and ten (3-10), and wherein a ratio of the length to a transaxial width of each elongated scintillation crystal is between three and ten (3-10).

Clause 16. The gamma radiation detector module of clause 13, wherein a fill-factor of an area of the distal end-faces of the elongated scintillation crystals to a total area is greater than 85%.

Clause 17. The gamma radiation detector module of clause 1, wherein the reflective material comprises a thermally conductive reflective material.

Clause 18. The gamma radiation detector module of clause 17, wherein the thermally conductive reflective material comprises at least one of aluminum, magnesium, silver, stainless steel, and a combination thereof.

Clause 19. The gamma radiation detector module of clause 17, further comprising a thermal conductor plate coupled to the proximal end-faces of at least some of the scintillation crystals.

Clause 20. The gamma radiation detector module of clause 1, further comprising: a hermetically sealed enclosure to encapsulate the scintillation crystals, the photosensors, and the reflective material; and routing wires to route electrical signals from the photosensors of each scintillation crystal from the first lateral face thereof toward the proximal end-face thereof and through the hermetically sealed enclosure.

Clause 21. The gamma radiation detector module of clause 1, further comprising routing wires to route electrical signals from the photosensors of each scintillation crystal from the first lateral face thereof toward the proximal end-face thereof.

Clause 22. The gamma radiation detector module of clause 3, further comprising: an interposer connected to the photosensors along the first axially oriented lateral face of each respective elongated scintillation crystal, wherein the interposer is operable to convey electrical signals from the photosensors of each respective elongated scintillation crystal toward the proximal end-face of each respective elongated scintillation crystal.

Clause 23. The gamma radiation detector module of clause 22, wherein the array of elongated scintillation crystals comprises a two-dimensional array of elongated scintillation crystals, wherein the two-dimensional array of elongated scintillation crystals includes M elongated scintillation crystals in an axial direction of the detector ring and N elongated scintillation crystals in a transaxial direction of the detector ring, where M and N are each an integer value.

Clause 24. The gamma radiation detector module of clause 23, wherein the elongated scintillation crystals are seamlessly positioned adjacent to one another in the axial and transaxial directions of the detector ring without gaps therebetween, such that a given elongated scintillation crystal is separated from an axially adjacent elongated scintillation crystal by (i) the photosensors on the first axially oriented lateral face of the given elongated scintillation crystal and (ii) the reflective material on the second axially oriented lateral face of the axially adjacent elongated scintillation crystal, and such that the given elongated scintillation crystal and a transaxially adjacent elongated scintillation crystal are separated from one another in the transaxial direction by the reflective material.

Clause 25. The gamma radiation detector module of clause 1, wherein the array of photosensors of each scintillation crystal comprises at least one two-dimensional array of individual photodiodes.

Clause 26. The gamma radiation detector module of clause 25, wherein each photodiode comprises a single-photon avalanche diode (SPAD) operated in Geiger mode.

Clause 27. The gamma radiation detector module of clause 1, wherein the array of photosensors of each scintillation crystal comprises multiple discrete photosensors to provide distinct photosensor measurements corresponding to distinct depth ranges between the proximal and distal end-faces of each scintillation crystal.

Clause 28. The gamma radiation detector module of clause 27, wherein the array of photosensors of each scintillation crystal comprises a plurality of two-dimensional arrays of individual photodiodes.

Clause 29. The gamma radiation detector module of clause 28, wherein each photodiode comprises a single-photon avalanche diode (SPAD) operated in Geiger mode.

Clause 30. The gamma radiation detector module of clause 29, wherein each photosensor comprises a silicon photomultiplier (SiPM), such that each scintillation crystal is associated with multiple silicon photomultipliers extending along the first lateral face thereof.

Clause 31. The gamma radiation detector module of clause 30, further comprising a processing circuit that includes: a plurality of energy circuits, wherein each energy circuit is configured to generate an energy signal as a sum of the energy detected by one or more silicon photomultipliers; and a plurality of timing signal circuits, wherein each timing signal circuit is configured to generate a distinct timing signal for the scintillation photons detected by one or more silicon photomultipliers.

Clause 32. The gamma radiation detector module of clause 31, wherein the processing circuit is a dual-channel high-speed circuit, where each channel includes circuitry to digitally encode the timing signal and the energy signal of one or more of the silicon photomultipliers.

Clause 33. The gamma radiation detector module of clause 32, wherein each scintillation crystal in the array of scintillation crystals uses a different high-speed circuit than an adjacent scintillation crystal.

Clause 34. The gamma radiation detector module of clause 31, wherein the processing circuit includes a distinct timing signal circuit for each set of three silicon photomultipliers.

Clause 35. The gamma radiation detector module of clause 31, wherein the processing circuit includes a distinct energy circuit for each silicon photomultiplier.

Clause 36. The gamma radiation detector module of clause 31, wherein the processing circuit includes a distinct energy circuit for each set of six silicon photomultipliers.

Clause 37. The gamma radiation detector module of clause 27, wherein each scintillation crystal is divided along its length into a plurality of segmented volumes.

Clause 38. The gamma radiation detector module of clause 37, wherein each segmented volume of each scintillation crystal has a different crystal time-constant.

Clause 39. The gamma radiation detector module of clause 38, wherein a processing circuit associated with the detector module determines from which segmented volume the scintillation photons originate based on the time-constant of the detected scintillation photons.

Clause 40. The gamma radiation detector module of clause 27, wherein each scintillation crystal is divided along its length into a plurality of segmented volumes with reflective layers positioned between adjacent faces of the segmented volumes, wherein each segmented volume is associated with a distinct array of photosensors, such that scintillation photons generated within a segmented volume are reflected within the segmented volume for detection by a corresponding array of photosensors.

Clause 41. A positron emission tomography (PET) scanning system, comprising: a plurality of gamma radiation detector modules positioned to form a detector ring, wherein each detector module comprises: an array of elongated scintillation crystals, each of which includes a proximal end-face, two axially oriented lateral faces, two transaxially oriented lateral faces, and a distal end-face radially oriented into the detector ring to receive a gamma photon, an array of photosensors positioned along a first of the axially oriented lateral faces of each elongated scintillation crystal to detect scintillation photons, and a reflective material positioned on the proximal end-face, the distal end-face, the radially oriented lateral faces, and a second of the axially oriented lateral faces of each elongated scintillation crystal to internally reflect scintillation photons; a cooling system to cool the detector modules; and an imaging system connected to the detector modules to generate an image based on electronic outputs from the detector modules.

Clause 42. The PET scanning system of clause 41, wherein the detector ring is formed as a plurality of axially aligned rings of detector modules, where each of the axially aligned rings comprises at least four detector modules.

Clause 43. The PET scanning system of clause 42, wherein a diameter of the detector ring is greater than 25 centimeters, and an axial bore depth of the plurality of axially aligned rings forming the detector ring is less than the diameter of the detector ring.

Clause 44. The PET scanning system of clause 41, wherein each of the elongated scintillation crystals is shaped as an elongated N-sided polygonal prism, where N is an integer value.

Clause 45. The PET scanning system of clause 41, wherein each of the elongated scintillation crystals is shaped as an elongated rectangular prism.

Clause 46. The PET scanning system of clause 45, wherein the distal end-face of each elongated scintillation crystal is square.

Clause 47. The PET scanning system of clause 46, wherein each elongated scintillation crystal has a length between the distal and proximal end-faces of between 10 millimeters and 30 millimeters, and wherein a ratio of the length of each elongated scintillation crystal to a width of each elongated scintillation crystal is between three and ten (3-10).

Clause 48. The PET scanning system of clause 41, wherein the array of elongated scintillation crystals of each detector module comprises a one-dimensional array of elongated scintillation crystals arranged along an axial direction of the detector ring.

Clause 49. The PET scanning system of clause 48, wherein the elongated scintillation crystals of each detector module are seamlessly positioned in the axial direction of the detector ring without gaps therebetween, such that a given elongated scintillation crystal is separated from an axially adjacent elongated scintillation crystal by (i) the array of photosensors on the first axially oriented lateral face of the given elongated scintillation crystal and (ii) the reflective material on the second axially oriented lateral face of the axially adjacent elongated scintillation crystal.

Clause 50. The PET scanning system of clause 41, wherein the array of elongated scintillation crystals of each detector module comprises a two-dimensional array of elongated scintillation crystals, wherein the two-dimensional array of elongated scintillation crystals of each detector module includes M elongated scintillation crystals in an axial direction of the detector ring and N elongated scintillation crystals in a transaxial direction of the detector ring, where M and N are each an integer value.

Clause 51. The PET scanning system of clause 50, wherein the elongated scintillation crystals of each detector module are seamlessly positioned adjacent to one another in the axial and transaxial directions of the detector ring without gaps therebetween, such that a given elongated scintillation crystal is separated from an axially adjacent elongated scintillation crystal by (i) the array of photosensors on the first axially oriented lateral face of the given elongated scintillation crystal and (ii) the reflective material on the second axially oriented lateral face of the axially adjacent elongated scintillation crystal, and such that the given elongated scintillation crystal and a transaxially adjacent elongated scintillation crystal are separated from one another in the transaxial direction by the reflective material.

Clause 52. The PET scanning system of clause 51, wherein a thickness of the array of photosensors and reflective material between adjacent elongated scintillation crystals in each detector module in the axial direction of the detector ring is less than 500 micrometers, and wherein a thickness of the reflective material between adjacent elongated scintillation crystals in each detector module in the transaxial direction of the detector ring is less than 100 micrometers.

Clause 53. The PET scanning system of clause 52, wherein each elongated scintillation crystal has a length between the distal and proximal end-faces of between 10 millimeters and 30 millimeters, wherein a ratio of the length to an axial width of each elongated scintillation crystal is between three and ten (3-10), and wherein a ratio of the length to a transaxial width of each elongated scintillation crystal is between three and ten (3-10).

Clause 54. The PET scanning system of clause 51, wherein a fill-factor of an area of the distal end-faces of the elongated scintillation crystals in each detector module to a total area of each detector module is greater than 85%.

Clause 55. The PET scanning system of clause 41, wherein the reflective material comprises a thermally conductive reflective material.

Clause 56. The PET scanning system of clause 55, wherein the thermally conductive reflective material comprises at least one of aluminum, magnesium, silver, stainless steel, and a combination thereof.

Clause 57. The PET scanning system of clause 56, further comprising a thermal conductor plate coupled to the proximal end-faces of at least some of the elongated scintillation crystals in the array of elongated scintillation crystals of each detector module.

Clause 58. The PET scanning system of clause 41, wherein each detector module further comprises: a hermetically sealed enclosure to encapsulate the elongated scintillation crystals, the arrays of photosensors, and the reflective material; and routing wires to route electrical signals from the array of photosensors of each elongated scintillation crystal from the first lateral face thereof toward the proximal end-face thereof and through the hermetically sealed enclosure to the imaging system.

Clause 59. The PET scanning system of clause 41, further comprising routing wires to route electrical signals from the photosensors of each elongated scintillation crystal of each detector module from the first lateral face thereof toward the proximal end-face thereof.

Clause 60. The PET scanning system of clause 41, further comprising: an interposer connected to the array of photosensors along the first axially oriented lateral face of each respective elongated scintillation crystal of each detector module, wherein the interposer is operable to convey electrical signals from the array of photosensors of each respective elongated scintillation crystal toward the proximal end-face of each respective elongated scintillation crystal.

Clause 61. The PET scanning system of clause 60, wherein the array of elongated scintillation crystals of each detector module comprises a two-dimensional array of elongated scintillation crystals, wherein the two-dimensional array of elongated scintillation crystals of each detector module includes M elongated scintillation crystals in an axial direction of the detector ring and N elongated scintillation crystals in a transaxial direction of the detector ring, where M and N are each an integer value.

Clause 62. The PET scanning system of clause 61, wherein the elongated scintillation crystals of each detector module are seamlessly positioned adjacent to one another in the axial and transaxial directions of the detector ring without gaps therebetween, such that a given elongated scintillation crystal and an axially adjacent elongated scintillation crystal are separated from one another in the axial direction by (i) the array of photosensors on the first axially oriented lateral face of the given elongated scintillation crystal, (ii) the interposer of the given elongated scintillation crystal, and (iii) the reflective material on the second axially oriented lateral face of the axially adjacent elongated scintillation crystal, and such that the given elongated scintillation crystal and a transaxially adjacent elongated scintillation crystal are separated from one another in the transaxial direction by the reflective material.

Clause 63. The PET scanning system of clause 41, wherein the array of photosensors of each elongated scintillation crystal comprises a two-dimensional array of individual photodiodes.

Clause 64. The PET scanning system of clause 41, wherein the array of photosensors of each elongated scintillation crystal comprises multiple photosensors to provide distinct photosensor measurements corresponding to distinct depth ranges between the proximal and distal end-faces of each elongated scintillation crystal.

Clause 65. The PET scanning system of clause 64, wherein the array of photosensors of each elongated scintillation crystal comprises a two-dimensional array of individual photodiodes.

Clause 66. The PET scanning system of clause 65, wherein each photodiode comprises a single-photon avalanche diode (SPAD).

Clause 67. The PET scanning system of clause 66, wherein each photosensor comprises a silicon photomultiplier (SiPM), such that each elongated scintillation crystal is associated with multiple silicon photomultipliers extending along the first axially oriented lateral face thereof.

Clause 68. The PET scanning system of clause 67, further comprising: an energy circuit for each elongated scintillation crystal of each detector module to generate an energy signal as a sum of the energy detected by the array of photosensors of each respective elongated scintillation crystal; and a timing signal circuit for each elongated scintillation crystal to generate a distinct timing signal for the scintillation photons detected by each individual photosensor of each respective elongated scintillation crystal.

Clause 69. The PET scanning system of clause 64, wherein each elongated scintillation crystal is divided along its length into a plurality of segmented volumes with reflective layers positioned between adjacent faces of the segmented volumes, wherein each segmented volume is associated with a distinct array of photosensors, such that scintillation photons generated within a segmented volume are reflected within the segmented volume for detection by a corresponding array of photosensors.

Clause 70. The PET scanning system of clause 64, further comprising: a high-speed circuit connected to the array of photosensors of each elongated scintillation crystal of each detector module to digitally encode scintillation events detected within each elongated scintillation crystal as: a timing signal for each of the multiple photosensors associated with each elongated scintillation crystal; and an energy signal summing a total energy detected by the multiple photosensors associated with each elongated scintillation crystal.

Clause 71. The PET scanning system of clause 70, wherein the high-speed circuit is a dual-channel high-speed circuit, where each channel includes circuitry to digitally encode the timing signal and the energy signal of the multiple photosensors associated with each elongated scintillation crystal.

Clause 72. The PET scanning system of clause 71, wherein each elongated scintillation crystal in the array of elongated scintillation crystals of each detector module uses a different high-speed circuit than an adjacent elongated scintillation crystal.

Clause 73. A gamma radiation detector module, comprising: an array of elongated scintillation crystals to be positioned on a detector ring, wherein each elongated scintillation crystal includes a proximal end-face, two axially oriented lateral faces, two transaxially oriented lateral faces, and a distal end-face to be radially oriented into the detector ring to receive a gamma photon; an array of photosensors with detection faces to detect scintillation photons, wherein the detection faces of the array of photosensors are positioned along a length of a first of the axially oriented lateral faces of each respective elongated scintillation crystal; and an interposer connected to output faces of the array of photosensors along the length of the first axially oriented lateral face of each respective elongated scintillation crystal, wherein the interposer is operable to convey electrical signals from the output faces of the array of photosensors of each respective elongated scintillation crystal toward the proximal end-face of each respective elongated scintillation crystal.

Clause 74. The gamma radiation detector module of clause 73, wherein the array of photosensors of each elongated scintillation crystal comprises a two-dimensional array of single-photon avalanche diodes (SPADs), and wherein the interposer comprises a bias circuit to operate the two-dimensional array of SPADs of each respective elongated scintillation crystal in Geiger mode.

Clause 75. The gamma radiation detector module of clause 73, wherein a fill-factor of an area of the distal end-faces of the elongated scintillation crystals to a total distal end-face area, including distal end-faces of the arrays of photosensors and the interposer of each respective elongated scintillation crystal, is greater than 85%.

Clause 76. The gamma radiation detector module of clause 73, comprising: a reflective material positioned on the proximal end-face, the distal end-face, the two transaxially oriented lateral faces, and a second of the axially oriented lateral faces of each elongated scintillation crystal, wherein the reflective material operates to internally reflect scintillation photons generated within each respective elongated scintillation crystal.

Clause 77. The gamma radiation detector module of clause 76, wherein each elongated scintillation crystal is divided along its length into a plurality of segmented volumes with reflective layers positioned between adjacent faces of the segmented volumes, wherein each segmented volume of each elongated scintillation crystal is associated with a unique array of photosensors, such that scintillation photons generated within a segmented volume are reflected within the segmented volume for detection by a corresponding array of photosensors.

Clause 78. The gamma radiation detector module of clause 76, wherein each of the elongated scintillation crystals is shaped as an elongated N-sided polygonal prism, where N is an integer value.

Clause 79. The gamma radiation detector module of clause 76, wherein each of the elongated scintillation crystals is shaped as an elongated rectangular prism.

Clause 80. The gamma radiation detector module of clause 79, wherein the distal end-face of each elongated scintillation crystal is square.

Clause 81. The gamma radiation detector module of clause 80, wherein each elongated scintillation crystal has a length between the distal and proximal end-faces of between 10 millimeters and 30 millimeters, and wherein a ratio of the length of each elongated scintillation crystal to a width of each elongated scintillation crystal is between three and ten (3-10).

Clause 82. The gamma radiation detector module of clause 76, wherein the array of elongated scintillation crystals comprises a one-dimensional array of elongated scintillation crystals arranged along an axial direction of the detector ring.

Clause 83. The gamma radiation detector module of clause 82, wherein the elongated scintillation crystals are seamlessly positioned in the axial direction of the detector ring without gaps therebetween, such that a given elongated scintillation crystal and an axially adjacent elongated scintillation crystal are separated from one another by (i) the array of photosensors on the first axially oriented lateral face of the given elongated scintillation crystal, (ii) the interposer of the given elongated scintillation crystal, and (ii) the reflective material on the second axially oriented lateral face of the axially adjacent elongated scintillation crystal.

Clause 84. The gamma radiation detector module of clause 76, wherein the array of elongated scintillation crystals comprises a two-dimensional array of elongated scintillation crystals, wherein the two-dimensional array of elongated scintillation crystals includes M elongated scintillation crystals in an axial direction of the detector ring and N elongated scintillation crystals in a transaxial direction of the detector ring, where M and N are each an integer value.

Clause 85. The gamma radiation detector module of clause 84, wherein the elongated scintillation crystals are seamlessly positioned adjacent to one another in the axial and transaxial directions of the detector ring without gaps therebetween, such that a given elongated scintillation crystal and an axially adjacent elongated scintillation crystal are separated from one another in the axial direction by (i) the array of photosensors on the first axially oriented lateral face of the given elongated scintillation crystal, (ii) the interposer of the given elongated scintillation crystal, and (iii) the reflective material on the second axially oriented lateral face of the axially adjacent elongated scintillation crystal, and such that the given elongated scintillation crystal and a transaxially adjacent elongated scintillation crystal are separated from one another in the transaxial direction by the reflective material.

Clause 86. The gamma radiation detector module of clause 85, wherein a thickness of the array of photosensors and reflective material between adjacent elongated scintillation crystals in the axial direction of the detector ring is less than 500 micrometers, and wherein a thickness of the reflective material between adjacent elongated scintillation crystals in the transaxial direction of the detector ring is less than 100 micrometers.

Clause 87. The gamma radiation detector module of clause 86, wherein each elongated scintillation crystal has a length between the distal and proximal end-faces of between 10 millimeters and 30 millimeters, wherein a ratio of the length to an axial width of each elongated scintillation crystal is between three and ten (3-10), and wherein a ratio of the length to a transaxial width of each elongated scintillation crystal is between three and ten (3-10).

Clause 88. The gamma radiation detector module of clause 85, wherein a fill-factor of an area of the distal end-faces of the elongated scintillation crystals to a total area is greater than 85%.

Clause 89. The gamma radiation detector module of clause 76, wherein the reflective material comprises a thermally conductive reflective material.

Clause 90. The gamma radiation detector module of clause 89, wherein the thermally conductive reflective material comprises at least one of aluminum, magnesium, silver, stainless steel, and a combination thereof.

Clause 91. The gamma radiation detector module of clause 89, further comprising a thermal conductor plate coupled to the proximal end-faces of at least some of the elongated scintillation crystals in the array of elongated scintillation crystals.

Clause 92. The gamma radiation detector module of clause 73, further comprising: a hermetically sealed enclosure to encapsulate the elongated scintillation crystals, the arrays of photosensors, and the interposers.

Clause 93. The gamma radiation detector module of clause 73, wherein the array of photosensors of each elongated scintillation crystal comprises multiple photosensors to provide distinct photosensor measurements corresponding to distinct depth ranges between the proximal and distal end-faces of each elongated scintillation crystal.

Clause 94. The gamma radiation detector module of clause 93, wherein the array of photosensors of each elongated scintillation crystal comprises a two-dimensional array of individual photodiodes.

Clause 95. The gamma radiation detector module of clause 94, wherein each photodiode comprises a single-photon avalanche diode (SPAD).

Clause 96. The gamma radiation detector module of clause 95, wherein each photosensor comprises a silicon photomultiplier (SiPM), such that each elongated scintillation crystal is associated with multiple silicon photomultipliers extending along the first axially oriented lateral face thereof.

Clause 97. A circuit for processing nuclear scintillation events, comprising: a plurality of photosensors to detect scintillation photons generated by a scintillation event within a scintillation crystal and output an electrical signal; an energy circuit to generate a digital signal representative of a total energy detected by one or more photosensors of the plurality of photosensors during a detection time period; and a timing circuit to generate a digital signal with a distinct timing signal for the scintillation photons detected by the one or more photosensors during the detection time period.

Clause 98. The circuit of clause 97, wherein the photosensors comprise a plurality of single-photon-avalanche diodes (SPADs) biased to operate in Geiger mode, wherein the biasing circuit is integrated within an interposer, and wherein each of the plurality of photosensors is positioned on a lateral face of the scintillation crystal.

Clause 99. The circuit of clause 97, wherein the energy circuit comprises: an analog-to-digital converter; a multiplexer to select between output signals of each of the plurality of photosensors for conversion by the analog-to-digital converter; a signal delay transmission line to connect one or more of the plurality of photosensors to the multiplexer; and digital control logic to control the multiplexer selection between the output signals of the plurality of photosensors.

Clause 100. The circuit of clause 97, wherein the timing circuit comprises: an analog-to-digital converter for high-speed digital encoding of a capacitively decoupled output of one or more of the plurality of photosensors; a transmission line to connect the capacitively decoupled output of one or more of the plurality of photosensors to the analog-to-digital converter via an output diode; a flip-flop to selectively trigger encoding of the capacitively decoupled output of one or more of the plurality of photosensors by the analog-to-digital converter by biasing the output diode to an on-state; and a comparator to compare the capacitively decoupled output of one or more of the plurality of photosensors to one of a low-voltage threshold value and a low-current threshold value, wherein the output of the comparator selectively triggers the flip-flop.

Clause 101. The circuit of clause 100, wherein the output diode comprises a PIN diode characterized as having at least one of: a high-energy bandgap semiconductor of at least 1.3 eV, a reverse bias junction capacitance of less than 150 femtofarads, a nominal carrier lifetime of less than 10 nanoseconds at an operational current less than 20 milliamperes, and a forward-bias on-resistance of less than 10 ohms at an operational frequency of one gigahertz.

Clause 102. The circuit of clause 100, wherein the output diode comprises a PIN diode comprising a high-energy bandgap semiconductor of at least 1.3 eV.

Clause 103. The circuit of clause 100, wherein the output diode comprises a PIN diode with a reverse bias junction capacitance of less than 150 femtofarads.

Clause 104. The circuit of clause 100, wherein the output diode comprises a PIN diode with a nominal carrier lifetime of less than 10 nanoseconds at an operational current less than 20 milliamperes.

Clause 105. The circuit of clause 100, wherein the output diode comprises a PIN diode with a forward-bias on-resistance of less than 10 ohms at an operational frequency of one gigahertz.

Clause 106. The circuit of clause 97, wherein the energy circuit comprises: a first analog-to-digital converter; a multiplexer to select between output signals of each of the plurality of photosensors for conversion by the first analog-to-digital converter; a signal delay transmission line to connect each photosensor to the multiplexer; and digital control logic to control the multiplexer selection between the output signals of the plurality of photosensors; and wherein the timing circuit comprises: a second analog-to-digital converter for high-speed digital encoding of a capacitively decoupled output of one or more of the plurality of photosensors; a transmission line to connect the capacitively decoupled output derived from one or more of the plurality of photosensors to the analog-to-digital converter via an output diode; a flip-flop to selectively trigger encoding of the capacitively decoupled output derived from one or more of the plurality of photosensors by the second analog-to-digital converter by biasing the output diode to an on-state; and a comparator to compare the output signals of one or more of the plurality of photosensor to a threshold value, wherein the output of the comparator selectively triggers the flip-flop to bias the output diode to an on-state.

Clause 107. The circuit of clause 106, wherein the comparator comprises a voltage comparator to compare a voltage level of the output signal of one or more of the plurality of photosensor to a voltage threshold value.

Clause 108. The circuit of clause 106, wherein the comparator comprises a current comparator to compare a current level of the output signal of one or more of the plurality of photosensor to a current threshold value.

Clause 109. The circuit of clause 106, wherein the output diode comprises a PIN diode comprising a high-energy bandgap semiconductor of at least 1.3 eV.

Clause 110. The circuit of clause 106, wherein the output diode comprises a PIN diode with a reverse bias junction capacitance of less than 150 femtofarads.

Clause 111. The circuit of clause 106, wherein the output diode comprises a PIN diode with a nominal carrier lifetime of less than 10 nanoseconds at an operational current less than 20 milliamperes.

Clause 112. The circuit of clause 106, wherein the output diode comprises a PIN diode with a forward-bias on-resistance of less than 10 ohms at an operational frequency of one gigahertz.

Clause 113. The circuit of clause 106, wherein the output diode comprises a PIN diode characterized as having: a high-energy bandgap semiconductor of at least 1.3 eV, a reverse bias junction capacitance of less than 150 femtofarads, a nominal carrier lifetime of less than 10 nanoseconds at an operational current less than 20 milliamperes, and a forward-bias on-resistance of less than 10 ohms at an operational frequency of one gigahertz.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure includes and encompasses at least the following claims.

What is claimed is:

1. A gamma radiation detector module, comprising:
    an array of scintillation crystals configured to be positioned on a detector ring, the array comprising at least a first row of scintillation crystals extending in an axial direction,
    wherein each scintillation crystal includes a proximal end-face, a distal end-face to be oriented into the detector ring to receive a gamma photon, and four lateral faces, including an axially oriented first lateral face, an axially oriented second lateral face, a transaxially oriented third lateral face, and a transaxially oriented fourth lateral face, and
    wherein each row of scintillation crystals includes at least:
        a first scintillation crystal, a second scintillation crystal, a third scintillation crystal, and a fourth scintillation crystal; and
        a first double-sided interposer positioned between the axially oriented second lateral face of the first scintillation crystal and the axially oriented first lateral face of the second scintillation crystal;
        a first array of photosensors positioned between a first lateral face of the first double-sided interposer and the axially oriented second lateral face of the first scintillation crystal;
        a second array of photosensors positioned between a second lateral face of the first double-sided interposer and the axially oriented first lateral face of the second scintillation crystal,
        a second double-sided interposer positioned between the axially oriented second lateral face of the third scintillation crystal and the axially oriented first lateral face of the fourth scintillation crystal;
        a third array of photosensors positioned between a first lateral face of the second double-sided interposer and the axially oriented second lateral face of the third scintillation crystal; and
        a fourth array of photosensors positioned between a second lateral face of the second double-sided interposer and the axially oriented first lateral face of the fourth scintillation crystal.

2. The gamma radiation detector module of claim 1, further comprising:
    a reflective material to internally reflect scintillation photons positioned on:
        the proximal end-face, the distal end-face, and the first, third, and fourth lateral faces of the first scintillation crystal of each row of scintillation crystals, and
        the proximal end-face, the distal end-face, and the second, third, and fourth lateral faces of the second scintillation crystal of each row of scintillation crystals.

3. The gamma radiation detector module of claim 1, wherein the array comprises four rows of scintillation crystals extending in the axial direction, such that the radiation detector module comprises sixteen scintillation crystals and eight double-sided interposers.

4. The gamma radiation detector module of claim 1, further comprising:
    a reflective material to internally reflect scintillation photons positioned on:
        the proximal end-face, the distal end-face, and the first, third, and fourth lateral faces of the first and third scintillation crystals of each row of scintillation crystals,
        the proximal end-face, the distal end-face, and the second, third, and fourth lateral faces of the second and fourth scintillation crystals of each row of scintillation crystals.

5. The gamma radiation detector module of claim 4, wherein the reflective material comprises a thermally conductive reflective material.

6. The gamma radiation detector module of claim 1, wherein each array of photosensors of comprises at least one two-dimensional array of individual photodiodes.

7. The gamma radiation detector module of claim 6, wherein each photodiode comprises a single-photon avalanche diode (SPAD) operated in Geiger mode.

8. The gamma radiation detector module of claim 1, wherein each array of photosensors comprises multiple discrete photosensors to provide distinct photosensor measurements corresponding to distinct depth ranges between the proximal and distal end-faces of each scintillation crystal.

9. The gamma radiation detector module of claim 8, wherein each array of photosensors comprises a plurality of two-dimensional arrays of individual photodiodes, and
wherein each photodiode comprises a single-photon avalanche diode (SPAD) operated in Geiger mode.

10. The gamma radiation detector module of claim 9, wherein each photosensor comprises a silicon photomultiplier (SiPM), such that each scintillation crystal is associated with multiple silicon photomultipliers.

11. The gamma radiation detector module of claim 10, further comprising a processing circuit that includes:
a plurality of energy circuits, wherein each energy circuit is configured to generate an energy signal as a sum of the energy detected by one or more silicon photomultipliers; and
a plurality of timing signal circuits, wherein each timing signal circuit is configured to generate a distinct timing signal for the scintillation photons detected by one or more silicon photomultipliers.

12. The gamma radiation detector module of claim 11, wherein the processing circuit is a dual-channel high-speed circuit, where each channel includes circuitry to digitally encode the timing signal and the energy signal of one or more of the silicon photomultipliers, and
wherein each scintillation crystal in the array of scintillation crystals uses a different high-speed circuit than an adjacent scintillation crystal.

13. The gamma radiation detector module of claim 1, wherein each scintillation crystal comprises an elongated scintillation crystal with a length between the proximal and distal end-faces greater than a width between opposing lateral faces.

14. The gamma radiation detector module of claim 13, wherein the length of each scintillation crystal is between 10 and 30 millimeters, and the width between opposing lateral faces is between 2 and 10 millimeters.

15. A gamma radiation detector module, comprising:
an array of elongated scintillation crystals to be positioned on a detector ring, the array comprising at least a first row with first, second, third, and fourth elongated scintillation crystals,
wherein each elongated scintillation crystal includes a proximal end-face, a distal end-face to be oriented into the detector ring to receive a gamma photon, and four lateral faces, including a first lateral face, a second lateral face, a third lateral face, and a fourth lateral face, and
wherein each elongated scintillation crystal is divided along its length between the proximal and distal end-faces into a plurality of segmented volumes;
an array of photosensors positioned along the first lateral face of each elongated scintillation crystal to detect scintillation photons; and
a reflective material positioned on the proximal end-face, the distal end-face, and the second, third, and fourth lateral faces of each elongated scintillation crystal to internally reflect scintillation photons,
wherein each row of elongated scintillation crystals includes at least:
a first double-sided interposer positioned between the first and second scintillation crystal,
a second double-sided interposer positioned between the third and fourth scintillation crystal.

16. The gamma radiation detector module of claim 15, wherein each segmented volume comprises a cube.

17. The gamma radiation detector module of claim 15, wherein each elongated scintillation crystal comprises four cubic segmented volumes.

18. The gamma radiation detector module of claim 15, wherein reflective layers are positioned between adjacent faces of the segmented volumes of each elongated scintillation crystal, wherein each segmented volume is associated with a distinct array of photosensors, such that scintillation photons generated within a segmented volume are reflected within the segmented volume for detection by a corresponding array of photosensors.

19. The gamma radiation detector module of claim 15, wherein each segmented volume of each elongated scintillation crystal has a different crystal time-constant.

20. The gamma radiation detector module of claim 19, wherein a processing circuit associated with the detector module determines from which segmented volume the scintillation photons originate based on the time-constant of the detected scintillation photons.

21. The gamma radiation detector module of claim 15, wherein the four lateral faces of each elongated scintillation crystal comprise two axially oriented lateral faces and two transaxially oriented lateral faces, and wherein the first lateral face is axially oriented, such that the photosensors are positioned along an axially oriented lateral face.

22. The gamma radiation detector module of claim 21, wherein the array of elongated scintillation crystals comprises a one-dimensional array of elongated scintillation crystals arranged along an axial direction of the detector ring.

23. The gamma radiation detector module of claim 22, wherein the elongated scintillation crystals are seamlessly positioned in the axial direction of the detector ring without gaps therebetween, such that a given elongated scintillation crystal is separated from an axially adjacent elongated scintillation crystal by, in addition to the double-sided interposers, (i) the photosensors on the first axially oriented lateral face of the given elongated scintillation crystal and (ii) the reflective material on the second axially oriented lateral face of the axially adjacent elongated scintillation crystal.

24. The gamma radiation detector module of claim 21, wherein the array of elongated scintillation crystals comprises a two-dimensional array of elongated scintillation crystals, wherein the two-dimensional array of elongated scintillation crystals includes M elongated scintillation crystals in an axial direction of the detector ring and N elongated scintillation crystals in a transaxial direction of the detector ring, where M and N are each an integer value.

25. The gamma radiation detector module of claim 24, wherein the elongated scintillation crystals are seamlessly positioned adjacent to one another in the axial and transaxial directions of the detector ring without gaps therebetween, such that a given elongated scintillation crystal is separated from an axially adjacent elongated scintillation crystal by, in addition to the double-sided interposers, (i) the photosensors on the first axially oriented lateral face of the given elongated scintillation crystal and (ii) the reflective material on the second axially oriented lateral face of the axially adjacent elongated scintillation crystal, and such that the given elongated scintillation crystal and a transaxially adjacent elongated scintillation crystal are separated from one another in the transaxial direction by the reflective material.

26. A positron emission tomography (PET) scanning system, comprising:
- a plurality of gamma radiation detector modules positioned to form a detector ring;
- a cooling system to cool the detector modules; and
- an imaging system connected to the detector modules to generate an image based on electronic outputs from the detector modules, wherein each detector module comprises:
  - an array of elongated scintillation crystals, each of which includes a proximal end-face, two axially oriented lateral faces, two transaxially oriented lateral faces, and a distal end-face radially oriented into the detector ring to receive a gamma photon,
  - a double-sided interposer positioned between every other alternating pair of axially adjacent elongated scintillation crystals,
  - an array of photosensors positioned between the double-sided interposer and one axially oriented lateral face of each elongated scintillation crystal, such that a given elongated scintillation crystal and a paired, axially adjacent elongated scintillation crystal are separated from one another in the axial direction by (i) the photosensors on an axially oriented lateral face of the given elongated scintillation crystal, (ii) the double-sided interposer, and (iii) the photosensors on an axially oriented lateral face of the paired, axially adjacent elongated scintillation crystal,
  - a reflective material to internally reflect scintillation photons positioned on each face that does not have an array of photosensors positioned thereon, such that the given elongated scintillation crystal and a non-paired, axially adjacent elongated scintillation crystal are separated from one another in the axial direction by the reflective material, and such that the given elongated scintillation crystal and a transaxially adjacent elongated scintillation crystal are separated from one another in the transaxial direction by the reflective material.

27. The PET scanning system of claim 26, wherein the array of photosensors of each elongated scintillation crystal comprises multiple photosensors to provide distinct photosensor measurements corresponding to distinct depth ranges between the proximal and distal end-faces of each elongated scintillation crystal.

28. The PET scanning system of claim 26, wherein the array of photosensors of each elongated scintillation crystal comprises a two-dimensional array of individual photodiodes.

29. The PET scanning system of claim 28, wherein each photodiode comprises a single-photon avalanche diode (SPAD).

* * * * *